United States Patent
Mellor et al.

(10) Patent No.: US 10,469,396 B2
(45) Date of Patent: Nov. 5, 2019

(54) EVENT PROCESSING WITH ENHANCED THROUGHPUT

(71) Applicant: Pegasystems Inc., Cambridge, MA (US)

(72) Inventors: David Mellor, Lynnfield, MA (US); Ora Lassila, Hollis, NH (US)

(73) Assignee: PegaSystems, Inc., Cambridge, MA (US)

( * ) Notice: Subject to any disclaimer, the term of this patent is extended or adjusted under 35 U.S.C. 154(b) by 826 days.

(21) Appl. No.: 14/879,679

(22) Filed: Oct. 9, 2015

(65) Prior Publication Data
US 2016/0105370 A1    Apr. 14, 2016

Related U.S. Application Data

(60) Provisional application No. 62/062,515, filed on Oct. 10, 2014.

(51) Int. Cl.
   *G06F 15/173* (2006.01)
   *H04L 12/873* (2013.01)
   (Continued)

(52) U.S. Cl.
   CPC .......... *H04L 47/522* (2013.01); *G06Q 10/00* (2013.01); *G06Q 10/10* (2013.01); *G06Q 10/107* (2013.01);
   (Continued)

(58) Field of Classification Search
   CPC ....... H04L 47/522; H04L 49/90; H04L 45/02; H04L 67/10; G06Q 10/00
   (Continued)

(56) References Cited

U.S. PATENT DOCUMENTS

| 4,047,059 A | 9/1977 | Rosenthal |
| 4,344,142 A | 8/1982 | Diehr, II et al. |

(Continued)

FOREIGN PATENT DOCUMENTS

| DE | 19911098 A1 | 12/1999 |
| EP | 0 549 208 A2 | 6/1993 |

(Continued)

OTHER PUBLICATIONS

Eisenstein, et al., Adaptation in Automated User-Interface Design. IUI, 2000, pp. 74-81.
(Continued)

*Primary Examiner* — Uzma Alam
*Assistant Examiner* — Sahera Halim
(74) *Attorney, Agent, or Firm* — Nutter McClennen & Fish LLP

(57) ABSTRACT

The present systems and methods allow for rapid processing of large volumes of events. A producer node in a cluster determines a sharding key for a received event from an event stream. The producer node uses a sharding map to correlate the sharding key for the event with a producer channel, and provides the event to a producer event buffer associated with the producer channel. The producer event buffer transmits the event to a corresponding consumer event buffer associated with a consumer channel on a consumer node. The event processing leverages a paired relationship between producer channels on the producer node and consumer channels on the consumer node, so as to generate enhanced throughput. The event processing also supports dynamic rebalancing of the system in response to adding or removing producer or consumer nodes, or adding or removing producer or consumer channels to or from producer or consumer nodes.

18 Claims, 17 Drawing Sheets

(51) Int. Cl.
  *G06Q 10/00* (2012.01)
  *H04L 12/751* (2013.01)
  *H04L 12/861* (2013.01)
  *H04L 29/08* (2006.01)
  *G06Q 10/10* (2012.01)

(52) U.S. Cl.
  CPC .............. *H04L 45/02* (2013.01); *H04L 49/90* (2013.01); *H04L 67/10* (2013.01)

(58) Field of Classification Search
  USPC .................................................. 709/226, 206
  See application file for complete search history.

(56) References Cited

U.S. PATENT DOCUMENTS

| | | |
|---|---|---|
| 4,602,168 A | 7/1986 | Single |
| 4,607,232 A | 8/1986 | Gill, Jr. |
| 4,659,944 A | 4/1987 | Miller, Sr. et al. |
| 4,701,130 A | 10/1987 | Whitney et al. |
| 4,866,634 A | 9/1989 | Reboh et al. |
| 4,884,217 A | 11/1989 | Skeirik et al. |
| 4,895,518 A | 1/1990 | Arnold et al. |
| 4,930,071 A | 5/1990 | Tou et al. |
| 4,953,106 A | 8/1990 | Gansner et al. |
| 5,062,060 A | 10/1991 | Kolnick |
| 5,077,491 A | 12/1991 | Heck et al. |
| 5,093,794 A | 3/1992 | Howie et al. |
| 5,119,465 A | 6/1992 | Jack et al. |
| 5,129,043 A | 7/1992 | Yue |
| 5,136,184 A | 8/1992 | Deevy |
| 5,136,523 A | 8/1992 | Landers |
| 5,140,671 A | 8/1992 | Hayes et al. |
| 5,193,056 A | 3/1993 | Boes |
| 5,199,068 A | 3/1993 | Cox |
| 5,204,939 A | 4/1993 | Yamazaki et al. |
| 5,228,116 A | 7/1993 | Harris et al. |
| 5,259,766 A | 11/1993 | Sack et al. |
| 5,262,941 A | 11/1993 | Saladin et al. |
| 5,267,175 A | 11/1993 | Hooper |
| 5,267,865 A | 12/1993 | Lee et al. |
| 5,270,920 A | 12/1993 | Pearse et al. |
| 5,276,359 A | 1/1994 | Chiang |
| 5,276,885 A | 1/1994 | Milnes et al. |
| 5,291,394 A | 3/1994 | Chapman |
| 5,291,583 A | 3/1994 | Bapat |
| 5,295,256 A | 3/1994 | Bapat |
| 5,297,279 A | 3/1994 | Bannon et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,337,407 A | 8/1994 | Bates et al. |
| 5,339,390 A | 8/1994 | Robertson et al. |
| 5,374,932 A | 12/1994 | Wyschogrod et al. |
| 5,379,366 A | 1/1995 | Noyes |
| 5,379,387 A | 1/1995 | Carlstedt et al. |
| 5,381,332 A | 1/1995 | Wood |
| 5,386,559 A | 1/1995 | Eisenberg et al. |
| 5,395,243 A | 3/1995 | Lubin et al. |
| 5,412,756 A | 5/1995 | Bauman et al. |
| 5,421,011 A | 5/1995 | Camillone et al. |
| 5,421,730 A | 6/1995 | Lasker, III et al. |
| 5,446,397 A | 8/1995 | Yotsuyanagi |
| 5,446,885 A | 8/1995 | Moore et al. |
| 5,450,480 A | 9/1995 | Man et al. |
| 5,463,682 A | 10/1995 | Fisher et al. |
| 5,473,732 A | 12/1995 | Chang |
| 5,477,170 A | 12/1995 | Yotsuyanagi |
| 5,481,647 A | 1/1996 | Brody et al. |
| 5,499,293 A | 3/1996 | Behram et al. |
| 5,504,879 A | 4/1996 | Eisenberg et al. |
| 5,512,849 A | 4/1996 | Wong |
| 5,519,618 A | 5/1996 | Kastner et al. |
| 5,537,590 A | 7/1996 | Amado |
| 5,542,024 A | 7/1996 | Balint et al. |
| 5,542,078 A | 7/1996 | Martel et al. |
| 5,548,506 A | 8/1996 | Srinivasan |
| 5,561,740 A | 10/1996 | Barrett et al. |
| 5,579,223 A | 11/1996 | Raman |
| 5,579,486 A | 11/1996 | Oprescu et al. |
| 5,586,311 A | 12/1996 | Davies et al. |
| 5,596,752 A | 1/1997 | Knudsen et al. |
| 5,597,312 A | 1/1997 | Bloom et al. |
| 5,608,789 A | 3/1997 | Fisher et al. |
| 5,611,076 A | 3/1997 | Durtlinger et al. |
| 5,627,979 A | 5/1997 | Chang et al. |
| 5,630,127 A | 5/1997 | Moore et al. |
| 5,649,192 A | 7/1997 | Stucky |
| 5,655,118 A | 8/1997 | Heindel et al. |
| 5,664,206 A | 9/1997 | Murow et al. |
| 5,675,753 A | 10/1997 | Hansen et al. |
| 5,678,039 A | 10/1997 | Hinks et al. |
| 5,689,663 A | 11/1997 | Williams |
| 5,715,450 A | 2/1998 | Ambrose et al. |
| 5,732,192 A | 3/1998 | Malin et al. |
| 5,754,740 A | 5/1998 | Fukuoka et al. |
| 5,761,063 A | 6/1998 | Jannelle et al. |
| 5,761,673 A | 6/1998 | Bookman et al. |
| 5,765,140 A | 6/1998 | Knudson et al. |
| 5,768,480 A | 6/1998 | Crawford, Jr. et al. |
| 5,788,504 A | 8/1998 | Rice et al. |
| 5,795,155 A | 8/1998 | Morrel-Samuels |
| 5,809,212 A | 9/1998 | Shasha |
| 5,815,415 A | 9/1998 | Bentley et al. |
| 5,819,243 A | 10/1998 | Rich et al. |
| 5,819,257 A | 10/1998 | Monge et al. |
| 5,822,780 A | 10/1998 | Schutzman |
| 5,825,260 A | 10/1998 | Ludwig et al. |
| 5,826,077 A | 10/1998 | Blakeley et al. |
| 5,826,239 A | 10/1998 | Du et al. |
| 5,826,250 A | 10/1998 | Trefler |
| 5,826,252 A | 10/1998 | Wolters, Jr. et al. |
| 5,829,983 A | 11/1998 | Koyama et al. |
| 5,831,607 A | 11/1998 | Brooks |
| 5,832,483 A | 11/1998 | Barker |
| 5,841,435 A | 11/1998 | Dauerer et al. |
| 5,841,673 A | 11/1998 | Kobayashi et al. |
| 5,864,865 A | 1/1999 | Lakis |
| 5,873,096 A | 2/1999 | Lim et al. |
| 5,875,334 A | 2/1999 | Chow et al. |
| 5,875,441 A | 2/1999 | Nakatsuyama et al. |
| 5,880,614 A | 3/1999 | Zinke et al. |
| 5,880,742 A | 3/1999 | Rao et al. |
| 5,886,546 A | 3/1999 | Hwang |
| 5,890,146 A | 3/1999 | Wavish et al. |
| 5,890,166 A | 3/1999 | Eisenberg et al. |
| 5,892,512 A | 4/1999 | Donnelly et al. |
| 5,907,490 A | 5/1999 | Oliver |
| 5,907,837 A | 5/1999 | Ferrel et al. |
| 5,909,213 A | 6/1999 | Martin |
| 5,910,748 A | 6/1999 | Reffay et al. |
| 5,911,138 A | 6/1999 | Li et al. |
| 5,918,222 A | 6/1999 | Fukui et al. |
| 5,920,717 A | 7/1999 | Noda |
| 5,930,795 A | 7/1999 | Chen et al. |
| 5,945,852 A | 8/1999 | Kosiec |
| 5,974,441 A | 10/1999 | Rogers et al. |
| 5,974,443 A | 10/1999 | Jeske |
| 5,978,566 A | 11/1999 | Plank et al. |
| 5,983,267 A | 11/1999 | Shklar et al. |
| 5,983,369 A | 11/1999 | Bakoglu et al. |
| 5,987,415 A | 11/1999 | Breese et al. |
| 5,990,742 A | 11/1999 | Suzuki |
| 5,995,948 A | 11/1999 | Whitford et al. |
| 5,995,958 A | 11/1999 | Xu |
| 6,008,673 A | 12/1999 | Glass et al. |
| 6,008,808 A | 12/1999 | Almeida et al. |
| 6,012,098 A | 1/2000 | Bayeh et al. |
| 6,020,768 A | 2/2000 | Lim |
| 6,023,704 A | 2/2000 | Gerard et al. |
| 6,023,714 A | 2/2000 | Hill et al. |
| 6,023,717 A | 2/2000 | Argyroudis |

(56) References Cited

U.S. PATENT DOCUMENTS

| | | |
|---|---|---|
| 6,028,457 A | 2/2000 | Tihanyi |
| 6,037,890 A | 3/2000 | Glass et al. |
| 6,044,373 A | 3/2000 | Gladney et al. |
| 6,044,466 A | 3/2000 | Anand et al. |
| 6,078,982 A | 6/2000 | Du et al. |
| 6,085,188 A | 7/2000 | Bachmann et al. |
| 6,085,198 A | 7/2000 | Skinner et al. |
| 6,091,226 A | 7/2000 | Amano |
| 6,092,036 A | 7/2000 | Hamann |
| 6,092,083 A | 7/2000 | Brodersen et al. |
| 6,094,652 A | 7/2000 | Faisal |
| 6,098,172 A | 8/2000 | Coss et al. |
| 6,105,035 A | 8/2000 | Monge et al. |
| 6,108,004 A | 8/2000 | Medl |
| 6,122,632 A | 9/2000 | Botts et al. |
| 6,125,363 A | 9/2000 | Buzzeo et al. |
| 6,130,679 A | 10/2000 | Chen et al. |
| 6,137,797 A | 10/2000 | Bass et al. |
| 6,144,997 A | 11/2000 | Lamming et al. |
| 6,151,595 A | 11/2000 | Pirolli et al. |
| 6,151,624 A | 11/2000 | Teare et al. |
| 6,154,738 A | 11/2000 | Call |
| 6,167,441 A | 12/2000 | Himmel |
| 6,177,932 B1 | 1/2001 | Galdes et al. |
| 6,185,516 B1 | 2/2001 | Hardin et al. |
| 6,185,534 B1 | 2/2001 | Breese et al. |
| 6,192,371 B1 | 2/2001 | Schultz |
| 6,194,919 B1 | 2/2001 | Park |
| 6,212,502 B1 | 4/2001 | Ball et al. |
| 6,216,135 B1 | 4/2001 | Brodersen et al. |
| 6,233,332 B1 | 5/2001 | Anderson et al. |
| 6,233,617 B1 | 5/2001 | Rothwein et al. |
| 6,240,417 B1 | 5/2001 | Eastwick et al. |
| 6,243,713 B1 | 6/2001 | Nelson et al. |
| 6,246,320 B1 | 6/2001 | Monroe |
| 6,275,073 B1 | 8/2001 | Tokuhiro |
| 6,275,790 B1 | 8/2001 | Yamamoto et al. |
| 6,281,896 B1 | 8/2001 | Alimpich et al. |
| 6,282,547 B1 | 8/2001 | Hirsch |
| 6,300,947 B1 | 10/2001 | Kanevsky |
| 6,304,259 B1 | 10/2001 | DeStefano |
| 6,308,163 B1 | 10/2001 | Du et al. |
| 6,310,951 B1 | 10/2001 | Wineberg et al. |
| 6,311,324 B1 | 10/2001 | Smith et al. |
| 6,313,834 B1 | 11/2001 | Lau et al. |
| 6,314,415 B1 | 11/2001 | Mukherjee |
| 6,324,693 B1 | 11/2001 | Brodersen et al. |
| 6,330,554 B1 | 12/2001 | Altschuler et al. |
| 6,338,074 B1 | 1/2002 | Poindexter et al. |
| 6,341,277 B1 | 1/2002 | Coden et al. |
| 6,341,293 B1 | 1/2002 | Hennessey |
| 6,344,862 B1 | 2/2002 | Williams et al. |
| 6,349,238 B1 | 2/2002 | Gabbita et al. |
| 6,351,734 B1 | 2/2002 | Lautzenheiser et al. |
| 6,356,286 B1 | 3/2002 | Lawrence |
| 6,356,897 B1 | 3/2002 | Gusack |
| 6,359,633 B1 | 3/2002 | Balasubramaniam et al. |
| 6,366,299 B1 | 4/2002 | Lanning et al. |
| 6,369,819 B1 | 4/2002 | Pitkow et al. |
| 6,370,537 B1 | 4/2002 | Gilbert et al. |
| 6,380,910 B1 | 4/2002 | Moustakas et al. |
| 6,380,947 B1 | 4/2002 | Stead |
| 6,381,738 B1 | 4/2002 | Choi et al. |
| 6,389,460 B1 | 5/2002 | Stewart et al. |
| 6,389,510 B1 | 5/2002 | Chen et al. |
| 6,393,605 B1 | 5/2002 | Loomans |
| 6,396,885 B1 | 5/2002 | Ding et al. |
| 6,405,211 B1 | 6/2002 | Sokol et al. |
| 6,405,251 B1 | 6/2002 | Bullard et al. |
| 6,415,259 B1 | 7/2002 | Wolfinger et al. |
| 6,415,283 B1 | 7/2002 | Conklin |
| 6,418,448 B1 | 7/2002 | Sarkar |
| 6,421,571 B1 | 7/2002 | Spriggs et al. |
| 6,426,723 B1 | 7/2002 | Smith et al. |
| 6,429,870 B1 | 8/2002 | Chen et al. |
| 6,430,571 B1 | 8/2002 | Doan et al. |
| 6,430,574 B1 | 8/2002 | Stead |
| 6,437,799 B1 | 8/2002 | Shinomi et al. |
| 6,446,065 B1 | 9/2002 | Nishioka et al. |
| 6,446,089 B1 | 9/2002 | Brodersen et al. |
| 6,446,200 B1 | 9/2002 | Ball et al. |
| 6,446,256 B1 | 9/2002 | Hyman et al. |
| 6,448,964 B1 | 9/2002 | Isaacs et al. |
| 6,453,038 B1 | 9/2002 | McFarlane et al. |
| 6,463,346 B1 | 10/2002 | Flockhart et al. |
| 6,463,440 B1 | 10/2002 | Hind et al. |
| 6,469,715 B1 | 10/2002 | Carter et al. |
| 6,469,716 B1 | 10/2002 | Carter et al. |
| 6,473,467 B1 | 10/2002 | Wallace et al. |
| 6,473,748 B1 | 10/2002 | Archer |
| 6,493,331 B1 | 12/2002 | Walton et al. |
| 6,493,399 B1 | 12/2002 | Xia et al. |
| 6,493,731 B1 | 12/2002 | Jones et al. |
| 6,493,754 B1 | 12/2002 | Rosborough et al. |
| 6,496,812 B1 | 12/2002 | Campaigne et al. |
| 6,496,833 B1 | 12/2002 | Goldberg et al. |
| 6,502,239 B2 | 12/2002 | Zgarba et al. |
| 6,509,898 B2 | 1/2003 | Chi et al. |
| 6,513,018 B1 | 1/2003 | Culhane |
| 6,526,440 B1 | 2/2003 | Bharat |
| 6,526,457 B1 | 2/2003 | Birze |
| 6,529,217 B1 | 3/2003 | Maguire, III et al. |
| 6,529,899 B1 | 3/2003 | Kraft et al. |
| 6,529,900 B1 | 3/2003 | Patterson et al. |
| 6,530,079 B1 | 3/2003 | Choi et al. |
| 6,532,474 B2 | 3/2003 | Iwamoto et al. |
| 6,539,374 B2 | 3/2003 | Jung |
| 6,542,912 B2 | 4/2003 | Meltzer et al. |
| 6,546,381 B1 | 4/2003 | Subramanian et al. |
| 6,546,406 B1 | 4/2003 | DeRose et al. |
| 6,549,904 B1 | 4/2003 | Ortega et al. |
| 6,556,226 B2 | 4/2003 | Gould et al. |
| 6,556,983 B1 | 4/2003 | Altschuler et al. |
| 6,556,985 B1 | 4/2003 | Karch |
| 6,559,864 B1 | 5/2003 | Olin |
| 6,560,592 B1 | 5/2003 | Reid et al. |
| 6,560,649 B1 | 5/2003 | Mullen et al. |
| 6,567,419 B1 | 5/2003 | Yarlagadda |
| 6,571,222 B1 | 5/2003 | Matsumoto et al. |
| 6,577,769 B1 | 6/2003 | Kenyon et al. |
| 6,583,800 B1 | 6/2003 | Ridgley et al. |
| 6,584,464 B1 | 6/2003 | Warthen |
| 6,584,569 B2 | 6/2003 | Reshef et al. |
| 6,594,662 B1 | 7/2003 | Sieffert et al. |
| 6,597,381 B1 | 7/2003 | Eskridge et al. |
| 6,597,775 B2 | 7/2003 | Lawyer et al. |
| 6,598,043 B1 | 7/2003 | Baclawski |
| 6,606,613 B1 | 8/2003 | Altschuler et al. |
| 6,625,657 B1 | 9/2003 | Bullard |
| 6,629,138 B1 | 9/2003 | Lambert et al. |
| 6,636,850 B2 | 10/2003 | Lepien |
| 6,636,901 B2 | 10/2003 | Sudhakaran et al. |
| 6,643,638 B1 | 11/2003 | Xu |
| 6,643,652 B2 | 11/2003 | Helgeson et al. |
| 6,661,889 B1 | 12/2003 | Flockhart et al. |
| 6,661,908 B1 | 12/2003 | Suchard et al. |
| 6,678,679 B1 | 1/2004 | Bradford |
| 6,678,773 B2 | 1/2004 | Marietta et al. |
| 6,678,882 B1 | 1/2004 | Hurley et al. |
| 6,684,261 B1 | 1/2004 | Orton et al. |
| 6,690,788 B1 | 2/2004 | Bauer et al. |
| 6,691,067 B1 | 2/2004 | Ding et al. |
| 6,691,230 B1 | 2/2004 | Bardon |
| 6,701,314 B1 | 3/2004 | Conover et al. |
| 6,711,565 B1 | 3/2004 | Subramaniam et al. |
| 6,721,747 B2 | 4/2004 | Lipkin |
| 6,728,702 B1 | 4/2004 | Subramaniam et al. |
| 6,728,852 B1 | 4/2004 | Stoutamire |
| 6,732,095 B1 | 5/2004 | Warshaysky et al. |
| 6,732,111 B2 | 5/2004 | Brodersen et al. |
| 6,748,422 B2 | 6/2004 | Morin et al. |
| 6,750,858 B1 | 6/2004 | Rosenstein |
| 6,751,663 B1 | 6/2004 | Farrell et al. |
| 6,754,475 B1 | 6/2004 | Harrison et al. |

(56) References Cited

U.S. PATENT DOCUMENTS

| | | |
|---|---|---|
| 6,756,994 B1 | 6/2004 | Tlaskal |
| 6,763,351 B1 | 7/2004 | Subramaniam et al. |
| 6,771,706 B2 | 8/2004 | Ling et al. |
| 6,772,148 B2 | 8/2004 | Baclawski |
| 6,772,350 B1 | 8/2004 | Belani et al. |
| 6,778,971 B1 | 8/2004 | Altschuler et al. |
| 6,782,091 B1 | 8/2004 | Dunning, III |
| 6,785,341 B2 | 8/2004 | Walton et al. |
| 6,788,114 B1 | 9/2004 | Krenzke et al. |
| 6,792,420 B2 | 9/2004 | Chen et al. |
| RE38,633 E | 10/2004 | Srinivasan |
| 6,804,330 B1 | 10/2004 | Jones et al. |
| 6,807,632 B1 | 10/2004 | Carpentier et al. |
| 6,810,429 B1 | 10/2004 | Walsh et al. |
| 6,820,082 B1 | 11/2004 | Cook et al. |
| 6,829,655 B1 | 12/2004 | Huang et al. |
| 6,831,668 B2 | 12/2004 | Cras et al. |
| 6,836,275 B1 | 12/2004 | Arquie et al. |
| 6,839,682 B1 | 1/2005 | Blume et al. |
| 6,847,982 B2 | 1/2005 | Parker et al. |
| 6,851,089 B1 | 2/2005 | Erickson et al. |
| 6,856,575 B2 | 2/2005 | Jones |
| 6,856,992 B2 | 2/2005 | Britton et al. |
| 6,859,787 B2 | 2/2005 | Fisher et al. |
| 6,865,546 B1 | 3/2005 | Song |
| 6,865,566 B2 | 3/2005 | Serrano-Morales et al. |
| 6,865,575 B1 | 3/2005 | Smith et al. |
| 6,867,789 B1 | 3/2005 | Allen et al. |
| 6,918,222 B2 | 7/2005 | Lat et al. |
| 6,920,615 B1 | 7/2005 | Campbell et al. |
| 6,925,457 B2 | 8/2005 | Britton et al. |
| 6,925,609 B1 | 8/2005 | Lucke |
| 6,927,728 B2 | 8/2005 | Vook et al. |
| 6,934,702 B2 | 8/2005 | Faybishenko et al. |
| 6,940,917 B2 | 9/2005 | Menon et al. |
| 6,944,644 B2 | 9/2005 | Gideon |
| 6,954,737 B2 | 10/2005 | Kalantar et al. |
| 6,956,845 B2 | 10/2005 | Baker et al. |
| 6,959,432 B2 | 10/2005 | Crocker |
| 6,961,725 B2 | 11/2005 | Yuan et al. |
| 6,965,889 B2 | 11/2005 | Serrano-Morales et al. |
| 6,966,033 B1 | 11/2005 | Gasser et al. |
| 6,976,144 B1 | 12/2005 | Trefler et al. |
| 6,978,719 B2 | 12/2005 | Sebata et al. |
| 6,985,912 B2 | 1/2006 | Mullins et al. |
| 6,991,153 B2 | 1/2006 | Silverbrook et al. |
| 7,020,869 B2 | 3/2006 | Abrari et al. |
| 7,020,882 B1 | 3/2006 | Lewallen |
| 7,028,225 B2 | 4/2006 | Maso et al. |
| 7,031,901 B2 | 4/2006 | Abu |
| 7,035,808 B1 | 4/2006 | Ford |
| 7,058,367 B1 | 6/2006 | Luo et al. |
| 7,058,637 B2 | 6/2006 | Britton et al. |
| 7,064,766 B2 | 6/2006 | Beda et al. |
| 7,073,177 B2 | 7/2006 | Foote et al. |
| 7,076,558 B1 | 7/2006 | Dunn |
| 7,089,193 B2 | 8/2006 | Newbold |
| 7,103,173 B2 | 9/2006 | Rodenbusch et al. |
| 7,124,145 B2 | 10/2006 | Surasinghe |
| 7,139,999 B2 | 11/2006 | Bowman-Amuah |
| 7,143,116 B2 | 11/2006 | Okitsu et al. |
| 7,171,145 B2 | 1/2007 | Takeuchi et al. |
| 7,171,415 B2 | 1/2007 | Kan et al. |
| 7,174,514 B2 | 2/2007 | Subramaniam et al. |
| 7,178,109 B2 | 2/2007 | Hewson et al. |
| 7,194,380 B2 | 3/2007 | Barrow et al. |
| 7,194,690 B2 | 3/2007 | Guillermo et al. |
| 7,289,793 B2 | 10/2007 | Norwood et al. |
| RE39,918 E | 11/2007 | Slemmer |
| 7,302,417 B2 | 11/2007 | Iyer |
| 7,318,020 B1 | 1/2008 | Kim |
| 7,318,066 B2 | 1/2008 | Kaufman et al. |
| 7,334,039 B1 | 2/2008 | Majkut et al. |
| 7,343,295 B2 | 3/2008 | Pomerance |
| 7,353,229 B2 | 4/2008 | Vilcauskas, Jr. et al. |
| 7,398,391 B2 | 7/2008 | Carpentier et al. |
| 7,406,475 B2 | 7/2008 | Dorne et al. |
| 7,412,388 B2 | 8/2008 | Dalal et al. |
| 7,415,731 B2 | 8/2008 | Carpentier et al. |
| 7,505,827 B1 | 3/2009 | Boddy et al. |
| 7,526,481 B1 | 4/2009 | Cusson et al. |
| 7,536,294 B1 | 5/2009 | Stanz et al. |
| 7,555,645 B2 | 6/2009 | Vissapragada |
| 7,574,494 B1 | 8/2009 | Mayemia et al. |
| 7,596,504 B2 | 9/2009 | Hughes et al. |
| 7,640,222 B2 | 12/2009 | Trefler |
| 7,647,417 B1 | 1/2010 | Taneja |
| 7,665,063 B1 | 2/2010 | Hofmann et al. |
| 7,685,013 B2 | 3/2010 | Gendler |
| 7,689,447 B1 | 3/2010 | Aboujaoude et al. |
| 7,711,919 B2 | 5/2010 | Trefler et al. |
| 7,779,395 B1 | 8/2010 | Chotin et al. |
| 7,783,596 B2 | 8/2010 | Smolen et al. |
| 7,787,609 B1 | 8/2010 | Flockhart et al. |
| 7,791,559 B2 | 9/2010 | Piasecki |
| 7,818,506 B1 | 10/2010 | Shepstone et al. |
| 7,844,594 B1 | 11/2010 | Holt et al. |
| 7,870,244 B2 | 1/2011 | Chong et al. |
| 7,889,896 B2 | 2/2011 | Roehrig et al. |
| 7,937,690 B2 | 5/2011 | Casey |
| 7,971,180 B2 | 6/2011 | Kreamer et al. |
| 7,974,714 B2 | 7/2011 | Hoffberg |
| 7,983,895 B2 | 7/2011 | McEntee et al. |
| 8,001,519 B2 | 8/2011 | Conallen et al. |
| 8,037,329 B2 | 10/2011 | Leech et al. |
| 8,073,802 B2 | 12/2011 | Trefler |
| 8,250,525 B2 | 8/2012 | Khatutsky |
| 8,335,704 B2 | 12/2012 | Trefler et al. |
| 8,386,960 B1 | 2/2013 | Eismann et al. |
| 8,468,492 B1 | 6/2013 | Frenkel |
| 8,479,157 B2 | 7/2013 | Trefler et al. |
| 8,516,193 B1 | 8/2013 | Clinton et al. |
| 8,739,044 B1 | 5/2014 | Varadarajan |
| 8,744,999 B2 | 6/2014 | Clarke et al. |
| 8,843,435 B1 | 9/2014 | Trefler et al. |
| 8,863,008 B2 | 10/2014 | Chan et al. |
| 8,880,487 B1 | 11/2014 | Clinton et al. |
| 8,924,335 B1 | 12/2014 | Trefler et al. |
| 8,959,480 B2 | 2/2015 | Trefler et al. |
| 9,026,733 B1 | 5/2015 | Clinton et al. |
| 9,189,361 B2 | 11/2015 | Khatutsky |
| 9,195,936 B1 | 11/2015 | Chase |
| 9,270,743 B2 | 2/2016 | Frenkel |
| 9,495,340 B2 | 11/2016 | Powell et al. |
| 9,678,719 B1 | 6/2017 | Frenkel |
| 2001/0013799 A1 | 8/2001 | Wang |
| 2001/0035777 A1 | 11/2001 | Wang et al. |
| 2001/0047355 A1 | 11/2001 | Anwar |
| 2001/0049682 A1 | 12/2001 | Vincent et al. |
| 2001/0052108 A1 | 12/2001 | Bowman-Amuah |
| 2001/0054064 A1 | 12/2001 | Kannan |
| 2002/0010855 A1 | 1/2002 | Reshef et al. |
| 2002/0013804 A1 | 1/2002 | Gideon |
| 2002/0029161 A1 | 3/2002 | Brodersen et al. |
| 2002/0042831 A1 | 4/2002 | Capone et al. |
| 2002/0049603 A1 | 4/2002 | Mehra et al. |
| 2002/0049715 A1 | 4/2002 | Serrano-Morales et al. |
| 2002/0049788 A1 | 4/2002 | Lipkin et al. |
| 2002/0054152 A1 | 5/2002 | Palaniappan et al. |
| 2002/0059566 A1 | 5/2002 | Delcambre et al. |
| 2002/0065912 A1 | 5/2002 | Catchpole et al. |
| 2002/0070972 A1 | 6/2002 | Windl et al. |
| 2002/0073337 A1 | 6/2002 | Ioele et al. |
| 2002/0083063 A1 | 6/2002 | Egolf |
| 2002/0091677 A1 | 7/2002 | Sridhar |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0093537 A1 | 7/2002 | Bocioned et al. |
| 2002/0107684 A1 | 8/2002 | Gao |
| 2002/0118688 A1 | 8/2002 | Jagannathan |
| 2002/0120598 A1 | 8/2002 | Shadmon et al. |
| 2002/0120627 A1 | 8/2002 | Mankoff |
| 2002/0120762 A1 | 8/2002 | Cheng et al. |

(56) References Cited

U.S. PATENT DOCUMENTS

| | | |
|---|---|---|
| 2002/0133502 A1 | 9/2002 | Rosenthal et al. |
| 2002/0177232 A1 | 11/2002 | Melker et al. |
| 2002/0178232 A1 | 11/2002 | Ferguson |
| 2002/0181692 A1 | 12/2002 | Flockhart et al. |
| 2002/0184610 A1 | 12/2002 | Chong et al. |
| 2002/0186826 A1 | 12/2002 | Hsu et al. |
| 2002/0198935 A1 | 12/2002 | Crandall et al. |
| 2003/0001894 A1 | 1/2003 | Boykin et al. |
| 2003/0004934 A1 | 1/2003 | Qian |
| 2003/0004951 A1 | 1/2003 | Chokshi |
| 2003/0009239 A1 | 1/2003 | Lombardo et al. |
| 2003/0014399 A1 | 1/2003 | Hansen et al. |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |
| 2003/0061209 A1 | 3/2003 | Raboczi et al. |
| 2003/0065544 A1 | 4/2003 | Elzinga et al. |
| 2003/0066031 A1 | 4/2003 | Laane |
| 2003/0074352 A1 | 4/2003 | Raboczi et al. |
| 2003/0074369 A1 | 4/2003 | Scheutze et al. |
| 2003/0084401 A1 | 5/2003 | Abel et al. |
| 2003/0093279 A1 | 5/2003 | Malah et al. |
| 2003/0098991 A1 | 5/2003 | Laverty et al. |
| 2003/0109951 A1 | 6/2003 | Hsiung et al. |
| 2003/0115281 A1 | 6/2003 | McHenry et al. |
| 2003/0135358 A1 | 7/2003 | Lissauer et al. |
| 2003/0152212 A1 | 8/2003 | Burok et al. |
| 2003/0154380 A1 | 8/2003 | Richmond et al. |
| 2003/0191626 A1 | 10/2003 | Al-Onaizan et al. |
| 2003/0198337 A1 | 10/2003 | Lenard |
| 2003/0200254 A1 | 10/2003 | Wei |
| 2003/0200371 A1 | 10/2003 | Abujbara |
| 2003/0202617 A1 | 10/2003 | Casper |
| 2003/0222680 A1 | 12/2003 | Jaussi |
| 2003/0229529 A1 | 12/2003 | Mui et al. |
| 2003/0229544 A1 | 12/2003 | Veres et al. |
| 2004/0003043 A1 | 1/2004 | Rajamony et al. |
| 2004/0021686 A1 | 2/2004 | Barberis |
| 2004/0024603 A1 | 2/2004 | Mahoney et al. |
| 2004/0034651 A1 | 2/2004 | Gupta et al. |
| 2004/0049479 A1 | 3/2004 | Dorne et al. |
| 2004/0049509 A1 | 3/2004 | Keller et al. |
| 2004/0049580 A1 | 3/2004 | Boyd et al. |
| 2004/0054610 A1 | 3/2004 | Amstutz et al. |
| 2004/0064552 A1 | 4/2004 | Chong et al. |
| 2004/0068517 A1 | 4/2004 | Scott |
| 2004/0088199 A1 | 5/2004 | Childress et al. |
| 2004/0103014 A1 | 5/2004 | Teegan et al. |
| 2004/0117759 A1 | 6/2004 | Ripped et al. |
| 2004/0122652 A1 | 6/2004 | Andrews et al. |
| 2004/0133416 A1 | 7/2004 | Fukuoka et al. |
| 2004/0133876 A1 | 7/2004 | Sproule |
| 2004/0139021 A1 | 7/2004 | Reed et al. |
| 2004/0145607 A1 | 7/2004 | Alderson |
| 2004/0147138 A1 | 7/2004 | Vaartstra |
| 2004/0148152 A1 | 7/2004 | Horikawa |
| 2004/0148586 A1 | 7/2004 | Gilboa |
| 2004/0162812 A1 | 8/2004 | Lane et al. |
| 2004/0162822 A1 | 8/2004 | Papanyan et al. |
| 2004/0167765 A1 | 8/2004 | Abu |
| 2004/0205672 A1 | 10/2004 | Bates et al. |
| 2004/0220792 A1 | 11/2004 | Gallanis et al. |
| 2004/0236566 A1 | 11/2004 | Simske |
| 2004/0243587 A1 | 12/2004 | Nuyens et al. |
| 2004/0268221 A1 | 12/2004 | Wang |
| 2004/0268299 A1 | 12/2004 | Lei et al. |
| 2005/0027563 A1 | 2/2005 | Fackler et al. |
| 2005/0027871 A1 | 2/2005 | Bradley et al. |
| 2005/0039191 A1 | 2/2005 | Hewson et al. |
| 2005/0044198 A1 | 2/2005 | Okitsu et al. |
| 2005/0050000 A1 | 3/2005 | Kwok et al. |
| 2005/0055330 A1 | 3/2005 | Britton et al. |
| 2005/0059566 A1 | 3/2005 | Brown et al. |
| 2005/0060372 A1 | 3/2005 | DeBettencourt et al. |
| 2005/0071211 A1 | 3/2005 | Flockhart et al. |
| 2005/0096959 A1 | 5/2005 | Kumar et al. |
| 2005/0104628 A1 | 5/2005 | Tanzawa et al. |
| 2005/0125683 A1 | 6/2005 | Matsuyama et al. |
| 2005/0132048 A1 | 6/2005 | Kogan et al. |
| 2005/0138162 A1 | 6/2005 | Byrnes |
| 2005/0144023 A1 | 6/2005 | Aboujaoude et al. |
| 2005/0165823 A1 | 7/2005 | Ondrusek et al. |
| 2005/0198021 A1 | 9/2005 | Wilcox et al. |
| 2005/0216235 A1 | 9/2005 | Butt et al. |
| 2005/0222889 A1 | 10/2005 | Lai et al. |
| 2005/0228875 A1 | 10/2005 | Monitzer et al. |
| 2005/0234882 A1 | 10/2005 | Bennett et al. |
| 2005/0267770 A1 | 12/2005 | Banavar et al. |
| 2005/0288920 A1 | 12/2005 | Green et al. |
| 2006/0004845 A1 | 1/2006 | Kristiansen et al. |
| 2006/0015388 A1 | 1/2006 | Flockhart et al. |
| 2006/0020783 A1 | 1/2006 | Fisher |
| 2006/0041861 A1 | 2/2006 | Trefler et al. |
| 2006/0053125 A1 | 3/2006 | Scott |
| 2006/0063138 A1 | 3/2006 | Loff et al. |
| 2006/0064486 A1 | 3/2006 | Baron et al. |
| 2006/0064667 A1 | 3/2006 | Freitas |
| 2006/0075360 A1 | 4/2006 | Bixler |
| 2006/0080082 A1 | 4/2006 | Ravindra et al. |
| 2006/0080401 A1 | 4/2006 | Gill et al. |
| 2006/0092467 A1 | 5/2006 | Dumitrescu et al. |
| 2006/0100847 A1 | 5/2006 | McEntee et al. |
| 2006/0101386 A1 | 5/2006 | Gerken et al. |
| 2006/0101393 A1 | 5/2006 | Gerken et al. |
| 2006/0106846 A1 | 5/2006 | Schulz et al. |
| 2006/0139312 A1 | 6/2006 | Sinclair et al. |
| 2006/0149751 A1 | 7/2006 | Jade et al. |
| 2006/0167655 A1 | 7/2006 | Barrow et al. |
| 2006/0173724 A1 | 8/2006 | Trefler et al. |
| 2006/0173871 A1 | 8/2006 | Taniguchi et al. |
| 2006/0206303 A1 | 9/2006 | Kohlmeier et al. |
| 2006/0206305 A1 | 9/2006 | Kimura et al. |
| 2006/0209085 A1 | 9/2006 | Wong et al. |
| 2006/0218166 A1 | 9/2006 | Myers et al. |
| 2006/0271559 A1 | 11/2006 | Stavrakos et al. |
| 2006/0271920 A1 | 11/2006 | Abouelsaadat |
| 2006/0288348 A1 | 12/2006 | Kawamoto et al. |
| 2007/0005623 A1 | 1/2007 | Self et al. |
| 2007/0010991 A1 | 1/2007 | Lei et al. |
| 2007/0028225 A1 | 2/2007 | Whittaker et al. |
| 2007/0038765 A1 | 2/2007 | Dunn |
| 2007/0055938 A1 | 3/2007 | Herring et al. |
| 2007/0061789 A1 | 3/2007 | Kaneko et al. |
| 2007/0094199 A1 | 4/2007 | Deshpande et al. |
| 2007/0100782 A1 | 5/2007 | Reed et al. |
| 2007/0118497 A1 | 5/2007 | Katoh |
| 2007/0130130 A1 | 6/2007 | Chan et al. |
| 2007/0136068 A1 | 6/2007 | Horvitz |
| 2007/0143163 A1 | 6/2007 | Weiss et al. |
| 2007/0143851 A1 | 6/2007 | Nicodemus et al. |
| 2007/0203756 A1 | 8/2007 | Sears et al. |
| 2007/0208553 A1 | 9/2007 | Hastings et al. |
| 2007/0226031 A1 | 9/2007 | Manson et al. |
| 2007/0233902 A1 | 10/2007 | Trefler et al. |
| 2007/0239646 A1 | 10/2007 | Trefler |
| 2007/0245300 A1 | 10/2007 | Chan et al. |
| 2007/0260584 A1 | 11/2007 | Marti et al. |
| 2007/0294644 A1 | 12/2007 | Yost |
| 2008/0002823 A1 | 1/2008 | Fama et al. |
| 2008/0046462 A1 | 2/2008 | Kaufman et al. |
| 2008/0077384 A1 | 3/2008 | Agapi et al. |
| 2008/0085502 A1 | 4/2008 | Allen et al. |
| 2008/0109467 A1 | 5/2008 | Brookins et al. |
| 2008/0120593 A1 | 5/2008 | Keren et al. |
| 2008/0163253 A1 | 7/2008 | Massmann et al. |
| 2008/0184230 A1 | 7/2008 | Leech et al. |
| 2008/0189679 A1 | 8/2008 | Rodriguez et al. |
| 2008/0195377 A1 | 8/2008 | Kato et al. |
| 2008/0196003 A1 | 8/2008 | Gerken et al. |
| 2008/0208785 A1 | 8/2008 | Trefler et al. |
| 2008/0216055 A1 | 9/2008 | Khatutsky |
| 2008/0216060 A1 | 9/2008 | Vargas |
| 2008/0263510 A1 | 10/2008 | Nerome et al. |

(56) References Cited

U.S. PATENT DOCUMENTS

| | | |
|---|---|---|
| 2009/0007084 A1 | 1/2009 | Conallen et al. |
| 2009/0018998 A1 | 1/2009 | Patten, Jr. et al. |
| 2009/0075634 A1 | 3/2009 | Sinclair et al. |
| 2009/0083697 A1 | 3/2009 | Zhang et al. |
| 2009/0132232 A1 | 5/2009 | Trefler |
| 2009/0132996 A1 | 5/2009 | Eldridge et al. |
| 2009/0138844 A1 | 5/2009 | Halberstadt et al. |
| 2009/0150541 A1 | 6/2009 | Georgis |
| 2009/0158407 A1 | 6/2009 | Nicodemus et al. |
| 2009/0164494 A1 | 6/2009 | Dodin |
| 2009/0171938 A1 | 7/2009 | Levin et al. |
| 2009/0199123 A1 | 8/2009 | Albertson et al. |
| 2009/0228786 A1 | 9/2009 | Danton et al. |
| 2009/0271708 A1 | 10/2009 | Peters et al. |
| 2009/0276206 A1 | 11/2009 | Fitzpatrick et al. |
| 2009/0282384 A1 | 11/2009 | Keppler |
| 2009/0319948 A1 | 12/2009 | Stannard et al. |
| 2010/0011338 A1 | 1/2010 | Lewis |
| 2010/0083135 A1 | 4/2010 | Zawacki et al. |
| 2010/0088266 A1 | 4/2010 | Trefler et al. |
| 2010/0107137 A1 | 4/2010 | Trefler et al. |
| 2010/0217737 A1 | 8/2010 | Shama |
| 2011/0066486 A1 | 3/2011 | Bassin et al. |
| 2011/0148791 A1 | 6/2011 | Luu |
| 2011/0239113 A1 | 9/2011 | Hung et al. |
| 2011/0252305 A1 | 10/2011 | Tschani et al. |
| 2011/0264251 A1 | 10/2011 | Copello et al. |
| 2012/0041921 A1 | 2/2012 | Canaday et al. |
| 2012/0102420 A1 | 4/2012 | Fukahori |
| 2012/0272186 A1 | 10/2012 | Kraut |
| 2012/0293558 A1 | 11/2012 | Dilts |
| 2013/0007267 A1 | 1/2013 | Khatutsky |
| 2013/0031455 A1 | 1/2013 | Griffiths et al. |
| 2013/0047165 A1 | 2/2013 | Goetz et al. |
| 2013/0067392 A1 | 3/2013 | Leonard et al. |
| 2013/0135294 A1 | 5/2013 | An |
| 2013/0159904 A1 | 6/2013 | Kelappan et al. |
| 2013/0167245 A1 | 6/2013 | Birtwhistle et al. |
| 2013/0179816 A1 | 7/2013 | Seo et al. |
| 2013/0231970 A1 | 9/2013 | Trefler et al. |
| 2013/0254833 A1 | 9/2013 | Nicodemus et al. |
| 2013/0290249 A1 | 10/2013 | Merriman et al. |
| 2014/0019400 A1 | 1/2014 | Trefler et al. |
| 2014/0089819 A1 | 3/2014 | Andler et al. |
| 2014/0125577 A1 | 5/2014 | Hoang et al. |
| 2014/0137019 A1 | 5/2014 | Paulsen et al. |
| 2014/0277164 A1 | 9/2014 | Ramsay et al. |
| 2015/0058772 A1 | 2/2015 | Bator et al. |
| 2015/0089406 A1 | 3/2015 | Trefler et al. |
| 2015/0127736 A1 | 5/2015 | Clinton et al. |
| 2016/0041961 A1 | 2/2016 | Romney |
| 2016/0062963 A1 | 3/2016 | Umapathy |
| 2016/0070560 A1 | 3/2016 | Chase |
| 2016/0085809 A1* | 3/2016 | de Castro Alves ............ G06F 17/30516 707/736 |
| 2016/0098298 A1 | 4/2016 | Trefler et al. |
| 2016/0105370 A1 | 4/2016 | Mellor et al. |
| 2017/0013073 A1 | 1/2017 | Mendez et al. |
| 2017/0255341 A1 | 9/2017 | Trefler et al. |
| 2017/0351425 A1 | 12/2017 | D'angelo et al. |
| 2017/0357703 A1* | 12/2017 | Theimer ............ G06F 17/30569 |
| 2018/0011678 A1 | 1/2018 | Shipper et al. |
| 2018/0024901 A1 | 1/2018 | Tankersley et al. |

FOREIGN PATENT DOCUMENTS

| | | |
|---|---|---|
| EP | 0 669 717 A1 | 8/1995 |
| EP | 0 996 916 A1 | 5/2000 |
| EP | 1 015 997 A2 | 7/2000 |
| EP | 1 019 807 A2 | 7/2000 |
| EP | 1 073 955 A1 | 2/2001 |
| EP | 1 073 992 A1 | 2/2001 |
| EP | 1 135 723 A1 | 9/2001 |
| EP | 1 163 604 A2 | 12/2001 |
| EP | 1 183 636 A1 | 3/2002 |
| EP | 1 196 882 A1 | 4/2002 |
| EP | 1 203 310 A1 | 5/2002 |
| EP | 1 208 482 A1 | 5/2002 |
| EP | 1 212 668 A2 | 6/2002 |
| EP | 1 240 592 A1 | 9/2002 |
| EP | 1 277 102 A2 | 1/2003 |
| EP | 1 277 119 A1 | 1/2003 |
| EP | 1 277 120 A1 | 1/2003 |
| EP | 1 277 153 A1 | 1/2003 |
| EP | 1 277 155 A1 | 1/2003 |
| EP | 1 277 329 A1 | 1/2003 |
| EP | 1 374 083 A1 | 1/2004 |
| EP | 1 382 030 A2 | 1/2004 |
| EP | 1 386 241 A1 | 2/2004 |
| EP | 1 393 172 A2 | 3/2004 |
| EP | 1 393 188 A1 | 3/2004 |
| EP | 1 402 336 A2 | 3/2004 |
| EP | 1 407 384 A1 | 4/2004 |
| EP | 1 430 396 A1 | 6/2004 |
| EP | 1 438 649 A1 | 7/2004 |
| EP | 1 438 654 A1 | 7/2004 |
| EP | 1 438 672 A1 | 7/2004 |
| EP | 1 483 685 A1 | 12/2004 |
| EP | 1 490 747 A1 | 12/2004 |
| EP | 1 490 809 A1 | 12/2004 |
| EP | 1 492 232 A1 | 12/2004 |
| EP | 1 782 183 A2 | 5/2007 |
| EP | 1 830 312 A1 | 9/2007 |
| EP | 1 840 803 A1 | 10/2007 |
| EP | 2 115 581 A1 | 11/2009 |
| WO | 98/38564 A2 | 9/1998 |
| WO | 98/40807 A2 | 9/1998 |
| WO | 99/05632 A1 | 2/1999 |
| WO | 99/45465 A1 | 9/1999 |
| WO | 99/50784 A1 | 10/1999 |
| WO | 00/33187 A1 | 6/2000 |
| WO | 00/33217 A1 | 6/2000 |
| WO | 00/33226 A1 | 6/2000 |
| WO | 00/33235 A1 | 6/2000 |
| WO | 00/33238 A2 | 6/2000 |
| WO | 03/058504 A1 | 7/2000 |
| WO | 00/52553 A2 | 9/2000 |
| WO | 00/52603 A1 | 9/2000 |
| WO | 00/67194 A2 | 11/2000 |
| WO | 02/088869 A2 | 11/2000 |
| WO | 01/40958 A1 | 6/2001 |
| WO | 01/75610 A1 | 10/2001 |
| WO | 01/75614 A1 | 10/2001 |
| WO | 01/75747 A1 | 10/2001 |
| WO | 01/75748 A1 | 10/2001 |
| WO | 01/76206 A1 | 10/2001 |
| WO | 01/77787 A2 | 10/2001 |
| WO | 01/79994 A2 | 10/2001 |
| WO | 02/21254 A2 | 3/2002 |
| WO | 02/44947 A2 | 6/2002 |
| WO | 02/056249 A2 | 7/2002 |
| WO | 02/080006 A1 | 10/2002 |
| WO | 02/080015 A1 | 10/2002 |
| WO | 02/082300 A1 | 10/2002 |
| WO | 02/084925 A2 | 10/2002 |
| WO | 02/091346 A1 | 11/2002 |
| WO | 02/101517 A2 | 12/2002 |
| WO | 2/103576 A1 | 12/2002 |
| WO | 02/19131 A8 | 1/2003 |
| WO | 03/021393 A2 | 3/2003 |
| WO | 03/029923 A2 | 4/2003 |
| WO | 03/029955 A1 | 4/2003 |
| WO | 03/030005 A1 | 4/2003 |
| WO | 03/030013 A1 | 4/2003 |
| WO | 03/030014 A1 | 4/2003 |
| WO | 03/069500 A1 | 6/2003 |
| WO | 03/071380 A1 | 8/2003 |
| WO | 03/071388 A2 | 8/2003 |
| WO | 03/073319 A2 | 9/2003 |
| WO | 03/077139 A1 | 9/2003 |
| WO | 03/085503 A1 | 10/2003 |
| WO | 03/085580 A1 | 10/2003 |

(56) References Cited

FOREIGN PATENT DOCUMENTS

| WO | 2004/001613 | A1 | 12/2003 |
|---|---|---|---|
| WO | 2004/003766 | A1 | 1/2004 |
| WO | 2004/003885 | A1 | 1/2004 |
| WO | 20041003684 | A2 | 1/2004 |
| WO | 2004/046882 | A2 | 6/2004 |
| WO | 2004/061815 | A1 | 7/2004 |
| WO | 2004/086198 | A2 | 10/2004 |
| WO | 20041086197 | A2 | 10/2004 |
| WO | 2004/095207 | A2 | 11/2004 |
| WO | 2004/095208 | A2 | 11/2004 |
| WO | 2004/114147 | A1 | 12/2004 |
| WO | 2005/001627 | A2 | 1/2005 |
| WO | 2005/003888 | A2 | 1/2005 |
| WO | 2005/010645 | A2 | 2/2005 |
| WO | 2005/117549 | A2 | 12/2005 |
| WO | 2006/081536 | A2 | 8/2006 |
| WO | 2007/033922 | A2 | 3/2007 |
| WO | 2008/109441 | A1 | 9/2008 |
| WO | 2009/097384 | A1 | 8/2009 |

OTHER PUBLICATIONS

Simpson, Alan, et al., Access 97 for Windows 95/NT; 1997 SYBEX; 16 pages; USPTO STIC-EIC 2100/2400.

Ceri, S., et al., WIDE—A distributed architecture for workflow management. Proceedings. Seventh International Workshop on Research Issues in Data Engineering, IEEE, 1997, pp. 76-79, 1997.

Deelman, E., et al., Workflows and e-science: An overview of workflow system features and capabilities. Future Generation Computer Systems, May 2009, vol. 25, issue 5, pp. 528-540.

Kappel, G., et al., TriGSflow active object-oriented workflow management. Proceedings of the 28th Annual Hawaii International Conference on System Sciences. 1995, pp. 727-736.

Manolescu, D.A., et al., Dynamic object model and adaptive workflow. Proceedings of Metadata and Active Object-Model Pattern Mining Workshop co-located with OOPSLA, 1999, vol. 99, 19 pages.

Schulze, W., Fitting the workflow management facility into the object management architecture. Business Object Design and Implementation II. Springer London, 1998, pp. 109-117.

Surjanto, B., XML content management based on object-relational database technology. Proceedings of the First International Conference on Web Information Systems Engineering, IEEE, 2000, Jun. 19-21, 2000, vol. 1, pp. 70-79.

[No Author Listed] About the Integrated Work Manager (IWM). Pegasystems, Inc., Apr. 30, 2009, 3 pages, <http://pdn-dev/DevNet/PRPCv5/KB/TMP9ad01zumf.asp>.

[No Author Listed] FreeBSD Project. "EDQUOTA(8)" in Free BSD System Manager's Manual. FreeBSD 8.2 Jun. 6, 1993. pp. 1-2. Retrieved from freebsd.org on Oct. 27, 2011.

[No Author Listed] How SmartForms for Fair Blaze Advisor works, Fair Issac White Paper, http://www.FAIRISAAC.COM/, Oct. 31, 2005, 8 pages (website no longer active).

[No Author Listed] How to Configure and Customize the Universal Worklist. SAP Netweaver '04 and SAP Enterprise Portal 6.0. SAP AG. Version 1, May 2004, 65 pages. <http://www.erpgenie.com/sap/netweaver/ep/Configuring%20the%20UWL.pdf>.

[No Author Listed] How to configure the IWM/IAC gateway. Pegasystems, Inc., Apr. 30, 2009, 4 paegs, <http://pdn-dev/DevNet/PRPCv5/KB/TMP9cf8fzurq4.asp>.

[No Author Listed] How to install the Integrated Work Manager (IWM). Pegasystems, Inc., Apr. 30, 2009, 6 pages, <http://pdn-dev/DevNet/PRPCv5/KB/TMP9br1ezurp8.asp>.

[No Author Listed] HP Integrated Lights-Out 2, User Guide, Part No. 394326-004, HP, Aug. 2006, 189 pages.

[No Author Listed] Integrating with External Systems, PegaRULES Process Commander 5.2. Process Commander 5.2 reference. Pegasystems Inc, Cambridge, MA, 2006, 103 pages <http://pdn.pega.com/ProductSupport/Products/PegaRULESProcessCommander/documents/PRPC/V5/502/iwes/PRPC52_Integrating_with_External_Systems.pdf>.

[No Author Listed] IP Prior Art Database, Options when returning work items in workflow management systems. IBM, IPCOM000027980D, 2004, 3 pages.

[No Author Listed] IP Prior Art Database, Staff Queries and Assignments in Workflow Systems. IBM, IPCOM000142382D, 2006, 4 pages.

[No Author Listed] IP Prior Art Database, Using work items to manage user interactions with adaptive business services. IBM TDB, IPCOM000015953D, 2003, 4 pages.

[No Author Listed] Localizing an Application, PegaRULES Process Commander. Process Commander 4.2 reference. Pegasystems Inc., Cambdrige, MA, 2006, 92 pages <http://pdn.pega.com/DevNet/PRPCv4/TechnologyPapers/documents/Localization0402.pdf>.

[No Author Listed] Oracle Universal Work Queue: Implementation Guide. Release 11i for Windows NT. Oracle Corporation. Jul. 2001, 136 pages. <http://docs.oracle.com/cd/A85964_01/acrobat/eu115ug.pdf>.

[No Author Listed] Solaris 9 resource manager software. A technical white paper. Sun Microsystems, Inc., Palo Alto CA, 2002, 37 pages. XP-002291080. Retrieved Aug. 3, 2004 from <http://wwws.sun.com/software/whitepapers/solaris9/srm.pdf>.

Bertino, E., and P. Foscoli, Index Organizations for Object-Oriented Database Systems, IEEE Trans. on Knowledge and Data Engineering, 7(2):193-209 (Apr. 1995).

Bierbaum, A., et al., VR juggler: A virtual platform for virtual reality application development. Proceedings of the Virtual Reality 2001 Conference, IEEE, 2001, 8 pages, <http://ieeexplore.ieee.org/stamp/stamp.jsp?tp=8tarnumber-913774>.

Breiman, L., Bagging predictors, Machine Learning, vol. 24, No. 2, Aug. 31, 1996, pp. 123-140, Kluwer Academic Publishers, Netherlands.

Brusilovsky, P., and De Bra, P., Editors, "Second Workshop on Adaptive Hypertext and Hypermedia Proceedings," Jun. 20-24, 1998. Ninth ACM Conference on Hypertext and Hypermedia, Hypertext'98. pp. 1-2.

Burleson, D., Adding behaviors to relational databases, DBMS, 8(10): 68(5) (Sep. 1995).

Busse, Ralph et al., Declarative and Procedural Object Oriented Views, IEEE, 1998, pp. 570-578, retrieved Mar. 22, 2007.

Buyya et al., Economic Models for Resource Management and Scheduling in Grid Computing, Concurrency and Computation: Practice and Experience, 2002, vol. 14, pp. 1507-1542.

Chan, T.W., and W. Hwang, Towards Integrating Logic, Object, Frame, and Production, Proc. Fourth Int'l. Conf. on Software Engineering and Knowledge Engineering, IEEE, pp. 463-469, Jun. 1992.

Cheng, Cheng-Chung; Smith, Stephen F.; A Constraint Satisfaction Approach to Makespan Scheduling, ATPS 1996 Proceedings, pp. 45-52 (1996).

Cheng, C.C. and Smith, Applying Constraint Satisfaction Techniques to Job Shop Scheduling, Annals of Operations Research, 70: 327-357 (1997).

Cochrane, Roberta et al., Integrating Triggers and Declarative Constraints in SQL Database Systems, pp. 567-578, Proceedings of the 22nd VLDB Conference Mumbai (Bombay), India, 1996, retrieved Mar. 22, 2007.

Damerau, F.J., Problems and some solutions in customization of natural language database front ends. ACM Transactions on Information Systems, vol. 3, No. 2, Apr. 1, 1985, pp. 165-184.

Danforth, S., Integrating Object and Relational Technologies, Proc. Sixteenth Annual Int'l. Computer Software and Applications Conf., IEEE Comput. Soc. Press, pp. 225-226, Sep. 1992 (Abstract).

Deelman, E., et al., Pegasus: A framework for mapping complex scientific workflows onto distributed systems, submitted to Scientific Programming, Jan. 2005. Pre journal publication article, 22 pages.

Deelman, E., et al., Pegasus: A framework for mapping complex scientific workflows onto distributed systems. Scientific Programming, 13, pp. 219-237, 2005.

(56) References Cited

OTHER PUBLICATIONS

DeMichiel, LG., et al., Polyglot: Extensions to Relational Databases for Sharable Types and Functions in a Multi-Language Environment, Proc. Ninth Int'l. Conf. on Data Engineering, IEEE, pp. 651-660, Apr. 1993.
Devarakonda et al., Predictability of process resource usage: A measurement-based study on UNIX. IEEE Transactions on Software Engineering. 1989;15(12)1579-1586.
Communication for European Patent Application No. 05755530.2, dated Sep. 6, 2007 (2 pages).
European Search Report for Application No. 05755530.2, dated Mar. 26, 2012 (3 Pages).
European Office Action dated Aug. 31, 2012 for Application No. 05755530.2 (4 Pages).
Communication for European Patent Application No. 07250844.3 enclosing European Search Report, dated Jul. 11, 2007 (6 pages).
Communication for European Patent Application No. 07250844.3, dated Mar. 28, 2008 (1 page).
European Office Action dated Jul. 9, 2012 for Application No. 07250844.3 (8 Pages).
Communication for European Patent Application No. 07250848.4, dated Aug. 13, 2007 (EESR enclosed) (6 pages).
Communication for European Patent Application No. 07250848.4, dated May 29, 2008 (1 page).
Communication for European Patent Application No. 08731127.0, dated Oct. 13, 2009 (2 pages).
Extended European Search Report dated Oct. 29, 2012 for Application No. 08731127.0 (8 Pages).
Extended European Search Report for Application No. 15189385.6, dated Dec. 17, 2015 (8 pages).
Fayad, M.E., et al., Object-oriented application frameworks. Communications of the ACM, Oct. 1997, vol. 40, issue 10, pp. 32-38, <http://dl.acm.org/citation.cfm?id=262798>.
Francisco, S., et al. Rule-Based Web Page Generation, Proceedings of the 2nd Workshop on Adaptive Hypertext and Hypermedia, Hypertext'98, Jun. 20-24, 1998, 9 pages.
Gajos et al. SUPPLE: Automatically Generating User Interfaces. IUI 2004, 8 pages.
Hague, Darren, Universal Worklist with SAP Netweaver Portal. Galileo Press, 2008, pp. 11-31. <http://www.sap-hefte.de/download/dateien/1461/146_leseprobe.pdf>.
International Search Report and Written Opinion for Application No. PCT/GB2004/000677, dated Aug. 2, 2004 (15 pages).
International Search Report for Application No. PCT/US2004/020783, dated Nov. 8, 2005 (2 pages).
International Preliminary Report on Patentability for Application No. PCT/US2004/020783, dated Feb. 13, 2006 (6 pages).
International Search Report for PCT/US05/018599, dated May 15, 2007 (1 page).
[NoAuthorListed] XPath Tutorial, Mar. 18, 2005, 7 pages (Year: 2005).
Summons to Attend Oral Proceedings pursuant to rule 115(1) EPC, issued May 2, 2018 for Application No. 08731127.0 (8 pages).
U.S. Appl. No. 08/666,165, filed Jun. 19, 1996, Rules Bases and Methods of Access Thereof.
U.S. Appl. No. 10/430,693, filed May 6, 2003, Methods and Apparatus for Digital Data Processing With Mutable Inheritance.
U.S. Appl. No. 10/547,014, filed Aug. 25, 2005, Classification Using Probability Estimate Re-Sampling.
U.S. Appl. No. 10/639,735, filed Aug. 12, 2003, Process/Viewer Interface.
U.S. Appl. No. 10/854,017, filed May 26, 2004, Integration of Declarative Rule-Based Processing With Procedural Programming.
U.S. Appl. No. 11/046,211, filed Jan. 28, 2005, Methods and Apparatus for Work Management and Routing.
U.S. Appl. No. 11/203,513, filed Aug. 12, 2005, Methods and Apparatus for Digital Data Processing With Mutable Inheritance.
U.S. Appl. No. 11/368,360, filed Mar. 3, 2006, Rules Base Systems and Methods With Circumstance Translation.
U.S. Appl. No. 11/396,415, filed Mar. 30, 2006, User Interface Methods and Apparatus for Rules Processing.
U.S. Appl. No. 11/681,269, filed Mar. 2, 2007, Proactive Performance Management for Multi-User Enterprise Software Systems.
U.S. Appl. No. 12/035,682, filed Feb. 22, 2008, User Interface Methods and Apparatus for Rules Processing.
U.S. Appl. No. 12/174,624, filed Jul. 16, 2008, Methods and Apparatus for Implementing Multilingual Software Applications.
U.S. Appl. No. 12/381,523, filed Mar. 12, 2009, Techniques for Dynamic Data Processing.
U.S. Appl. No. 12/386,959, filed Apr. 24, 2009, Method and Apparatus for Integrated Work Management.
U.S. Appl. No. 12/590,454, filed Nov. 6, 2009, Techniques for Content-Based Caching in a Computer System.
U.S. Appl. No. 12/619,215, filed Nov. 16, 2009, Rules Base Systems and Methods With Circumstance Translation.
U.S. Appl. No. 12/649,095, filed Dec. 29, 2009, Methods and Apparatus for Integration of Declarative Rule-Based Processing With Procedural Programming in a Digital Data-Processing Evironment.
U.S. Appl. No. 12/798,161, filed Mar. 30, 2010, System and Method for Creation and Modification of Software Applications.
U.S. Appl. No. 13/031,097, filed Feb. 18, 2011, Systems and Methods for Distributed Rules Processing.
U.S. Appl. No. 13/031,109, filed Feb. 18, 2011, Rule-Based User Interface Conformance Methods.
U.S. Appl. No. 13/341,411, filed Dec. 30, 2011, System and Method for Updating or Modifying an Application Without Manual Coding.
U.S. Appl. No. 13/536,079, filed Jun. 28, 2012, Proactive Performance Management for Multi-User Enterprise Software Systems.
U.S. Appl. No. 13/718,255, filed Dec. 18, 2012, Methods and Apparatus for Work Management and Routing.
U.S. Appl. No. 13/892,956, filed May 13, 2013, Content-Based Caching Using a Content Identifier at a Point in Time.
U.S. Appl. No. 13/897,763, filed May 20, 2013, System and Software for Creation and Modification of Software.
U.S. Appl. No. 13/907,287, filed May 31, 2013, Methods and Apparatus for Integration of Declarative Rule-Based Processing With Procedural Programming in a Digital Data-Processing Environment.
U.S. Appl. No. 14/469,208, filed Aug. 26, 2014, Techniques for Dynamic Data Processing.
U.S. Appl. No. 14/527,348, filed Oct. 29, 2014, Systems and Methods for Distributed Rules Processing.
U.S. Appl. No. 14/558,084, filed Dec. 2, 2014, Methods and Apparatus for User Interface Optimization.
U.S. Appl. No. 14/597,207, filed Jan. 14, 2015, Methods and Apparatus for Integrated Work Management.
U.S. Appl. No. 14/928,085, filed Oct. 30, 2015, System and Method for Updating or Modifying an Application Without Manual Coding.
International Preliminary Report on Patentability for PCT/US2005/018599, dated Jun. 5, 2007 (10 pages).
International Search Report & Written Opinion for PCT/US06/03160, dated Jul. 21, 2008 (16 pages).
International Preliminary Report on Patentability for PCT/US06/03160, dated Apr. 9, 2009 (14 pages).
International Search Report for PCT/US013/55503, dated Jul. 28, 2008 (1 page).
International Preliminary Report on Patentability for PCT/US2008/055503, dated Sep. 17, 2009 (4 pages).
International Search Report & Written Opinion for PCT/US09/32341, dated Mar. 11, 2009 (14 pages).
International Preliminary Report on Patentability for PCT/US2009/032341, dated Aug. 12, 2010 (8 pages).
Johnson et al., Sharing and resuing rules-a feature comparison of five expert system shells. IEEE Expert, IEEE Services Center, New York, NY, vol. 9, No. 3, Jun. 1, 1994, pp. 3-17.
Jones et al., A user-centered approach to functions in excel. International Conference on Functional Programming, Uppsala, Jun. 30, 2003, pp. 1-12.
Kim, W., Object-Oriented Databases: Definition and Research Directions, IEEE Trans. on Knowledge and Data Engineering, vol. 2(3) pp. 327-341, Sep. 1990.

(56) References Cited

OTHER PUBLICATIONS

Kuhn, H.W., The Hungarian Method for the Assignment Problem, Naval Research Logistics Quarterly, 2 (1955), pp. 83-97.
Kuno, H.A., and E.A. Rundensteiner, Augmented Inherited Multi-Index Structure for Maintenance of Materialized Path Query Views, Proc. Sixth Int'l. Workshop on Research Issues in Data Engineering, pp. 128-137, Feb. 1996.
LaRue, J., Leveraging Integration and Workflow. Integrated Solutions, Accounting Today, SourceMedia, Aug. 2006, pp. 18-19.
Lippert, Eric, Fabulous Adventures in Coding: Metaprogramming, Toast and the Future of Development Tools, Microsoft.com Blog, MSDN Home, published Mar. 4, 2004, 6 pgs.
Mandal, et al., Integrating existing scientific workflow systems: The kepler/pegasus example. USC Information Sciences Institute, 2007, 8 pages.
Manghi, Paolo, et. al., Hybrid Applications Over XML: Integrating the Procedural and Declarative Approaches, 2002 ACM, pp. 1-6. Retrieved Mar. 22, 2007.
Markiewicz, M.E., et al., Object oriented framework development ACM, 2001, 13 pages, <http://dl.acm.org/citation.cfm?id=372771>.
Markowitz, V.M., and A. Shoshani, Object Queries over Relational Databases: Language, Implementation, and Applications, IEEE Xplore, pp. 71-80, Apr. 1993.
Marmel, Elaine, Microsoft Office Project 2007 Bible, ISBN 0470009926, Wiley Publishing, Inc., 2007, 961 pages.
Maryanski, F., et al., The Data Model Compiler a Tool for Generating Object-Oriented Database Systems, 1986 Int'l. Workshop on Object-Oriented Database Systems, IEEE, 73-84 (1986).
McConnell, Steven C., Brooks' Law Repealed, IEEE Software, pp. 6-9, Nov./Dec. 1999.
Mecca, G., et al., Cut and Paste, ACM, pp. 1-25 and Appendix I-IV (Jun. 1999). Retrieved Mar. 22, 2007.
Mitchell, T.M., Machine Learning, Chapter 3, 1997, McGraw-Hill, pp. 52-80.
Mitchell, T.M., Machine Learning, Chapter 6, 1997, McGraw-Hill, pp. 154-200.
Morizet-Mahoudeaux, P., A Hierarchy of Network-Based Knowledge Systems, IEEE Trans. on Systems, Man, and Cybernetics, vol. 21(5), pp. 1184-1191, Sep./Oct. 1991.
Pientka, B., et al., Programming with proofs and explicit contexts. International Symposium on Principles and Practice of Declarative Programming, ACM, 2008, pp. 163-173, <http://delivery.acm.org/10.1145/1390000/1389469/p163-pientka.pdf?>.
Reinersten, Don, Is It Always a Bad Idea to Add Resources to a Late Project?, Oct. 30, 2000. Electronic Design. vol. 48, Issue 22, p. 70.
Riccuiti, M., Oracle 8.0 on the way with objects: upgrade will also build in multidimensional engine. InfoWorld. Sep. 25, 1995;17(39):16.
Richner, T., et al., Recovering high-level views of object-oriented applications from static and dynamic information. IEEE, 1999, 10 pages, <http://ieeexplore.ieee.org/stamp/stamp.jsp?tp=&arnumber=792487>.
Salvini, S., and M.H. Williams, Knowledge Management for Expert Systems, IEEE Colloquium on 'Knowledge Engineering', 3 pages, May 1990.
Schiefelbein, Mark, A Backbase Ajax Front-end for J2EE Applications, Internet Article, dev2dev <http://dev2dev.bea.com/1pt/a/433>, Aug. 29, 2005, 16 pages.
Sellis, T., et al., Coupling Production Systems and Database Systems: A Homogeneous Approach, IEEE Trans. on Knowledge and Data Engineering, vol. 5(2), pp. 240-256, Apr. 1993.
Shyy Y.M., and S.Y.W. Su, Refinement Preservation for Rule Selection in Active Object-Oriented Database Systems, Proc. Fourth Int'l. Workshop on Research Issues in Data Engineering, pp. 115-123, Feb. 1994.
Singh, G., et al., Workflow task clustering for best effort systems with pegasus, Pegasus, 2008, 8 pages.
Smedley, T.J. et al., "Expanding the Utility of Spreadsheets Through the Integration of Visual Programming and User Interface Objects," School of Computer Science, Technical University of Nova Scotia, ACM, 1996; pp. 148-155.
Srinivasan, V., et al., Object persistence in object-oriented applications. IBM Systems Journal, 1997, vol. 36, issue 1, pp. 66-87, <http://ieeexplore.ieee.org/stamp/stamp.jsp?tp=&arnumber-5387186>.
Stonebraker, M., The Integration of Rule Systems and Database Systems, IEEE Trans. on Knowledge and Data Engineering, vol. 4(5), pp. 415-423, Oct. 1992.
Sun, et al., "Supporting Inheritance in Relational Database Systems," IEEE, pp. 511-518, Jun. 1992.
Thuraisingham, "From Rules to Frames and Frames to Rules," AI Expert, pp. 31-39, Oct. 1989.
Vranes, S., et al., Integrating Multiple Paradigms within the Blackboard Framework, IEEE Transactions on Software Engineering, vol. 21, No. 3, Mar. 1995, pp. 244-262.
Yang, Bibo; Geunes, Joseph; O'Brien, William J.; Resource-Constrained Project Scheduling: Past Work and New Directions, Apr. 2001, 28 pages, Research Report 2001-2006, Department of Industrial and Systems Engineering, University of Florida.
U.S. Appl. No. 15/613,439, filed Jun. 5, 2017, Connecting Graphical Shapes Using Gestures.
U.S. Appl. No. 15/206,956, filed Jul. 11, 2016, Selective Sharing for Collaborative Application Usage.

* cited by examiner

EVENT PROCESSING WITH ENHANCED THROUGHPUT

CROSS-REFERENCE TO RELATED APPLICATIONS

This application claims the benefit of U.S. Provisional Application No. 62/062,515 entitled "Internal Message Processing with Enhanced Throughput," filed Oct. 10, 2014, which is incorporated by reference herein in its entirety.

FIELD OF THE DISCLOSURE

The present disclosure relates to digital data processing, and more particularly, to methods, apparatus, and systems for processing events. The teachings herein have application, by way of non-limiting example, to rapid processing of events comprising large volumes of data between producer and consumer nodes in a cluster.

BACKGROUND

External systems generate growing numbers of events, such as social media posts and notifications. Furthermore, legacy systems can generate large volumes of events for processing by applications. Customers are increasingly looking to build or leverage enterprise applications that are capable of receiving and processing high volumes of events in short periods of time from these external or legacy systems. These systems can be used in a variety of applications ranging from health care to automotive repair. The applications can facilitate a range of business operations, from marketing and manufacturing to distribution to technical support. For example, an application can implement data-processing workflows to support processing transactional data ranging from customer service requests received by retail and banking enterprises, to routing and resolution of health care claims by insurance enterprises.

Computers can be networked into a cluster that includes two or more nodes capable of exchanging events or messages. The cluster can include one or more producer nodes and one or more consumer nodes. The producer nodes can transmit, or publish, events and the consumer nodes can receive, or subscribe to, events. Traditional techniques for exchanging and processing messages include a publish-subscribe model. In a publish-subscribe model, publishers or producers do not transmit messages direct to an individual subscriber or consumer. Instead, publishers transmit a message broadly to multiple subscribers at once. The subscribers generically register interest in certain messages and thereby receive only messages of interest.

However, the publish-subscribe model suffers from reduced throughput because a system uses valuable capacity in the network to provide a given message to multiple consumer nodes, in case more than one consumer node registers interest in the message. Furthermore, the publish-subscribe architecture generally uses an intermediate middleware node sometimes referred to as a message broker or message bus for message delivery, using additional resources in the cluster. A still further downside of traditional message processing systems is consumer nodes generally receive messages in any order, instead of preserving the order in which the producer nodes read the messages from a message stream for faster message routing and processing.

An object of this invention is to provide improved systems and methods for digital data processing. A more particular object is to provide improved systems and methods for event processing.

A further object is to provide such improved systems and methods as facilitate deployment of enterprise applications in a networked cluster of producer nodes and consumer nodes.

Yet a still further object is to provide such improved systems and methods as better utilize computing and networking resources upon addition or removal of producer nodes and consumer nodes to or from the cluster.

SUMMARY

The foregoing are among the objects attained by the invention which provides, in one aspect, a digital data processing system and method for event processing.

In some embodiments, the digital data processing system includes a producer node in communicative coupling with one or more consumer nodes and with a sharding map, for example over a network. The producer node can be configured to receive at least one event stream including a plurality of events, and determine a sharding key associated with an event among the plurality of events in the event stream. The producer node can be further configured to identify, based on the sharding map, a producer event buffer associated with a producer channel on the producer node for transmitting the event to a corresponding consumer event buffer associated with a consumer channel on a consumer node among the one or more consumer nodes. The sharding map can correlate the sharding key for the event with the producer channel. The producer node can be further configured to provide the event to the producer event buffer associated with the producer channel in order to transmit the event to the corresponding consumer event buffer associated with the consumer channel on the consumer node.

According to related aspects of the invention, the producer node can be further configured to initialize a plurality of producer channels. The producer node can reference a channel map that correlates an event in the event stream with one or more consumer channels on the one or more consumer nodes. The producer node can create at least one producer channel based on the channel map. The producer channel can be communicatively coupled with a corresponding consumer channel among the one or more consumer channels. The producer node can update the sharding map to correlate the sharding key for the event with the at least one producer channel created based on the channel map.

In related aspects of the invention, the sharding map can correlate the sharding key for the event with the producer channel based on a partition space. The partition space can be determined using a partition criterion based on a count of consumer nodes available to process the plurality of events in the event stream.

In further related aspects of the invention, the producer node can be configured to update the sharding map in response to detecting an update to the channel map. For example, the producer node can be configured to update the sharding map by redistributing the partition space. The redistribution of the partition space can be based on determining an updated partition size for the existing producer channels based on a count of available consumer channels, and assigning an overflow portion of the partition space based on the updated partition size to a new producer channel. Alternatively, the redistribution of the partition space can be based on querying the one or more consumer nodes to identify resources available to the one or more consumer nodes, and weighting the partitions assigned to each producer channel based on the identified resources.

Related aspects of the invention provide a producer node that can be further configured to adjust the rate of providing events to the producer event buffer, so as to manipulate the rate of events processed on the corresponding consumer node by the consumer event buffer, in order to improve throughput between the producer node and the consumer node.

In related aspects of the invention, the producer node can be further configured to bundle event transport metadata with the plurality of events in the event stream for transmission to the consumer node, and trigger the consumer node to execute a rule identified by the event transport metadata for processing the plurality of events.

According to related aspects of the invention, the producer node can be further configured to update a plurality of producer channels in response to detecting an update to the sharding map or a channel map by the consumer node. The update to the sharding map or the channel map can include adding a consumer node to the system, removing a consumer node from the system, adding one or more consumer channels to the consumer node, or removing one or more consumer channels from the consumer node.

In further related aspects of the invention, the producer node can be further configured to transmit a message to the one or more consumer nodes in response to detecting an the update to the sharding map or the channel map. The transmitted message can trigger the one or more consumer nodes to determine a delta that tracks the update to the sharding map or the channel map, identify data to be moved to a different consumer channel or a different consumer node, and copy the data to be moved to a cluster change data map. The data copied to the cluster change data map can trigger the consumer node to copy the moved data from the cluster change data map, clear the copied data from the cluster change data map, and update a status of the consumer node to active in a consumer map that tracks the one or more consumer nodes in the cluster. The producer node can be further configured to resume transmission of data to the consumer node in response to detecting the updated status of the consumer node in the consumer map.

The foregoing and other aspects of the invention are evident in the text that follows and in the drawings.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

DETAILED DESCRIPTION OF EXAMPLE EMBODIMENTS

Figure 1A:
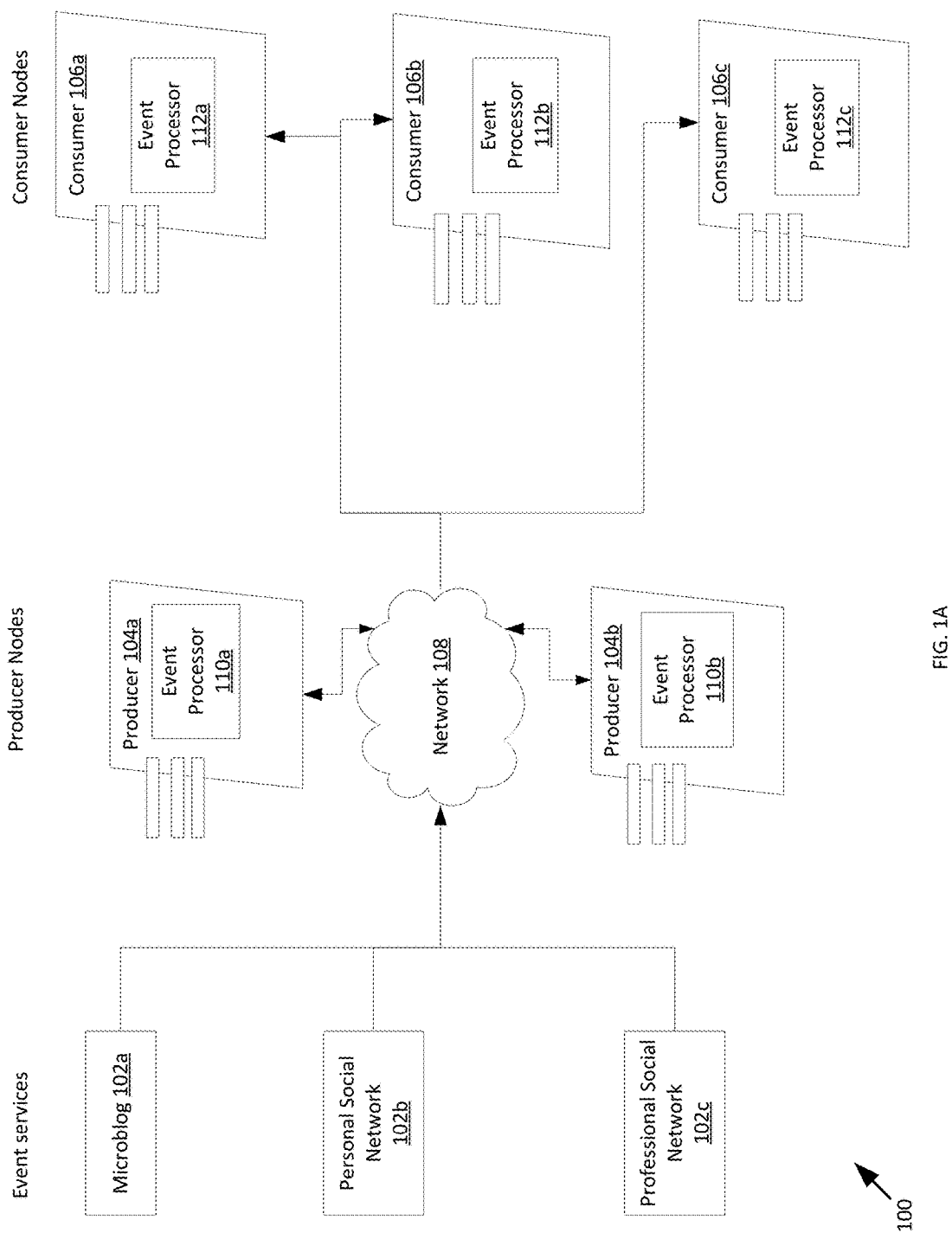
FIGS. 1A-1B illustrate example event processing systems, in accordance with certain embodiments of the present invention.

The present systems and methods allow for rapid processing of large volumes of discretely generated data referred to herein as events. In some embodiments, the event processing systems and methods can be general enough to be used as a generic message passing service in a cluster of one or more producer nodes and consumer nodes. (The event processing system and related methods, as discussed here and elsewhere herein, are referred to elsewhere herein simply as "the event processing.") The event processing can exhibit and support both horizontal as well as vertical scaling to achieve speed and robustness in current and future client installations.

The event processing systems and methods involve receiving an event stream having one or more events. A producer node in a cluster determines a sharding key for a received event (i.e., a key for grouping events for routing). The producer node uses a sharding map to correlate the sharding key for the event with a producer channel. The producer node provides the event to a producer event buffer associated with the producer channel. The producer event buffer transmits the received event directly to a corresponding consumer event buffer associated with a consumer channel on a consumer node. The event processing leverages a paired relationship established between one or more producer channels on the producer node, and one or more consumer channels on the consumer node to generate enhanced throughput compared with traditional messaging systems.

The event processing systems and methods have utility in, for example, rapidly processing discussions on social media. Today, many people use and communicate ideas through social media. The topics and ideas shared can vary greatly, however topics specific to an industry or business are potentially germane to an event processing system of the type referred to above (and described further herein)

employed by a given enterprise, say, in that industry or business. As users of social media publish discussions, these discussions can form the basis for grass roots marketing and decision-based campaigns, e.g., by that enterprise. In some embodiments, such event processing allows the enterprise to tap into these theme-based discussions to "mine" information important to their industry or specific business. The event processing provides an ability to tap into this vast source of data and distill the data into a meaningful form. To achieve this goal, some embodiments of the event processing system include a producer node that is able to connect to a "fire-hose" of events, or data, streaming from event services. Non-limiting example event services include microblogs such as Twitter, personal social networks such as Facebook, and professional social networks such as LinkedIn. In some embodiments, the event processing systems and methods provide a mechanism to identify events declaratively in which the enterprise is interested, once an administrator configures and establishes a connection. Further embodiments of the event processing allow the enterprise to define declarative rules that describe how to process those events of interest.

The event processing systems and methods described herein also have utility in rapidly processing events from traditional data warehouses or so-called "Big Data" systems that generate large volumes of data in short periods of time. A non-limiting example includes processing insurance claim data using declarative rules. In this case a large volume of insurance claim data can flow into the event processing system. The event processing routes the events from event services to producer nodes and consumer nodes for processing, transformation, and potentially storage.

System Architecture

FIG. 1A illustrates example event processing system 100 in accordance with certain embodiments of the present invention. Event processing system 100 includes event services 102a-c, producer nodes 104a-b, and consumer nodes 106a-c, in communication over network 108. Event processing system 100 can process any type of data provided by event services 102a-c as generic events. Although FIG. 1A illustrates three event services, two producer nodes, and three consumer nodes, event processing system 100 can include any number of event services, producer nodes, and consumer nodes in communication over any number of networks within the scope of the invention.

Non-limiting examples of event services 102a-c include microblog 102a, personal social network 102b, and professional social network 102c, all of the type known in the art as adapted in accord with the teachings hereof. In this regard, event services 102a-c can be implemented, for example, on one or more digital data processing systems in the conventional manner known in the art, again, as adapted in accord with the teachings hereof. Event services 102a-c provide an event stream to producer nodes 104a-b. In some embodiments, the event stream can include events aggregated from multiple event sources.

Producer nodes 104a-b communicate with event services 102a-c over network 108. Producer node 104a includes event processor 110a, and producer node 104b includes event processor 110b. Event processors 110a-b are configured to receive events from one or more of event services 102a-c, process, and route those events to one or more of consumer nodes 106a-c. In some embodiments, producer nodes 104a-b can participate in and communicate with the overall cluster of illustrated nodes in support of client interactions, while the producer nodes themselves remain isolated and hidden from end users who are using consumer nodes 106a-c. That is, event processing system 100 allows administrators to configure a system in which the end users are only aware that system 100 receives events from event services 102a-c and routes the received events to consumer nodes 106a-c, without requiring knowledge of architectural or implementation details of—or even the existence of—producer nodes 104a-b.

Consumer nodes 106a-c receive the routed events from producer nodes 102a-b over network 108. Consumer node 106a includes event processor 112a, and consumer node 106b includes event processor 112b. Event processors 112a-b are configured to receive events from producer nodes 104a-b and process the events. Consumer nodes 106a-c participate and communicate with the overall cluster of illustrated nodes supporting client interactions and can be allocated for connection to and communication with end users. In some embodiments, consumer nodes 106a-c process received events in accordance with event transport metadata that is bundled with the event. For example, the event transport metadata can trigger consumer nodes 106a-c to process received events by performing sentiment analysis on the received events, grouping or aggregating the received events for further processing, displaying user interface updates about the received events, or storing the received events in a database.

In some embodiments, producer nodes 104a-b can include one or more producer digital data processors, and consumer nodes 106a-c can include one or more consumer digital data processors. The producer and consumer digital data processors can be digital processors of the type commercially available in the marketplace suitable for operation in event processing system 100 and adapted in accord with the teachings hereof, for example, utilizing rules forming applications executing in one or more rules engines, e.g. as discussed elsewhere herein. Though producer nodes 104a-b and consumer nodes 106a-c can be typically implemented in server-class computers such as a minicomputer, producer nodes 104a-b and consumer nodes 106a-c may also be implemented in desktop computers, workstations, laptop computers, tablet computers, personal digital assistants (PDAs) or other suitable apparatus adapted based on the systems and methods described herein. The producer digital data processor and consumer digital data processor include central processing, memory, storage using a non-transitory computer-readable medium (e.g., a magnetic disk, solid state drive, or other storage medium), and input/output units and other constituent components (not shown) of the type conventional in the art that are programmed or otherwise configured in accord with the teachings hereof.

Network 108 can include one or more networks of the type commercially available in the marketplace or otherwise suitable for supporting communication between event services 102a-c, producer nodes 104a-b, and consumer nodes 106a-c in accord with the teachings hereof. Network 108 can be wired or wireless, a cellular network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), or a network operating in accordance with existing IEEE 802.11, 802.11a, 802.11b, 802.11g, 802.11n, 802.16, 802.16d, 802.16e, 802.16m standards or future versions or derivatives of the above standards.

Figure 1B:
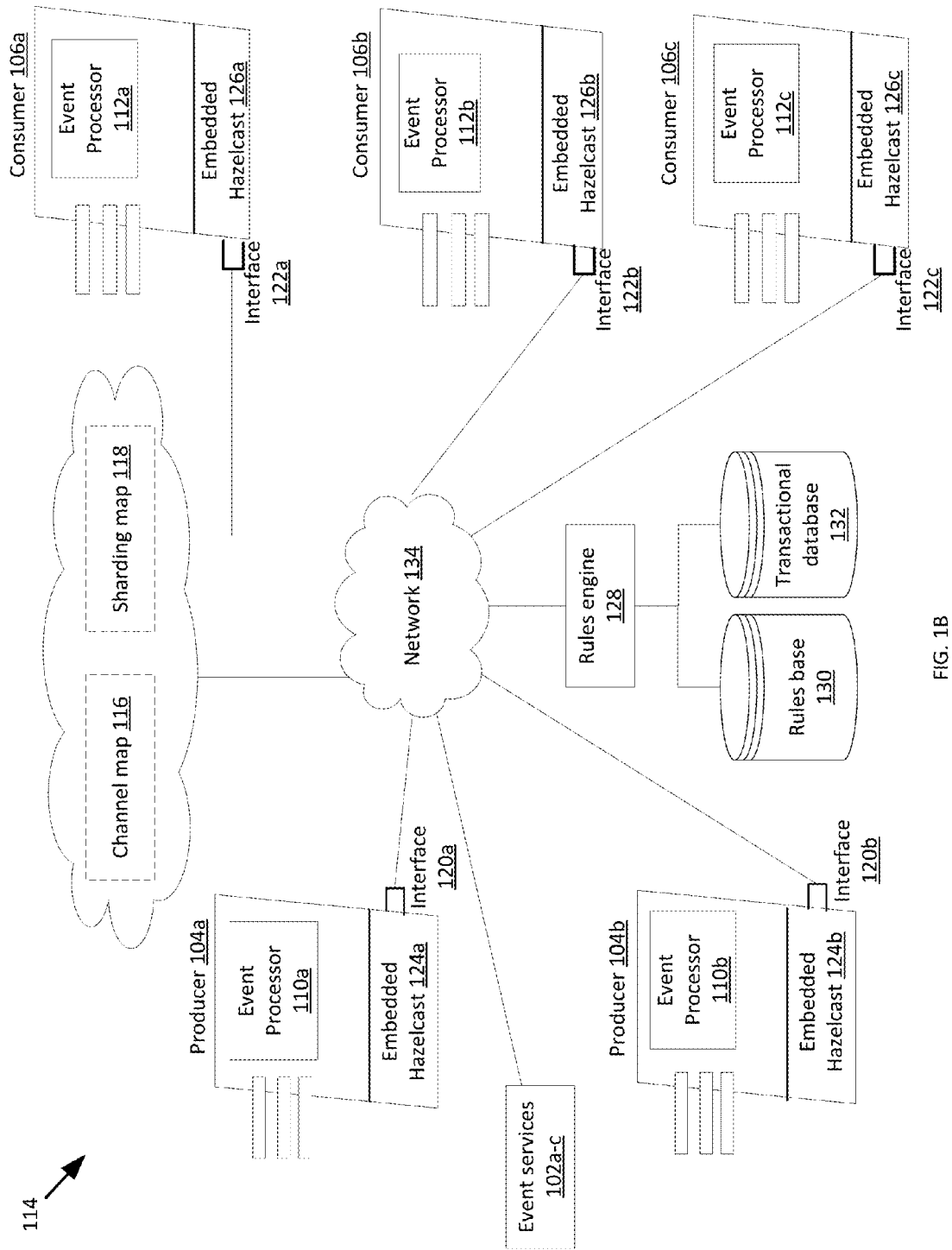

FIG. 1B illustrates example event processing system 114 in accordance with certain embodiments of the present invention. Event processing system 114 illustrates event services 102a-c in communication with producer nodes 104*a-b* and consumer nodes 106*a-c* over network 134. In some embodiments, producer nodes 104*a-b* use channel map 116 and sharding map 118 to transmit events from one or more of event services 102*a-c* to one or more of consumer nodes 106*a-c* over network 134. In further embodiments, producer nodes 104*a-b* and consumer nodes 106*a-c* can be in communication with rules engine 128 over network 134.

An event service 102*a-c* publishes an incoming event into the cluster, and event processing system 114 ultimately designates a consumer node 106*a-c* in the cluster to handle or process the event (e.g., using one of producer nodes 104*a-b*). Some embodiments of event processing system 114 can support additional features. For example, producer nodes 104*a-b* and consumer nodes 106*a-c* can process events in the order in which event services 102*a-c* produce the events. An event key associated with events can identify that an event belongs to a particular group of related events. Lastly, event processing system 114 can allow an administrator to configure the system so that the same consumer node 106*a-c* processes events that have the same event key (e.g., via one or more of event processors 110*a-b* on producer nodes 104*a-b*).

In some embodiments, event processors 110*a-b* on producer nodes 104*a-b* process events using embedded Hazelcast logic (hereinafter, simply, "Hazelcast") 124*a-b*, and event processors 112*a-c* process events using embedded Hazelcast 126*a-c*. As those skilled in the art will appreciate, Hazelcast refers to a publicly available third-party architecture and processing mechanism for in-memory object caching. Event processing system 114 can leverage Hazelcast to enable distributed object caching and locking, and node-to-node messaging. A producer node or consumer node using Hazelcast can become what the Hazelcast architecture refers to as a Hazelcast node. Hazelcast allows automatic discovery of other Hazelcast nodes using discovery mechanisms such as multicast or direct Internet Protocol (IP) discovery.

Producer nodes 104*a-b* use interfaces 120*a-b* to receive events from event services 102*a-c* over network 134. In some embodiments, interfaces 120*a-b* use embedded Hazelcast 124*a-b* to connect producer nodes 104*a-b* with event services 102*a-c* and consumer nodes 106*a-c*, for example using a discovery mechanism based on TCP/IP.

In some embodiments, producer nodes 104*a-b* and consumer nodes 106*a-c* process events using channel map 116 and sharding map 118. Channel map 116 correlates an event in the event stream from event services 102*a-c* with consumer nodes 106*a-c*. Specifically, channel map 116 identifies consumer channels on consumer nodes 106*a-c* to which to route and process events. Sharding map 118 correlates a sharding key for an event (e.g., a key for grouping or clustering events for routing) with a producer channel on producer nodes 104*a-b* to which to route and process events. As a consequence of the foregoing and the actions below, event processing system 114 creates a paired relationship between producer channels on producer nodes 104*a-b* and consumer channels on consumer nodes 106*a-c* to enable rapid processing of large volumes of events from event services 102*a-c*. In some embodiments, channel map 116 and sharding map 118 may be distributed in the cluster. For example, further embodiments of channel map 116 and sharding map 118 may be implemented in event processing system 114 as Hazelcast distributed maps.

In some embodiments, producer node 104*a* uses embedded Hazelcast 124*a* to read and write entries from channel map 116 and sharding map 118 over interface 120*a*, and producer node 104*b* uses embedded Hazelcast 124*b* to read and write from channel map 116 and sharding map 118 over interface 120*b*. Similarly, consumer nodes 106*a-c* use embedded Hazelcast 126*a-c* to read and write from channel map 116 and sharding map 118 over interfaces 122*a-c*.

In some embodiments, an enterprise can deploy event processing system 114 in support of enterprise applications executing locally on or remote to the cluster of illustrated nodes. Such enterprise applications can include specialized software or hardware used within a specific industry or business function (e.g., human resources, finance, healthcare, telecommunications, insurance, etc.). Alternatively, the enterprise applications can include cross-industry applications (e.g., project management), or other types of software or hardware applications.

In some embodiments, rules may define the enterprise applications. Producer nodes 104*a-b* and consumer nodes 106*a-c* can be in communication with rules engine 128. Rules engine 128 can be in communication with rules base 130 and transactional database 132. As the application executes on a producer digital data processor (e.g., producer nodes 104*a-b*) or a consumer digital data processor (e.g., consumer nodes 106*a-c*), event processing system 114 may retrieve any portion of the rules that define the application from rules base 130 and process or execute the rules in response to requests or events signaled to or detected by the producer digital data processors or consumer digital data processors at run-time, (e.g., using rules engine 128).

Rules base 130 can include a rules base of the type known in the art (albeit configured in accord with the teachings hereof) for storing rules (e.g., scripts, logic, controls, instructions, metadata, etc.) and other application-related information in tables, database records, database objects, and so forth. Preferred rules and rules bases can be of the type described in U.S. Pat. No. 5,826,250, entitled "Rules Bases and Methods of Access Thereof" and U.S. Pat. No. 7,640,222, entitled "Rules Base Systems and Methods with Circumstance Translation," the entire contents of both of which are incorporated by reference herein in their entirety. In other embodiments, rules and rules bases that are architected or operated differently may be used as well.

Some embodiments may utilize multiple rules bases. For example, rules base 130 may be an enterprise-wide rules base in communication with rules engine 128, and domain-specific rules bases may be accessible to producer nodes 104*a-b* or consumer nodes 106*a-c* via network 134. If multiple rules bases are provided in a given embodiment, the rules bases may be of like architecture and operation or may differ in architecture and operation as well.

In some embodiments, rules may comprise meta-information structures. For example, the rules can include data elements or method elements. The method elements can be procedural or declarative. For example, method elements in a rule may be procedural insofar as the rule comprises one or more of a series of ordered steps. Declarative elements in a rule may set forth (i.e., declare) a relation between variables or values (e.g., a loan rate calculation or a decision-making criterion). Alternatively, declarative elements may declare a desired computation or result without specifying how the computations should be performed or how the result should be achieved. In one non-limiting example, a declarative portion of a rule may declare a desired result of retrieving a specified value without specifying a data source for the value or a particular query language for such retrieval (e.g., SQL, CQL, .QL, etc.). In other cases, the declarative portion of a meta-information structure may comprise declarative programming language statements (e.g., SQL). Still other types of declarative meta-information structures are possible.

While some rules may comprise meta-information structures that are wholly procedural and other rules may comprise meta-information structures that are wholly declarative, event processing system 114 can also include rules that comprise both procedural and declarative meta-information structures. That is, such rules can have meta-information structure portions that are declarative, as well as meta-information structure portions that are procedural. Furthermore, rules of the illustrated embodiments that comprise meta-information structures may also reference or incorporate other rules. Those other rules may themselves in turn reference or incorporate still other rules. As a result, editing such a rule may affect one or more rules that incorporate it (if any).

An advantage of rules that comprise meta-information structures over conventional rules is that meta-information structures provide administrators with flexibility to apply code-based or model-driven techniques in development and modification of applications or computing platforms. Particularly, like models in a model-driven environment, meta-information structures comprise data elements that can be used to define aspects of a complex system at a higher level of abstraction than source code written in programming languages such as Java or C++. On the other hand, administrators may also embed programming language statements into meta-information structures if the administrators deem that to be the most efficient design for the system being developed or modified. At run-time, rules engine 128 can convert the data elements of the meta-information structures along with programming language statements (if any) automatically into executable code for the application.

Thus, in some embodiments rules may be the primary artifacts that get created, stored (e.g., in rules base 130) or otherwise manipulated to define or modify the overall functionality of rules-based applications. The applications may automate or manage various types of work in different business domains at run-time. By way of non-limiting example, rules stored in rules base 130 may be configured to define aspects of an application. For example, rules can define the user interface, decision logic, integration framework, process definition, data model, reports, or security settings of a given application.

Transactional database 132 can include databases of the type known in the art (albeit configured in accord with the teachings hereof) for storing corporate, personal, governmental, or other data. Rules such as in rules base 130 may generate, update, transform, delete, store, or retrieve the data (herein collectively referred to as "processing" the data). Example data may include financial data; customer records; personal data; design-time, development-time, or runtime data related to an application; or other types of data. Transactional database 132 may store the data in tables, database records, or database objects, for example.

Transactional database 132 may be present in any given embodiment. Conversely, some embodiments may use multiple transactional databases, e.g., an enterprise-wide database on producer nodes 104*a-b* and branch-office specific databases on consumer nodes 106*a-c*, by way of non-limiting example. If multiple transactional databases are provided in a given embodiment, the transactional databases may be of like architecture and operation; though, they may have differing architecture or operation, as well.

Rules engine 128 can be of the type conventionally known in the art (albeit configured in accord with the teachings hereof) for use in processing or executing rules from rules base 130 to process data in (or for storage to) transactional database 132, e.g. in connection with events signaled to or detected by rules engine 128. Preferred such rules engines are of the type described in U.S. Pat. No. 5,826,250, entitled "Rules Bases and Methods of Access Thereof," U.S. Pat. No. 7,640,222, entitled "Rules Base Systems and Methods with Circumstance Translation," and U.S. Pat. No. 8,250,525, entitled "Proactive Performance Management For Multi-User Enterprise Software Systems," all of which are incorporated by reference in their entirety herein. Rules engine 128 may be implemented in a single software program, multiple software programs or modules, or a combination of software modules or programs. Rules engine 128 may comprise programming instructions, scripts, or rules (e.g., rules stored in rules base 130) or a combination thereof.

Some embodiments of rules engine 128 may execute on or over multiple digital data processors. For example, event processing system 114 may invoke rules engine 128 for execution on a single digital data processor (e.g., a digital data processor on a producer node 104*a-b* or a consumer node 106*a-c*). Subsequently, event processing system 114 may apportion, distribute, or execute portions of rules engine 128 (or, potentially, the entirety of rules engine 128) over multiple digital data processors.

Other ways of implementing or executing rules engine 128 are also possible. By way of non-limiting example, rules engine 128 may have additional distinct components or portions that can be apportioned and distributed separately. Non-limiting example components can include a data access component for processing data during rule execution, a session management component for keeping track of activity across sessions of interaction with a digital data processor, or a performance monitoring component for monitoring and interacting with various system resources or event logs to manage performance thresholds.

Finally, network 134 can include one or more networks for supporting communication between event services 102*a-c*, producer nodes 104*a-b*, consumer nodes 106*a-c*, and rules engine 128. Network 134 can be wired or wireless, a cellular network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), or a network operating in accordance with existing IEEE 802.11, 802.11a, 802.11b, 802.11g, 802.11n, 802.16, 802.16d, 802.16e, 802.16m standards or future versions or derivatives of the above standards.

Figure 2A:
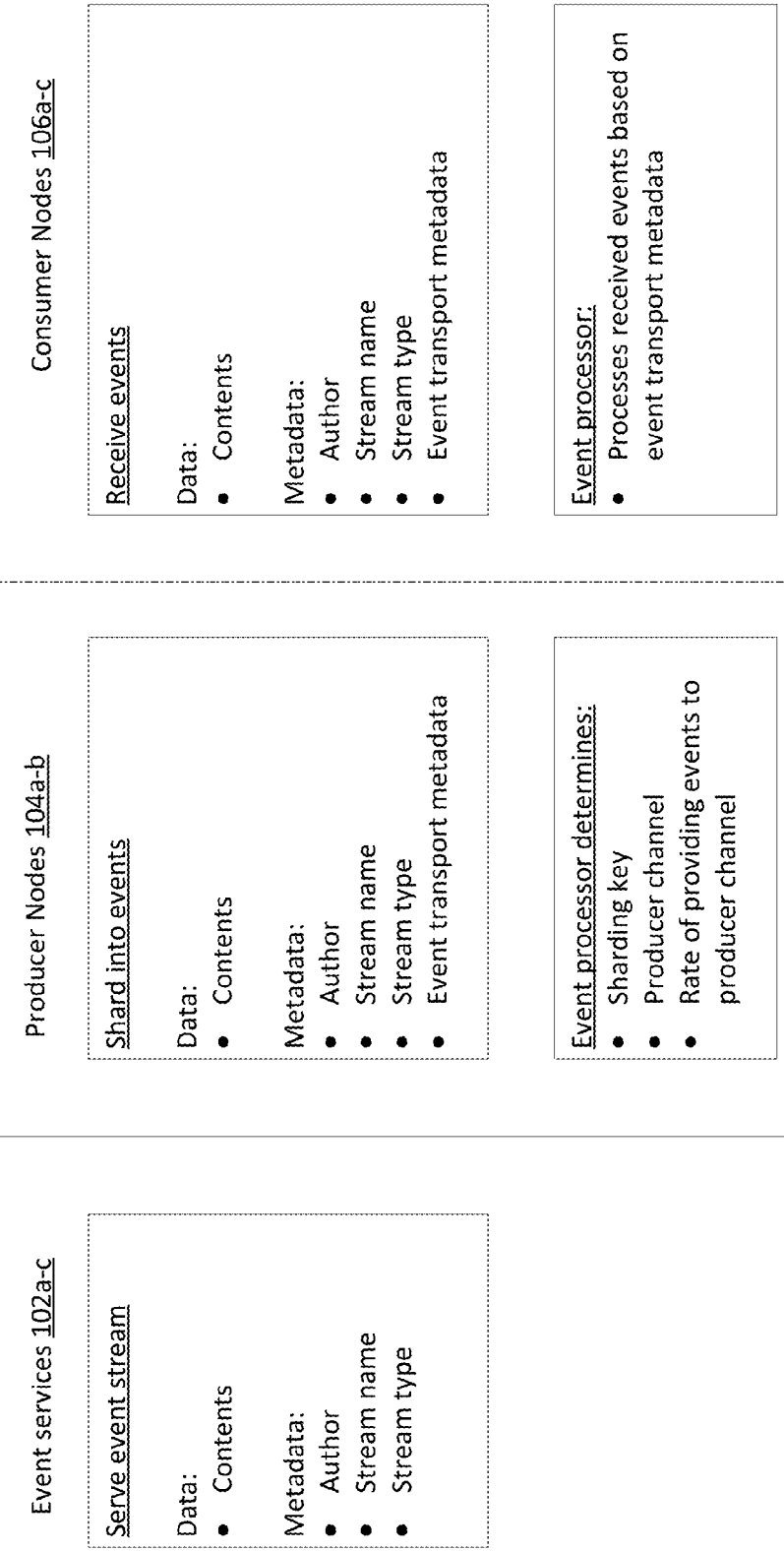
FIG. 2A illustrates an example progression of an event through the event processing system, in accordance with certain embodiments of the present invention.

FIG. 2A illustrates an example progression of an event through the event processing system, in accordance with certain embodiments of the present invention. The example progression illustrates metadata added to an event using the event processing methods from event services 102*a-c* to producer nodes 104*a-b* and ultimately to consumer nodes 106*a-c*.

The progression begins with event services 102*a-c* serving an event stream. For example, the event stream may be a series of social media microblog posts, or tweets, from microblog service Twitter. Each individual social media post can be considered an event to the event processing system. In some embodiments, an event can contain data and metadata. Non-limiting example data includes the contents of the event. An example tweet may include contents such as "I got great service at this restaurant today!" Events may also be collected into groups of related events. For example, a series of social media posts can describe a progression of events at a party. Events can also include metadata. As used herein, the term metadata refers to attributes that the event processing considers and processes separately from the underlying data in the event. Non-limiting example metadata includes the author of the social media post, a date of the social media post, an event stream type, and an event stream name.

In some embodiments, the event stream type can describe a source of the event stream. Non-limiting example event stream types can include social media services, such as Twitter, Facebook, or LinkedIn. In some embodiments, the event stream name can describe a specific instance of a stream type. The event processing supports processing multiple event streams in the cluster. The event stream name allows the event processing to address named event stream instances separately. Non-limiting example event stream names can include Finance Department, Human Resources Department, Department A, or Department B.

Producer nodes 104*a-b* receive the event stream from event sources 102*a-c*. Producer nodes 104*a-b* proceed to shard, or partition, the event stream into individual events for routing to consumer nodes 106*a-c* using the mechanisms discussed in still further detail below. In addition to the existing data and metadata associated with the events (e.g., contents, author, stream type, stream name), producer nodes 104*a-b* can also generate metadata. For example, producer nodes 104*a-b* can generate and bundle event transport metadata with received events. The event transport metadata can identify rules for the consumer node to execute upon receiving the sharded event, for example in conjunction with a rules engine. Using these identified rules, the event transport metadata can instruct the consumer node how to process the received event.

In some embodiments, in processing and routing the received event, the producer node determines various identifiers (e.g., using an event processor). For example, the producer node determines a producer channel for routing the event to a given consumer node, using a sharding key associated with the event. The sharding key groups or clusters events for routing from the producer node to the consumer node. In some embodiments, the producer node determines the sharding key based on the contents of the event. The event processing system creates a paired relationship between the producer channel and a corresponding consumer channel on a consumer node. In some embodiments, the producer node can modulate the rate of providing events to the producer channel, as a manner of flow control to improve throughput to the consumer node.

Consumer nodes 106*a-c* receive and process the transmitted event from producer nodes 104*a-b*. The data and metadata associated with the received event remain the same between consumer nodes 106*a-c* and producer nodes 104*a-b*. In some embodiments, consumer nodes 106*a-c* retrieve the bundled event transport metadata from the event. The event transport metadata identifies for consumer nodes 106*a-c* how to process the received event. In further embodiments, the event transport metadata can identify rules that are accessible to consumer nodes 106*a-c*. Non-limiting example rules can include rules to perform sentiment analysis on the received events, group or aggregate the received events for further processing, display user interface elements associated with or about the received events, or store the received events in a database. Consumer nodes 106*a-c* then execute the rules to process the received event, potentially in conjunction with a rules engine.

Figure 2B:
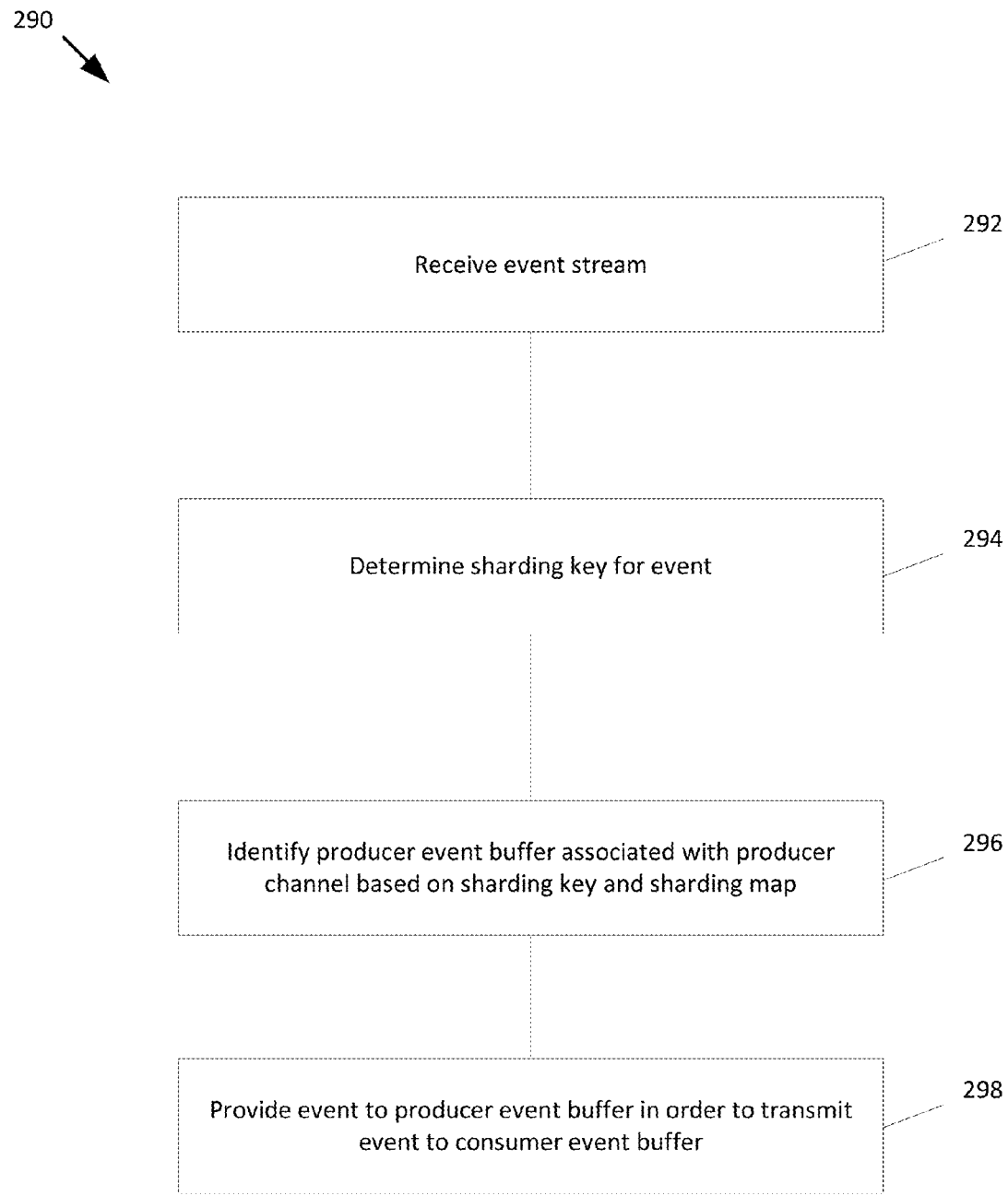
FIG. 2B illustrates an example method for event processing, in accordance with certain embodiments of the present invention.

FIG. 2B illustrates example method 290 for event processing, in accordance with certain embodiments of the present invention. A producer node receives an event stream from one or more event services (step 292). In some embodiments, the event stream can include events aggregated from multiple event services. The producer node shards, or partitions, the event stream into individual events, e.g., as described elsewhere herein.

The producer node then determines a sharding key for each individual event (step 294). In some embodiments, the producer node determines the sharding key as follows. An administrator initially configures a partition space for a given event stream. As used herein, the term partition space refers to a universe or number of chunks or partitions into which a given event stream will be divided. For example, an event stream of stream type Twitter and stream name Department A might have a partition space of 100. Another event stream of stream type Facebook and stream name Department B might have a partition space of 200. Each event in the event stream can have an associated event key. In some embodiments, the producer node can determine the event key based on the contents of the event. For example, the event key can be a hash code or fingerprint of the contents of the event. The producer node can determine the sharding key by computing a modulo of the event key for an individual event with the partition space for a given event stream. As a result, the sharding key will be a value between 0 and the partition space minus one. For example, for a partition space of 100, the computation of the sharding key results in a value from 0-99. For a partition space of 200, the computation results in a value from 0-199.

The producer node identifies a producer event buffer associated with a producer channel using the sharding key and sharding map (step 296). The sharding map correlates a sharding key with a producer channel. In some embodiments, prior to receiving an event the producer node initializes and creates these producer channels using a list of consumer channels provided by the channel map. The producer node initializes a producer event buffer for each producer channel. The producer node also creates a paired relationship between the producer channel on the producer node and a corresponding consumer channel on a consumer node. The consumer channel also has its own associated consumer event buffer.

The producer node then provides the event to the producer event buffer associated with the producer channel identified by the sharding map (step 298). The producer node has previously configured a paired relationship between the producer channel identified by the sharding map and a corresponding consumer channel on a desired consumer node. Accordingly, providing the event to the producer event buffer allows the producer node to transmit the received event to the corresponding consumer event buffer associated with the consumer channel on the consumer node. In some embodiments, the producer node can modulate the rate of providing events to the producer channel, so as to improve throughput between the producer node and consumer node using dynamic flow control.

Figure 3A:
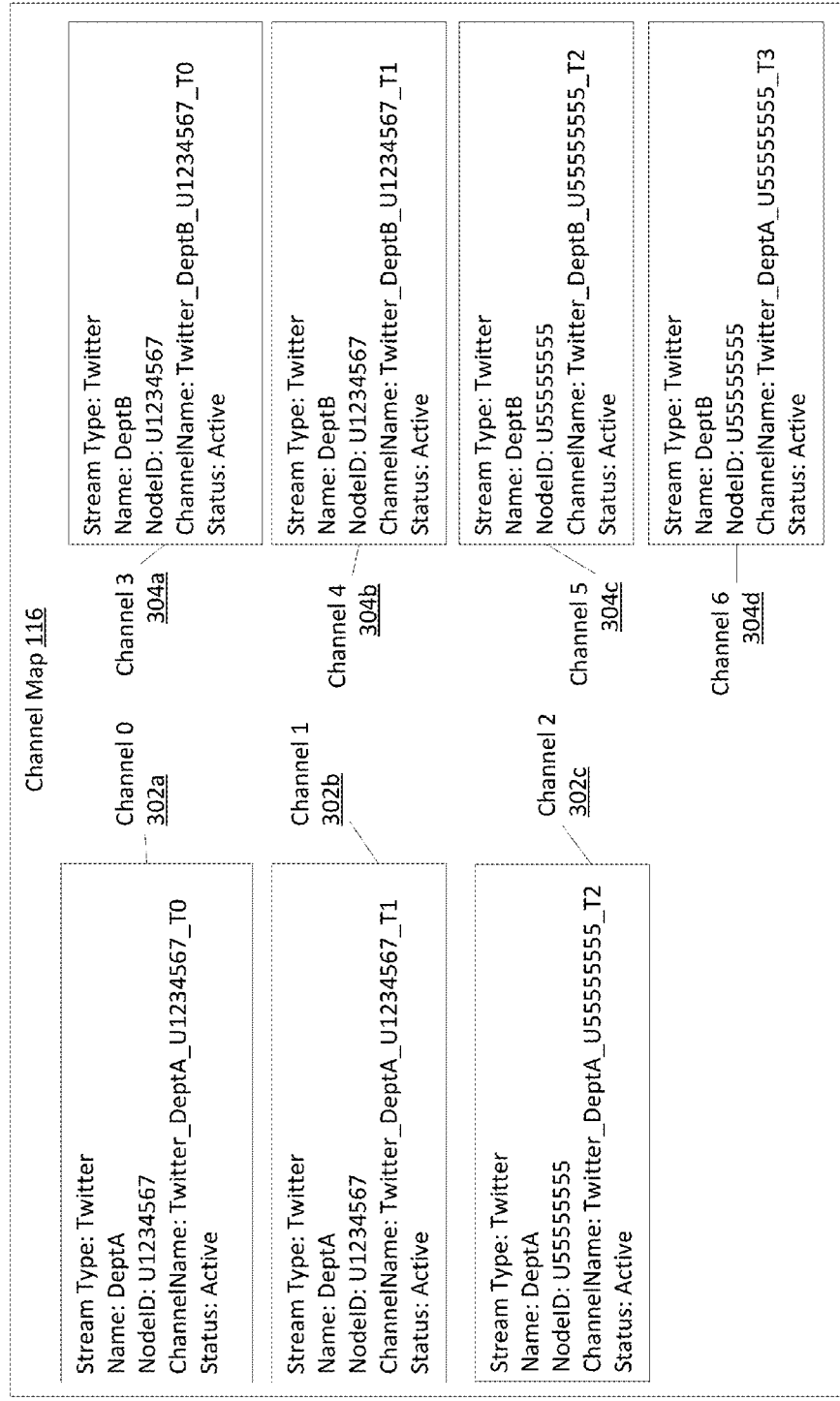
FIGS. 3A-3B illustrate an example channel map and sharding map for event processing, in accordance with certain embodiments of the present invention.

FIG. 3A illustrates example channel map 116 for event processing, in accordance with certain embodiments of the present invention. Channel map 116 tracks an inventory or universe of consumer channels available across all consumer nodes in the cluster for event processing. Channel map 116 illustrates seven example consumer channels, consumer channels 0-6 (302*a-c*, 304*a-d*). Although FIG. 3A includes seven consumer channels for illustrative purposes, the event processing can be used with any number of consumer channels across any number of consumer nodes.

Some embodiments of the event processing system associate each event stream from the event services with a given number of channels. Channels represent resources available on producer nodes and consumer nodes to receive, transmit, and process events. For example, a first event stream for stream type Twitter and stream name "Department A" may have three channels available to process the event stream. In some embodiments the event processing system implements the three channels as three producer channels on one or more producer nodes, in a paired relationship with three consumer channels on one or more consumer nodes. Similarly, a second event stream for stream type Twitter and stream name "Department B" may have four channels available which the event processing system may implement as four producer channels on one or more producer nodes, in a paired relationship with four consumer channels on one or more consumer nodes. Channel map 116 illustrates this example arrangement of three and four consumer channels 302a-c, 304a-d.

In some embodiments, channel map 116 tracks the following information per consumer channel:

Stream type: A stream type represents the general type of the event stream. A non-limiting example stream type is "Twitter." In some embodiments, the event processing system uses the stream type in the description of the event format which describes the properties of the event for a given stream type.

Stream name: A stream name is a named instance of a given stream type. A non-limiting example stream name is "Finance department," "Human resources department," "Department A," or "Department B." Some embodiments of the event processing system allow receiving and processing multiple event streams in the cluster. To keep the multiple event streams logically separate during event processing, the event processing system supports named instances that can be addressed based on stream name.

NodeID: Node ID represents the consumer node on which a particular consumer channel resides. In some embodiments, the node ID is a Hazelcast universally unique identifier (UUID) for the consumer node on which a Hazelcast topic for this consumer channel resides (see channel name below).

Channel name: Channel name allows a name to be associated with a consumer channel instance. In some embodiments, the channel name is implemented as a Hazelcast topic name.

Status: The status tracks a current status for the consumer channel. For example, the status can indicate whether or not a given consumer channel on a given consumer node is currently active, or offline for maintenance.

Channel map 116 allows the event processing to process multiple event services, such as multiple Twitter streams for different named instances of event services (e.g., different stream type and stream name). Channel map 116 tracks a first set of entries for an event stream having stream type Twitter and stream name Department A, and a second set of entries for stream type Twitter and stream name Department B. Channel map 116 indicates that three consumer channels are available to process the first event stream with stream type Twitter and stream name Department A. Consumer channels 0-2 (302a-c) show a status of Active. Furthermore, consumer channels 0-2 (302a-c) are allocated across two different consumer nodes. The first consumer node has node ID U1234567 and has two consumer channels 0-1 (302a-b) active for processing events from the event stream with stream type Twitter and stream name Department A. The second consumer node has node ID 055555555 and has one consumer channel 2 (302c) active for processing events from the event stream for stream type Twitter and stream name Department A.

Channel map 116 also indicates that the first consumer node with node ID U1234567 has four consumer channels in total. The first two consumer channels 0-1 (302a-b) are active for processing events from the first event stream, for stream type Twitter and stream name Department A. The remaining two consumer channels 3-4 (304a-b) are active for processing events from the second event stream, for stream type Twitter and stream name Department B. Similarly, channel map 116 indicates that the second consumer node with node ID 055555555 has three consumer channels in total. The first consumer channel 2 (302c) is active for processing events from the first event stream, for stream type Twitter and stream name Department A. The remaining two consumer channels 5-6 (304c-d) are active for processing events from the second event stream, for stream type Twitter and stream name Department B.

The event processing uses channel map 116 to discover dynamically what event streams are active and supported in the cluster. Furthermore, channel map 116 allows the event processing to query the channel map for an event stream of interest (e.g., by stream type and stream name), and discover a list of consumer channels and consumer nodes that are available to process events from that event stream of interest (e.g., have an Active status).

Some embodiments of channel map 116 also support elasticity in the cluster. The elasticity can include horizontal and vertical scaling. Horizontal scaling refers to support by the event processing for dynamically adding or removing producer and consumer nodes to or from the cluster. Vertical scaling refers to support for dynamically adding or removing consumer channels to or from an individual consumer node, or producer channels to or from an individual producer node. In some embodiments, when a consumer node first comes online and joins the cluster (i.e., horizontal scaling), the consumer node registers its supported event streams and consumer channels with channel map 116. In further embodiments, the producer nodes and consumer nodes can register event listeners and item listeners with channel map 116. In response to a notification of a change to channel map 116, the producer nodes or consumer nodes can react to the changes. Example changes to channel map 116 include adding new channels, removing channels, or updating node IDs, channel names, status, or other fields within a channel. Example reactions to these changes can include a producer node creating corresponding producer channels in response to receiving notifications of new consumer channel entries in channel map 116 from a consumer node. For example, a new consumer node may join the cluster (e.g., horizontal scaling), or an existing consumer node may add support for additional consumer channels (e.g., vertical scaling). In either case, the producer and consumer nodes in the cluster can react accordingly to changes to channel map 116 in response to update notifications from the event listeners and item listeners.

Figure 3B:
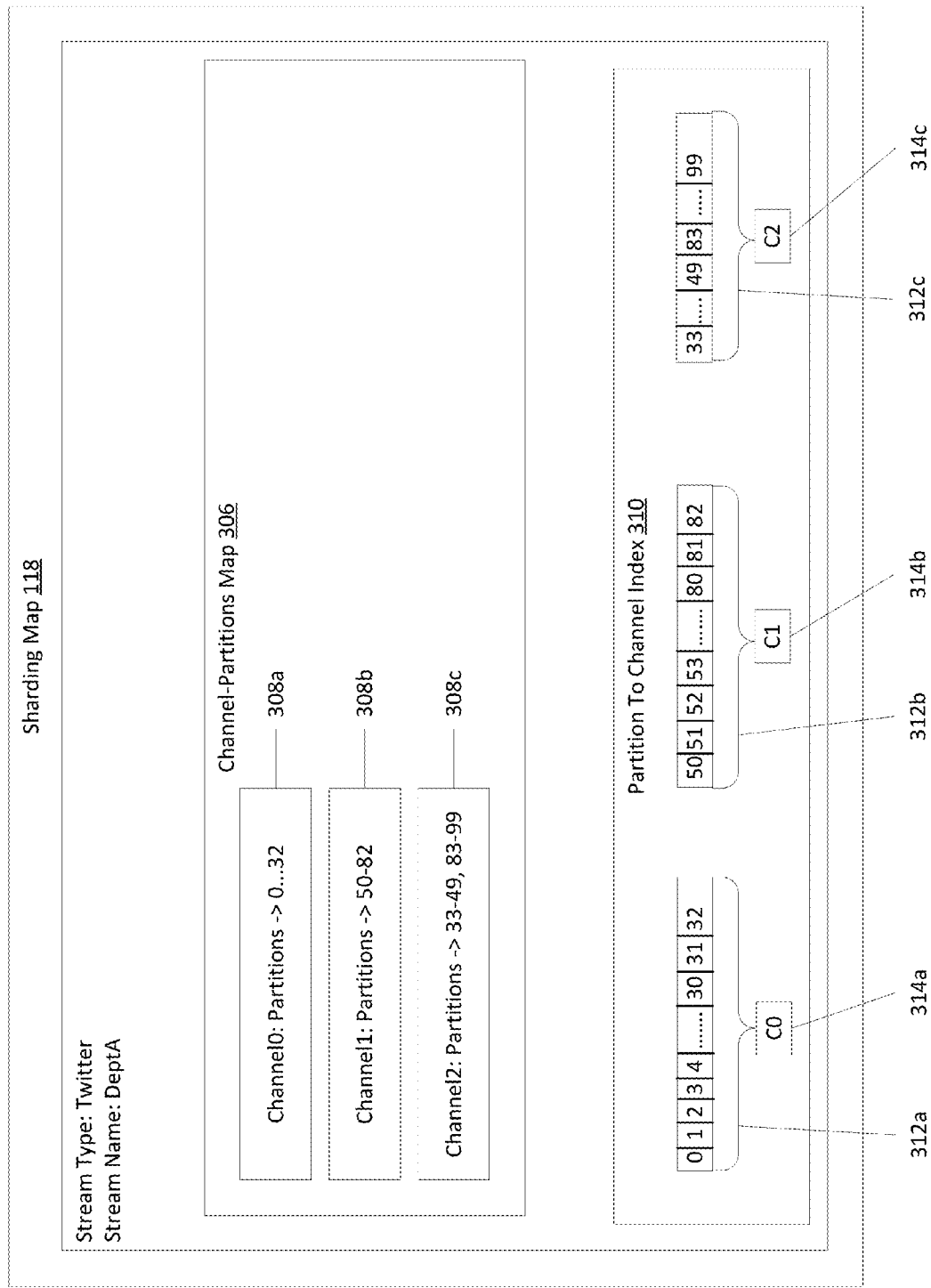

FIG. 3B illustrates example sharding map 118 for event processing, in accordance with certain embodiments of the present invention. Some embodiments of sharding map 118 correlate a partition for a given event from the event stream with a producer channel on the producer node. The producer node is then able to provide the event into the producer channel which transmits the event to a corresponding consumer channel on the consumer node. Sharding map 118 includes channel-partitions map 306 and partition-to-channel index 310.

Sharding map 118 correlates partitions for a given event with a producer channel on the producer node. In some embodiments, an administrator configures a partition space for each event stream of interest. The partition space defines a count of discrete chunks that events will be broken into, for a given event stream. In some embodiments, the event system can determine the partition space according to a partition criterion. For example, the producer node can identify based on the channel map a count of consumer nodes available to process the event stream. Upon detecting a relatively higher count of consumer nodes available, the event system can suggest increasing the partition space, to reflect increased capacity for processing the events in the event stream. Upon detecting a relatively lower count of consumer nodes, the event system can suggest decreasing the partition space to reflect decreased capacity for event processing. Alternatively, in some embodiments the partition space can have a predefined default value of 100. Based on the default value of 100, the producer node can partition received events into a value between 0-99 using sharding map 118. For example, if the partition space has a value of 50, the producer node can assign received events a sharding key between 0-49. If the partition space has a value of 200, the producer node can assign a sharding key between 0-199.

When the producer node receives an event stream from one or more event services, the producer node uses sharding map 118 to determine a sharding key for individual events in the event stream and route the events to a producer channel for transmission. In some embodiments, the producer node determines the sharding key as follows. The producer node determines an event key for an individual event. For example, the producer node may determine the event key based on the contents of the event, such as determining a hash code (or fingerprint) of the event. The producer node determines the appropriate partition by calculating a modulo of the event key with the partition space. The producer node looks up the resulting partition in partition-to-channel index 310. For example, if the resulting partition has a value of three, partition-to-channel index 312a would apply and the producer node would provide the event to producer channel 0 (314a). If, instead, the resulting partition has a value of 52, partition-to-channel index 312b would apply and the producer node would provide the event to producer channel 1 (314b). If the resulting partition has a value of 49, partition-to-channel index 312c would apply and the producer node would provide the event to producer channel 2 (314c).

In some embodiments, the event processing system creates and populates sharding map 118 based on channel map 116 according to a sharding algorithm executing, e.g., on one or more of the nodes. With reference to FIG. 3A, during initialization the producer node establishes a paired relationship between producer channels 0-2 (314a-c) and consumer channels 0-2 (302a-c) tracked in channel map 316. That is, when a producer node comes online and joins the cluster, the producer node uses the sharding algorithm to update sharding map 118 based on channel map 116 and the partition space, creates producer channels 0-2 (314a-c), and creates the paired relationship between producer channels 0-2 (314a-c) and consumer channels 0-2 (302a-c) tracked in channel map 316.

In one embodiment, the sharding algorithm evenly distributes the partition space uniformly across available producer channels. For example, if the partition space is 100 and there is one producer channel active, the partition-to-channel index would reflect:

| Producer Channel | Partitions |
| --- | --- |
| producer channel 0 | partitions 0-99 |

In response to a notification that a consumer node has added another active consumer channel, the producer node can expand dynamically and create another producer channel (i.e., vertical scaling). In this embodiment of the sharding algorithm, the partition-to-channel index would become:

| Producer Channel | Partitions |
| --- | --- |
| producer channel 0 | partitions 0-49 |
| producer channel 1 | partitions 50-99 |

The producer node can also populate the channel-partitions map and the partition-to-channel index using these results from the sharding algorithm.

Another embodiment of the sharding algorithm populates sharding map 118 by distributing the partition space dynamically using an overflow portion in response to updates to the available consumer channels. In this embodiment, the sharding algorithm determines an updated partition size based on an updated count of available consumer channels, and assigns overflow portions of the partition space and the updated partition size to a newly added producer channel.

For example, when a consumer node comes online and joins the cluster, the consumer node may advertise one active consumer channel (channel 0) for an event stream of interest. When the producer node receives a notification of the newly active consumer channel, the producer node updates sharding map 118 by assigning all partition values of the partition space to a corresponding new producer channel:

| Producer Channel | Partitions |
| --- | --- |
| producer channel 0 (new) | partitions 0-99 |

Subsequently, the consumer node may elect to expand the number of consumer channels available, for example by adding a second consumer channel. In response to a notification of the newly active consumer channel, the producer node may redistribute the partition space. The producer node determines an updated partition size based on an updated count of available consumer channels. In some embodiments, the producer node calculates $$pz=ps/c \qquad \text{Equation (1)}$$

where pz refers to the updated partition size, ps refers to the size of the partition space, and c refers to the updated number of consumer channels. For example, if the consumer node expands the number of consumer channels available to two (c=2), the producer node calculates $$pz=ps/c$$

$$50=100/2$$

The producer node assigns partitions to existing producer channels based on the updated partition size pz, and determines an overflow portion of the existing producer channel based on the updated partition size pz and the previous partitions assigned to the producer channel. For example, the producer node dynamically redistributes the partition space as follows:

| Producer Channel | Partitions |
| --- | --- |
| producer channel 0 (existing) | updated partitions 0-49 (pz = 50) previous partitions 0-99 overflow portion partitions 50-99 |
| producer channel 1 (new) | receive overflow portion partitions 50-99 |

The producer node updates the sharding map accordingly to reflect the redistributed partition space.

The consumer node may elect to expand further the number of consumer channels available by adding a third consumer channel. The producer node again determines an updated partition size based on an updated count of available consumer channels (c=3):

$$pz=ps/c$$

$$33=100/3$$

The producer node assigns partitions to existing producer channels based on the updated partition size pz, and distributes the overflow portions of the existing producer channels to the new producer channel.

| Producer Channel | Partitions |
| --- | --- |
| producer channel 0 (existing) | updated partitions 0-32 (pz = 33) previous partitions 0-49 overflow portion partitions 33-49 |
| producer channel 1 (existing) | updated partitions 50-82 (pz = 33) previous partitions 50-99 overflow portion partitions 83-99 |
| producer channel 2 (new) | receives overflow portions partitions 33-49, 83-99 |

The producer node proceeds to update sharding map 118 using these values for channel partitions map 306 and partition-to-channel index 310.

In further embodiments, the sharding algorithm assigns partitions to producer channels by determining statistics using channel map 116. For example, the event processing may query the consumer nodes in the cluster to identify available resources for a given consumer node. Non-limiting example resources can include central processing unit (CPU) processor speed or number of cores, available memory or memory speed, available storage capacity or storage read/write speed, network connection speed, a count of existing consumer channels, or combinations thereof. Based on the available resources and on channel map 116, the event processing may determine weighted statistics to assign partitions to producer channels in sharding map 118. For example, if the event processing determines that consumer node U1234567 contains a faster CPU or more memory than other consumer nodes, the event processing may consult channel map 116 to identify consumer channels on consumer node U1234567 (e.g., using a producer node). The sharding algorithm may then assign more partitions to producer channels in sharding map 118 that correspond to consumer channels identified as having more available resources in channel map 118.

Channel-partitions map 306 tracks a related mapping as partition-to-channel index 310. In some embodiments, channel-partitions map 306 can support elasticity in the cluster, such as horizontal or vertical scaling. Channel-partitions map 306 allows sharding map 118 to identify what partitions are associated with a given producer channel and reassign the associated partitions quickly to expand or contract the cluster. For example, channel-partitions map 306 tracks that producer channel 0 can process partitions 0-32 (index 308a), producer channel 1 can process partitions 50-82 (index 308b), and producer channel 2 can process partitions 33-49 and 83-99 (index 308c).

Figure 4A:
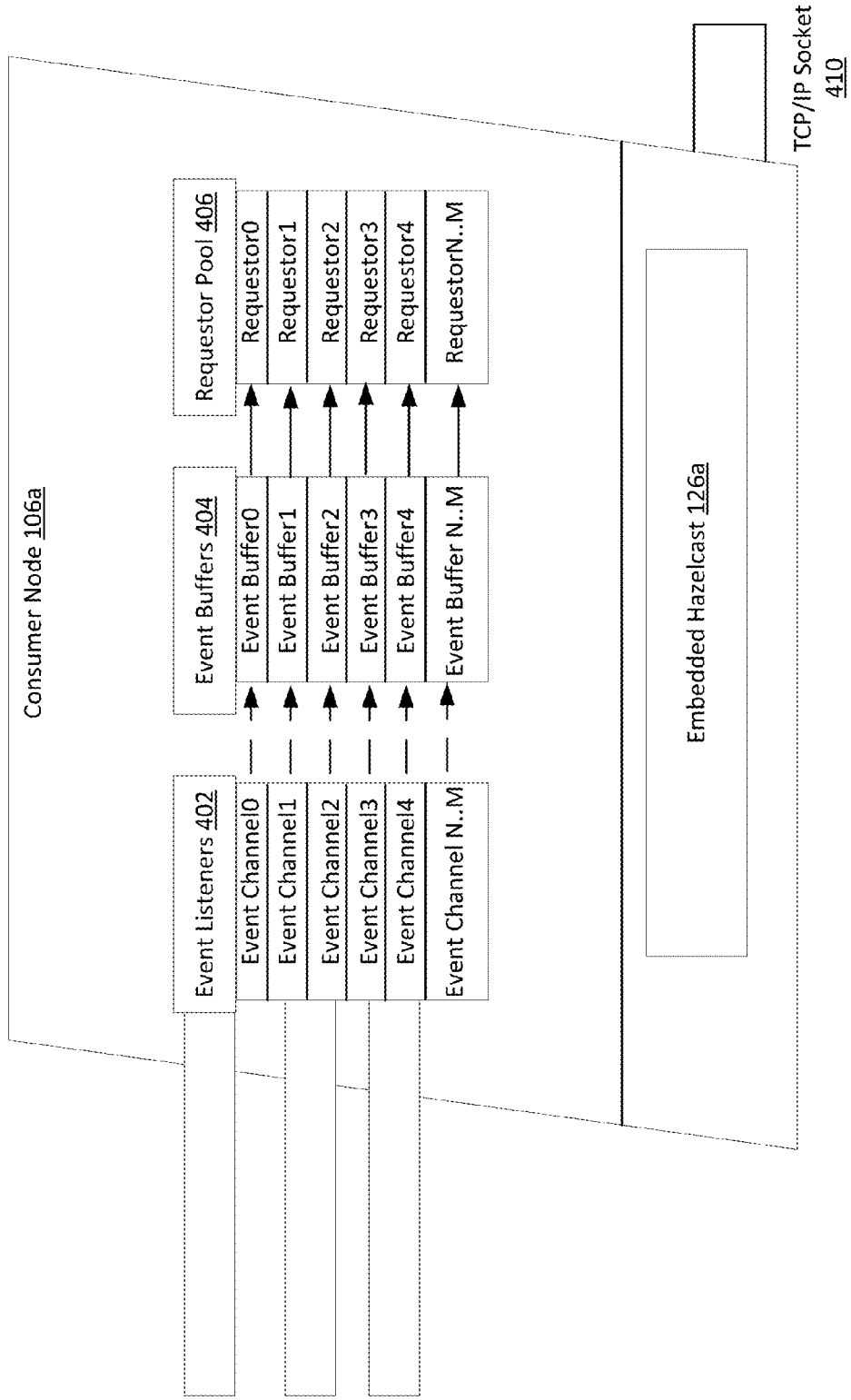
FIGS. 4A-4B illustrate an example consumer node for event processing, in accordance with certain embodiments of the present invention.

FIG. 4A illustrates example consumer node 106a for event processing, in accordance with certain embodiments of the present invention. Consumer node 106a includes event listeners 402, consumer event buffers 404, and requester pool 406. Consumer node 106a uses embedded Hazelcast 126a for communication with other producer nodes and consumer nodes over TCP/IP socket 410.

In some embodiments, when consumer node 106a comes online and joins the cluster, the consumer node consults its configuration to identify event streams of interest. For example, the configuration may contain a collection of entries from an administrator that list stream types and stream names of event streams for processing by consumer node 106a. Consumer node 106a creates a set of event listeners 402 for each event stream entry in the configuration. Consumer node 106a further creates corresponding consumer event buffers 404. For example, consumer node 106a can create one consumer event buffer per consumer channel in the set of event listeners 402. In some embodiments the number of event listeners 402 in the set is equal to the value defined in the configuration, or defaults to five. Consumer node 106a further creates requestor pool 406 and pairs one requester with each consumer event buffer.

To create the paired relationship between consumer channels and producer channels, the consumer node registers the newly created consumer channels into the channel map. In some embodiments, the channel map is a Hazelcast distributed map for registering the event listeners and consumer node 106a uses embedded Hazelcast 126a over TCP/IP socket 410 for reading and writing updates to and from the channel map. When one or more producer nodes come online and join the cluster, the producer nodes can then read the channel map to determine how many producer channels to create. In this manner, based on the channel map the producer nodes are able to create and update the sharding map used to transmit events to the various consumer nodes in the cluster.

Figure 4B:
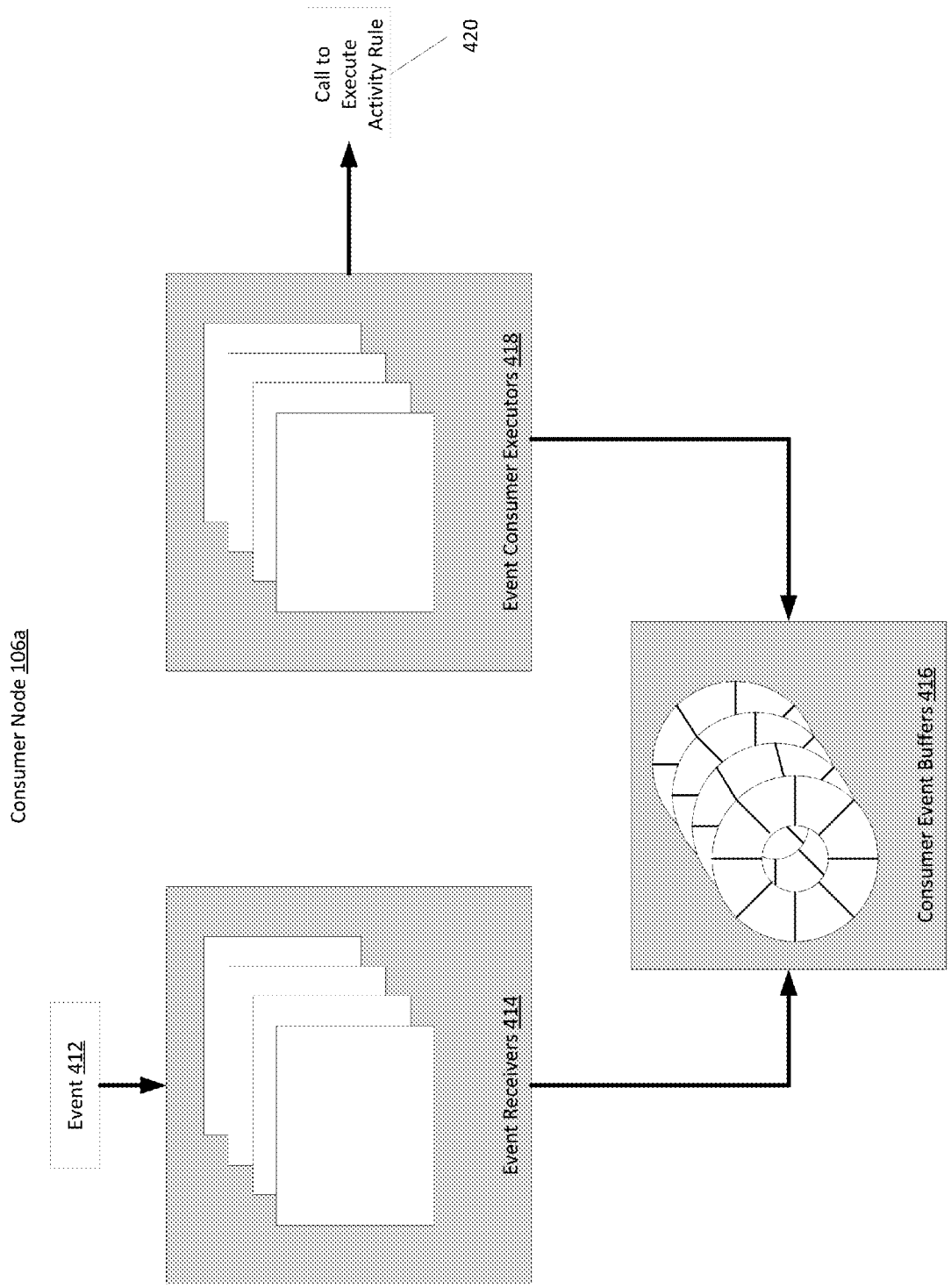

FIG. 4B further illustrates example consumer node 106a for event processing, in accordance with certain embodiments of the present invention. In some embodiments, consumer node 106a implements each consumer channel in three parts: event receivers 414, consumer event buffers 416, and event consumer executors 418. This architecture improves the ability of consumer node 106a to receive messages with enhanced throughput. With reference to FIG. 4A, consumer node 106a uses an event listener registered to receive update notifications from the channel map, for the consumer channel that represents a given event stream. For example, consumer node 106a registers a Hazelcast event listener with the channel map to receive update notifications about an event stream type and stream name of interest.

The event listener uses a consumer event buffer 416 to buffer received events 412. In some embodiments, consumer event buffers 416 are implemented using ring buffer data structures provided by a Disruptor platform. As those skilled in the art will appreciate, the Disruptor platform refers to a publicly available third-party architecture and processing mechanism for high-speed parallel processing, also referred to as concurrency. In further embodiments the ring buffers can be configured with a single thread input and a single thread output (e.g., using event consumer executors 418). This single thread usage provides enhanced throughput over a traditional usage of the Disruptor platform.

Regarding traditional usage, the Disruptor architecture provides components that process volumes of data concurrently, with low latency. The Disruptor architecture implements a data structure referred to herein as a ring buffer. A ring buffer performs similarly to a queue. The event processing system can push data onto and pop data off the ring buffer for processing. Disruptor ring buffers can be used similarly to a network of queues that can operate without needing locks. Locks provide thread safety by avoiding unexpected data corruption due to parallel processing, but also add significant and unwanted complexity. Traditionally the Disruptor pattern is designed for a system to use multiple threads to read from and write to ring buffers. However, using the Disruptor architecture in the traditional manner lowers throughput and reduces performance.

In general, the speed at which the event processing delivers events is affected by the ability to process and serialize the event for delivery. Traditional implementations have projected throughput in the range of 15,000-20,000 events per second. However, this traditional throughput is well below the steady state throughput desired to provide a performant high speed event processing service. To increase throughput, traditional systems can also use multi-threading architectures and aggregate structures. When considering a traditional multi-threading solution, thread contention is one problem to solve. Traditionally, a simplistic approach can use a Java queue with one thread pushing messages onto the queue and one or more threads pulling messages off the queue. To do this, the simplistic approach needs to consider efficient use of the queue as well as thread interactions between pushing messages in and pulling messages off. Instead of a traditional queue, the Disruptor platform delivers higher performance when accessing data by pushing in and pulling off the data from the ring buffer. However, traditional implementations using Disruptor ring buffers use multiple threads to interact with the ring buffers.

In contrast to traditional implementations, in the event processing system the single thread input and single thread output from consumer event buffers 416 (and the corresponding producer event buffers) help differentiate consumer node 106a. Furthermore, the paired consumer channel and producer channel and sharding algorithm applied by the producer node help the event processing system increase throughput over fourfold (e.g., 100,000 messages or more per second) when compared with traditional implementations.

The consumer node passes the received events to event consumer executors 418. Some embodiments of event consumer executors 418 identify a rule associated with received event 412. For example, event transport metadata that the producer node bundles with the event can help identify the appropriate rule for consumer node 106a. Consumer node 106a can then make a call 420 to execute the corresponding rule. For example, event consumer executors 418 can call into the rules engine to get a pre-allocated requestor object dedicated to execution of the rule associated with the received event.

Figure 5A:
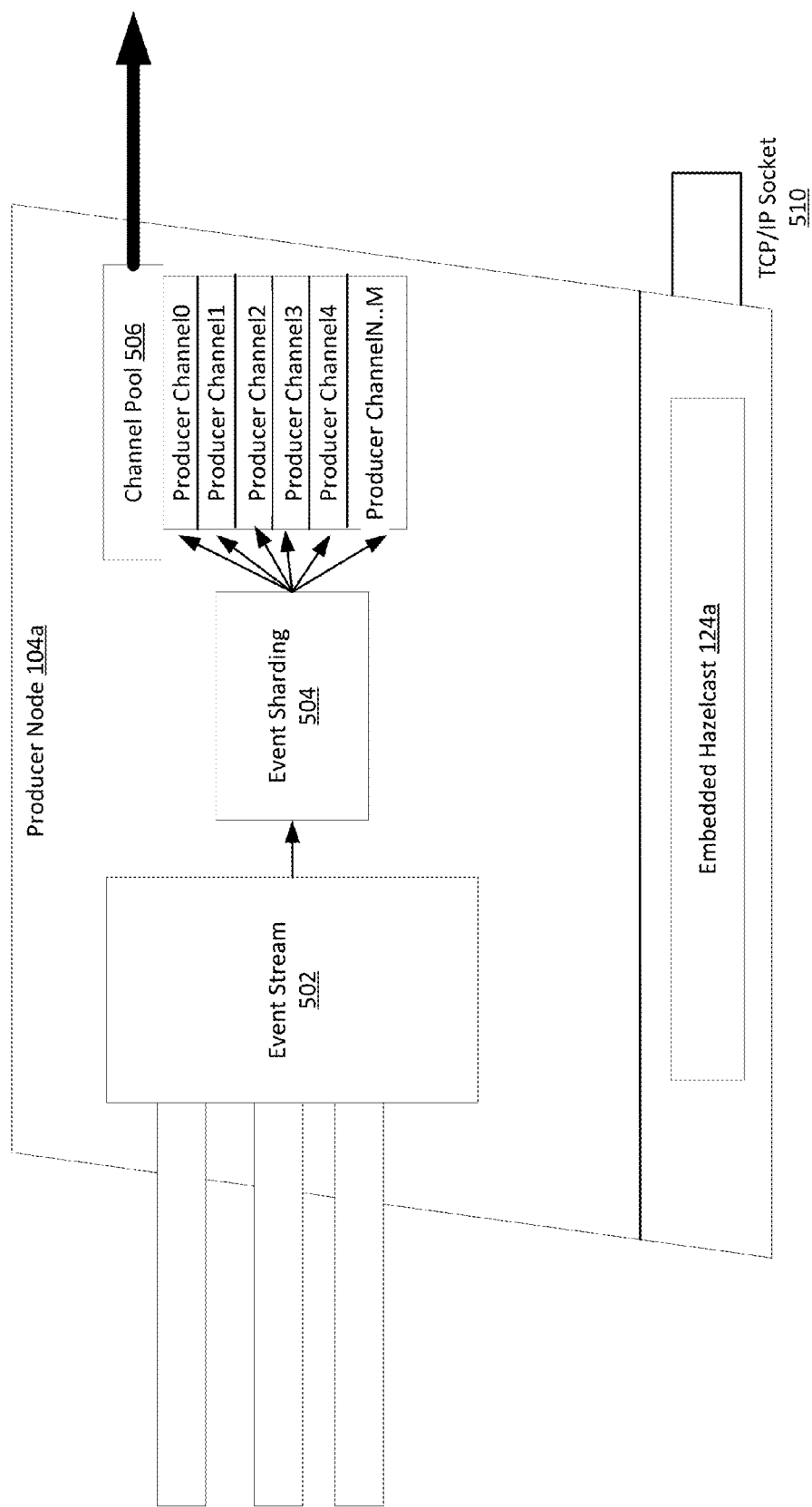
FIGS. 5A-5B illustrate an example producer node for event processing, in accordance with certain embodiments of the present invention.

FIG. 5A illustrates example producer node 104a for event processing, in accordance with certain embodiments of the present invention. Producer node 104a includes event stream 502, event sharding module 504, and channel pool 506. Producer node 104a is in communication with other producer and consumer nodes in the cluster using embedded Hazelcast 124a and TCP/IP socket 510.

An event service can begin to transmit events to producer node 104a via event streams 502. In some embodiments, the event processing helps the events to arrive in the cluster in the order in which the event service presented the events. When producer node 104a comes online and joins the cluster, producer node 104a retrieves and reads the channel map from the cluster. In some embodiments, the channel map is a Hazelcast distributed map and producer node 104a uses embedded Hazelcast 124a to read the channel map over TCP/IP socket 510. Producer node 104a uses the channel map to determine updates to the sharding map and identify what producer channels to create. The channel map contains information about the consumer nodes in the cluster and which event streams and consumer channels the consumer nodes support. In some embodiments, producer node 104a uses the sharding map in combination with the channel map to determine the consumer node destination of a given event. For example, producer node 104a first receives event stream 502. Producer node 104a shards, or partitions, event stream 502 into individual events (e.g., using event sharding module 504). After sharding event stream 502 into individual events, producer node 104a determines a sharding key for each event based on an event key generated upon receiving the event (e.g., also using event sharding module 504). Producer node 104a looks up the corresponding producer channel among channel pool 506, based on the sharding key in the sharding map. The sharding map identifies a producer channel for transmitting the event. The sharding map helps producer node 104a ultimately deliver a given event consistently to the same producer channel that corresponds to the sharding key and partition determined by the producer node. The paired relationship between the producer channel and consumer channel consequently help the producer node ultimately deliver the event to the same consumer channel on the same consumer node for a given event stream.

Figure 5B:
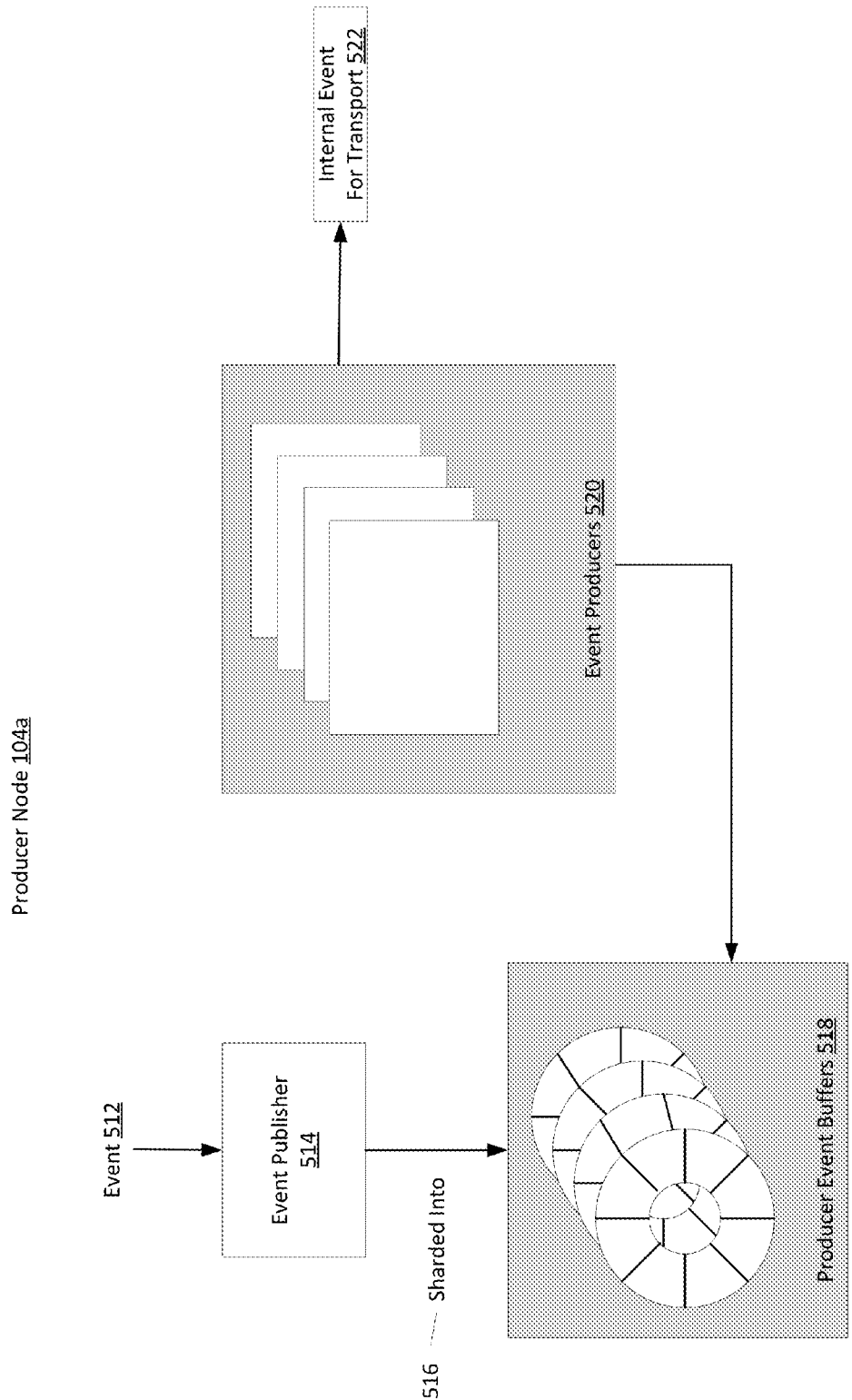

FIG. 5B further illustrates example producer node 104a for event processing, in accordance with certain embodiments of the present invention. Upon coming online and joining the cluster, producer node 104a creates producer channels in conjunction with the universe of consumer channels available in the cluster, as tracked in the channel map based on event streams (e.g., based on stream type and stream name). When a remote client requests event publisher 514, producer node 104a receives from the remote client the event stream to which the remote client would like to publish events. For example, producer node 104a can allocate producer channels based on stream type and stream name. The channel map tracks for producer node 104 how many consumer channels are available for a given event stream, for each consumer node in the cluster. In some embodiments, event publisher 514 then creates a corresponding set of producer event buffers 518. For example, event publisher 514 can produce a one-to-one match of producer event buffers on the producer node in a paired relationship with a corresponding event listener on a consumer node in the cluster.

Producer node 104a shards 516 the received event stream into individual events according to the following algorithm. Producer node 104a divides the received event stream into individual events. For a given event 512, producer node 104a determines an event key for the event. In some embodiments, the event key is determined based on the contents of event 512. For example, the event key may be a hash code or fingerprint of the contents of event 512. Producer node 104a computes the sharding key by determining a modulo of the event key with the partition space. Producer node 104a identifies a producer channel for transmitting the event, by retrieving the corresponding sharding key in the sharding map for the event stream. Event publisher 514 places event 512 into producer event buffer 518 in the producer channel identified by the sharding map for the event stream. Producer event buffer 518 then routes event 512 from the producer channel to the consumer channel on the corresponding consumer node in the cluster. Upon receiving event 512, the consumer node buffers event 512 for execution.

Figure 6:
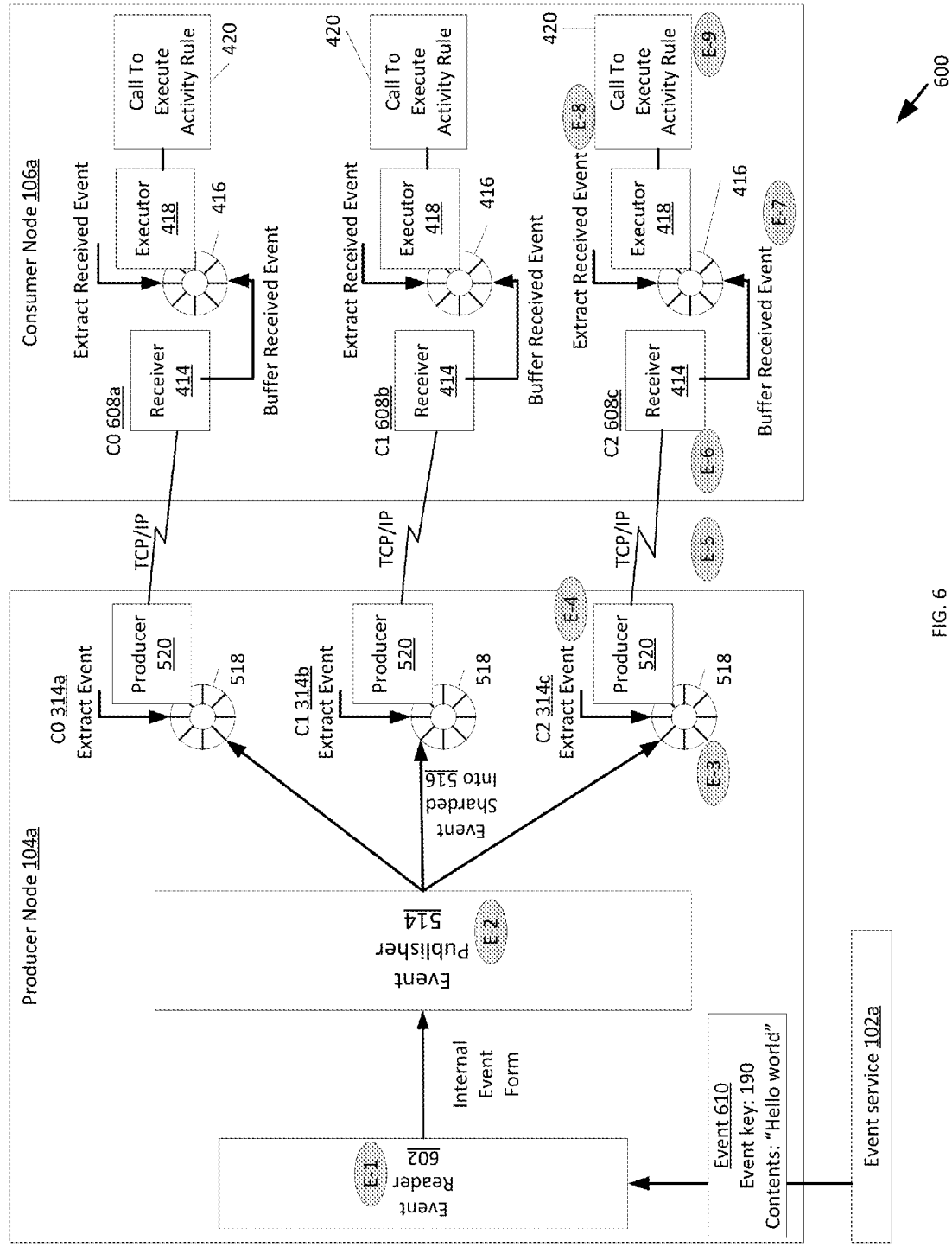
FIGS. 6-7 illustrate example event processing systems, in accordance with certain embodiments of the present invention.

FIG. 6 illustrates example event processing system 600, in accordance with certain embodiments of the present invention. Event processing system 600 includes event reader 602 in communication with producer node 104*a*, which is in communication with consumer node 106*a*. Event processing system 600 is able to scale to an improved throughput of hundreds of thousands of messages per second. In contrast, traditional message bus architectures are only able to achieve example throughputs of 15,000-25,000 messages per second. To achieve this enhanced throughput, event processing system 600 employs a combination of technology configured in a unique way.

One aspect that contributes to enhanced throughput is a symbiotic paired relationship between producer channels 314*a-c* and consumer channels 608*a-c*. Specifically, some embodiments of the event processing system leverage a symbiotic paired relationship between producer channels 314*a-c* and producer event buffers 518 on producer node 104*a*, and consumer channels 608*a-c* and consumer event buffers 416 on consumer node 106*a*. Event processing system 600 achieves massive speed because producer node 104*a* separates and buffers received events so that a single producer event buffer 518 has a direct TCP/IP connection to a corresponding single consumer channel 608*a-c* and consumer event buffer 416. In some embodiments, this symbiotic paired relationship also allows event processing system 600 to include flow control per paired producer channel 314*a-c* and consumer channel 608*a-c*. For example, event processing system 600 can affect the rate at which a consumer channel 608*a-c* receives and processes events, and match or modulate the speed on a producer event buffer 604*a* to achieve the desired rate indirectly on a corresponding consumer channel 608*a-c*. Further embodiments of the flow control can be dynamic, for example by altering the flow rate periodically (e.g., about every thousand messages). The result of this flow control is a steady state in which a producer event buffer 518 and a consumer event buffer 416 on a corresponding consumer channel 608*a-c* are operating at a related rate to achieve enhanced throughput.

Event processing system 600 begins by receiving an event stream from event service 102*a*. For example, an external source of the event stream can be a Twitter feed. Some embodiments of event processing system 600 can use an application programming interface (API) for retrieving social media data to retrieve the event stream of interest, such as an API provided by Gnip, Inc. of Boulder, Colo., United States. Event processing system 600 illustrates a cluster including producer node 104*a* in communication with event service 102*a* and consumer node 106*a*. Consumer node 106*a* announces an ability to accept event streams for Twitter events for Dept. A (e.g., stream type=Twitter and stream name=Dept. A). In this example an administrator has configured consumer node 106*a* to have three active consumer channels (channel 0 (608*a*), channel 1 (608*b*), channel 2 (608*c*)) for event stream Twitter/Dept. A. Consumer channels 0-2 (608*a-c*) receive and process events from producer node 104*a*. Producer node 104*a* is in communication with event service 102*a* serving the event stream for Twitter/Dept. A in the cluster.

Consumer node 106*a* contains three event receivers 414 associated with consumer channels 0-2 (608*a-c*). Each event receiver 414 has an associated consumer event buffer 416 along with an event consumer executor 418. Event consumer executor 418 pops events off consumer event buffers 416 for execution. In some embodiments, consumer event buffers 416 can be ring buffers using the Disruptor architecture.

Event processing system 600 illustrates symbiotic paired relationships on producer node 104*a*. Producer node 104*a* contains a producer channel 0-2 (314*a-c*) and producer event buffer 518 for each corresponding consumer channel 0-2 (608*a-c*). Producer event buffers 518 are in a paired relationship with each corresponding consumer channel 0-2 (608*a-c*). Each producer ring buffer 518 has a producer mechanism 520 that pops events off producer event buffers 518 for transmission to the corresponding consumer channel 0-2 (608*a-c*).

Event publisher 514 contains sharding logic 516 to shard, or partition, the received event stream into individual events including event 610. Event publisher 514 directs the sharded event 610 to one of producer channels 314*a-c* which directs the event in turn to an associated producer event buffer 518. Event publisher 514 determines the desired producer channel 314*a-c* using the sharding map based on a sharding key for event 610.

FIG. 6 also illustrates an example path taken by an individual event 610. Event reader 602 begins by reading and sharding event 610 from an event stream provided by event service 102*a* (step E-1). For example, event service 102*a* can be a Twitter feed. Event 610 can have contents "Hello world" corresponding to an event key of 190. Producer node 104*a* determines a sharding key and corresponding producer channel for the event (step E-2). In some embodiments, producer node 104*a* determines the sharding key based on the event key and the partition space. For example, producer node 104*a* can compute a modulo of the event key with the partition space. If the partition space has a value of 100, then 190% 100=90, where x % y represents a modulo operator that returns the remainder of x divided by y. The resulting sharding key is therefore 90. With reference to FIG. 3B, looking up the sharding key of 90 in partition-to-channel index 312*c* of sharding map 118 yields producer channel 2 (314*c*).

Producer node 104*a* passes the sharded event to producer channel 2 (314*c*) which inserts the event into the associated producer event buffer (step E-3). The event winds its way through the producer event buffer. An extraction thread in the associated event producer extracts the event (step E-4). The extraction thread serializes the event and transmits the event to consumer channel 2 (608*c*), for example using TCP/IP (step E-5). The receiver associated with consumer channel 2 (608*c*) receives the event (step E-6) and inserts the received event into the consumer event buffer associated with consumer channel 2 (608*c*). The consumer event buffer buffers the received event waiting to be processed (step E-7). The event makes its way around the consumer event buffer and the associated event consumer executor retrieves the event using an extraction thread for execution (step E-8). Consumer node 106*a* executes processing associated with the event (step E-9). In some embodiments, consumer node 106*a* converts the event using internal data structures and uses event transport metadata bundled with the event to identify rules of interest for processing the event using an associated rule engine to execute the rules. Consumer node 106*a* then makes call 420 to execute the identified rule. In some embodiments, the identified rule can be an activity rule that identifies an activity for event processing system 600 to perform.

Figure 7:
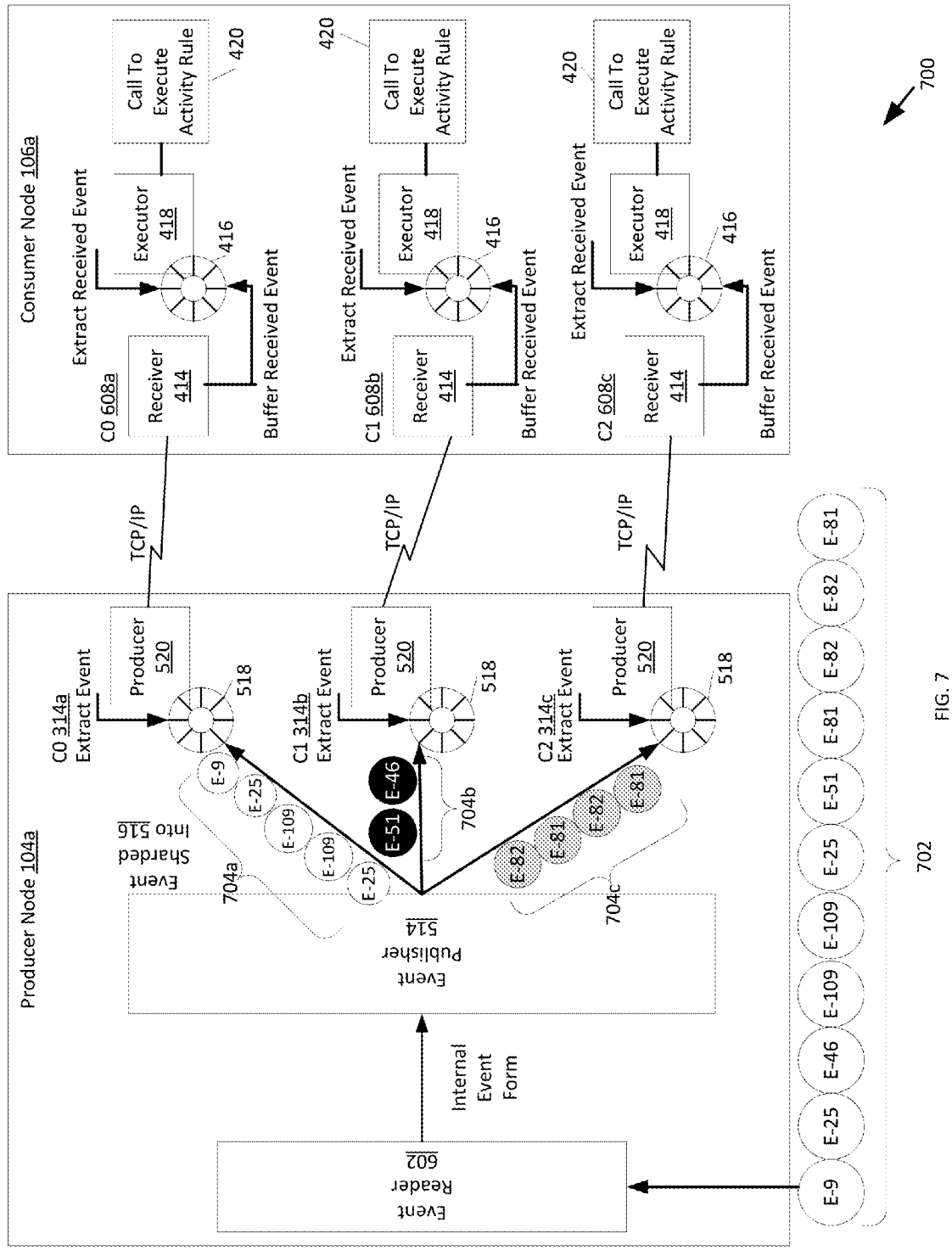

FIG. 7 illustrates example event processing system 700, in accordance with certain embodiments of the present invention. Event processing system 700 illustrates sharding events that have different event keys and sharding keys. Producer node 104a receives an incoming event stream 702 that includes multiple events. Each event has an event key associated with the event, illustrated as E-9, E-25, E-46, E-109, etc. Some embodiments of event processing system 700 can determine the event key based on the contents of the event, such as a hash code or fingerprint of the event. Event reader 602 reads event stream 702 from an event service (not shown) and converts the event stream into an internal event form that event processing system 700 can process. Event publisher 514 shards 516 event stream 702 into individual events. Each event has the event key illustrated (e.g., E-9, E-25, E-46, E-109, etc.). In some embodiments, producer node 104a preserves the order of arrival of the individual events in event stream 702.

Producer node 104a uses the sharding map and partition space to determine a sharding key for a given event. The sharding key identifies the producer channel 314a-c to receive the sharded event. In some embodiments, the sharding algorithm of computing a modulo of the event key with the partition space determines the sharding key. For example, given an event key of E-109 and a partition space of 100, one embodiment of the sharding algorithm would return a sharding key of 109% 100=9. Producer 104a can look up the sharding key in the sharding map to identify the appropriate producer channel 314a-c for the event. With reference to FIG. 3B, for a sharding key of 9, partition-to-channel index 312a of sharding map 118 identifies producer channel 0 (314a).

Event publisher 514 provides the sharded events to producer channels 0-2 (314a-c) in order, in groups 704a-c (also illustrated in white, black, and gray). Producer channels 0-2 (314a-c) use producer event buffers 518 and event producers 520 to transmit the sharded events. The sharded events travel over TCP/IP to corresponding consumer channels 0-2 (608a-c) on consumer node 106a. Event receivers 414 receive the sharded events into consumer event buffers 416. Event consumer executors 418 extract the received events from event stream 702. Event consumer executors 418 then make calls 420 to execute any rules identified by event transport metadata bundled with the received events. Consumer node 106a may execute the identified rules on a rules engine that is remote to consumer node 106a and producer node 104a, or the rules engine may be locally installed on the consumer node or producer node.

Example Use Cases

Figure 8:
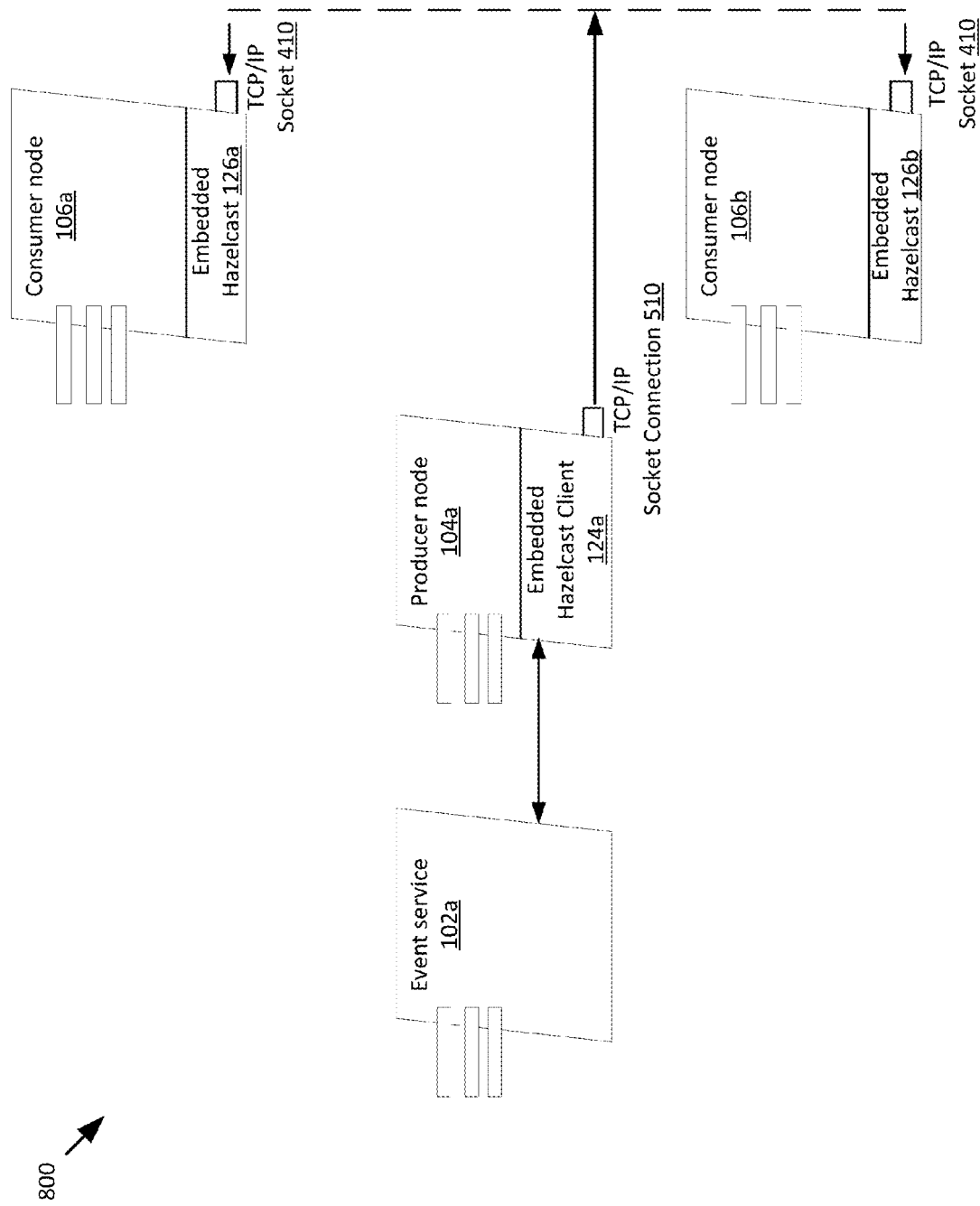
FIG. 8 illustrates an example event processing system for processing social media events, in accordance with certain embodiments of the present invention.

FIG. 8 illustrates an example event processing system 800 for processing social media events, in accordance with certain embodiments of the present invention. The power and flexibility of event processing system 800 allows customers to consume, analyze and react to social media event feeds. Event processing system 800 can support example social media event feeds like Twitter, LinkedIn, etc. Event processing system 800 further allows the customer to filter which events are transmitted to consumer nodes for event processing and which events are ignored. Event processing system 800 allows the customer to use declarative models to describe its desired specific usage of an incoming message. Non-limiting example usages of event processing system 800 can include complex pattern matching, aggregation based on rule conditions, and data transforms for analysis.

An example company GoCars Corp may process large volumes of social media events with enhanced throughput using event processing system 800. GoCars Corp is launching a new marketing campaign that introduces a new type of navigation system for an existing line of cars called "GoCars." GoCars Corp would like to analyze events such as Twitter messages to see what people are saying about its new offering.

Producer node 104a begins by making a connection to event service 102a. For example, event service 102a may be a social media feed such as a Twitter feed. Producer node 104a proceeds to retrieve events from event service 102a. In some embodiments producer node 104a determines the appropriate consumer node for processing the events based on parsing a subject of the event to identify a predetermined string, and based on a location of the author of the social media post. For example, producer node 104a may parse the event to detect the text "GoCars."

If producer node 104a identifies the event to be of interest (e.g., if the event contains the predetermined string), producer node 104a determines the sharding key for the event based on a location of the author of the social media post. For example, producer node 104a may determine a zip code associated with the author (e.g., by aggregating zip code data from an external system). Event processing system 800 may configure the channel map and sharding map to assign consumer channels and consumer nodes based on zip code. For example, event processing system 800 may use embedded Hazelcast 124a, 126a-b to configure the channel map and sharding map to transmit events associated with even zip codes to consumer channels on consumer node 106a and odd zip codes to consumer channels on consumer node 106b. In further embodiments, event transport metadata bundled with the event may contain information on how consumer nodes 106a-b should process the event when received.

After receiving the event, producer node 104a determines an associated consumer channel for the event based on the sharding map and on a sharding key for the event. In this example, the sharding map associates the event with a consumer channel on consumer node 106a, based on the zip code. Producer node 104a provides the received event to a producer event buffer in a producer channel. The producer channel uses TCP/IP socket connection 510 to transmit the received event directly to a consumer event buffer associated with a corresponding consumer channel on consumer node 106a. Consumer node 106a receives the event via TCP/IP socket 410 and the consumer event buffer. Consumer node 106a unpacks the event and executes a rule identified by the event transport metadata. In some embodiments, the event transport metadata may identify a rule that causes consumer node 106a to perform sentiment analysis on the received event. Sentiment analysis can use machine learning and decisioning techniques in conjunction with analytic models to identify positive or negative sentiment in the contents of the received event. The event transport metadata may identify a further rule that causes consumer node 106a to store the event to persistent storage, based on the positive or negative result of the sentiment analysis. For example, consumer node 106a may store events with positive sentiment into a marketing database for customer highlights, and events with negative sentiment into a customer database for customer service follow-ups.

Figure 9:
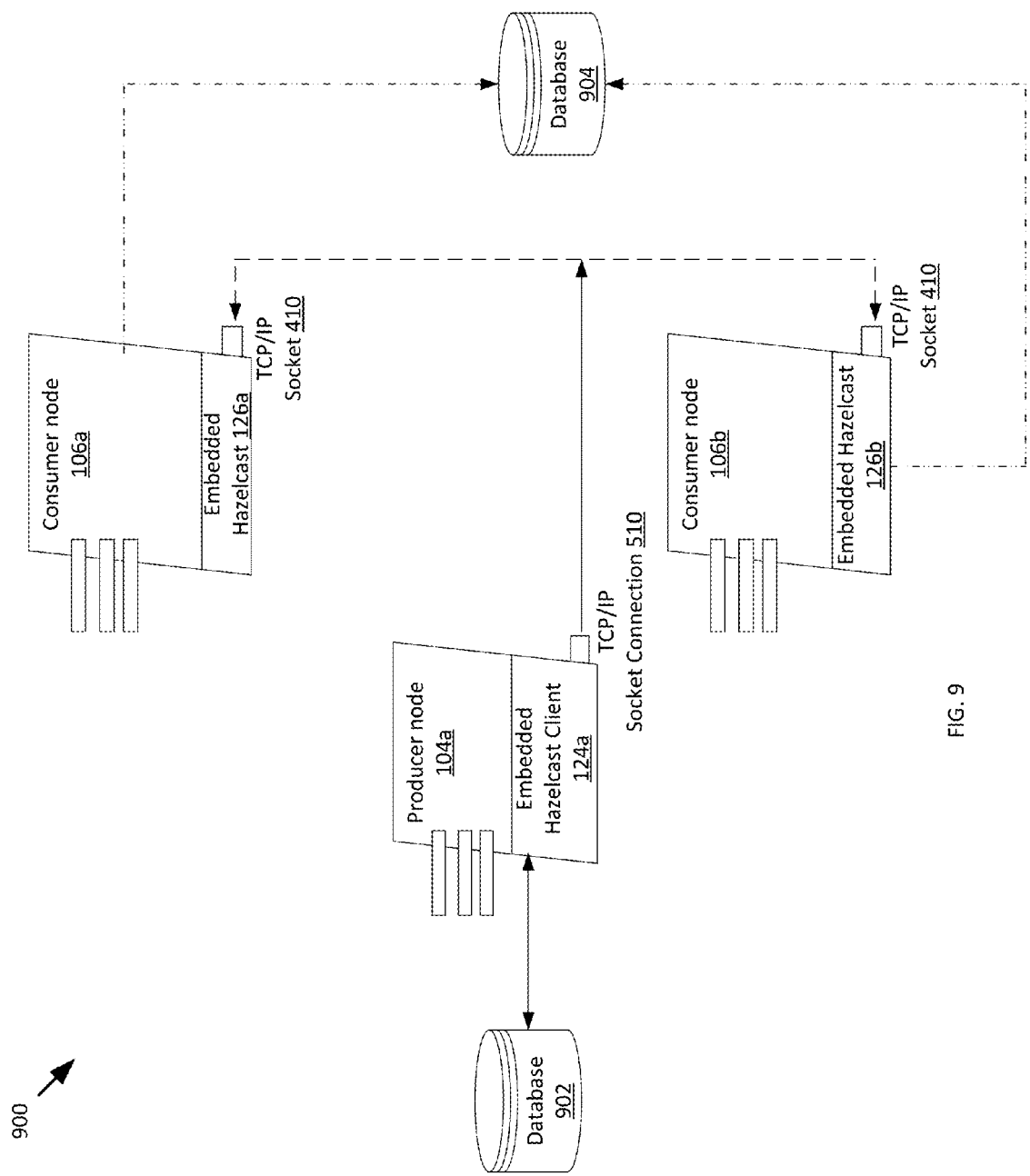
FIG. 9 illustrates an example event processing system for high-speed record processing, in accordance with certain embodiments of the present invention.

FIG. 9 illustrates example event processing system 900 for high speed record processing, in accordance with certain embodiments of the present invention.

In this example, a customer has an external source system that provides line item details for invoices (e.g., medical claims for health insurance). An administrator deploys a rules-based application into a cluster. Consumer nodes 106a-b collate and compute aggregate information about item detail records associated with line items. The event service includes high speed database 902 capable of producing result sets that can be iterated at speeds in the range of 100,000 rows per second. In this application, an incoming record may have an overall case number that groups individual item detail records together. Item detail records may also have a field or indicator that tracks "end sub-group record," for example. Upon receiving an item detail record with its "end sub-group record" indicator set to true, the application may be configured to collect or group item detail records and write out the set as a single record, for example to database 904.

Producer node 104a connects to an event service such as database 902. Some embodiments of producer node 104a use an event publisher to retrieve events, for example using a database specific query. Producer node 104a creates an event for each row retrieved from database 902 using the database-specific query. In some embodiments, producer node 104a determines the sharding key for each event based on an identified field from the database. For example, the sharding key in conjunction with the sharding map may determine that producer node 104a should route a given event to consumer node 106a. The sharding map directs the event to a producer channel corresponding to a consumer channel associated with consumer node 106a. Producer node 104a uses TCP/IP socket connection 510 to transmit the event directly to consumer node 106a.

Consumer node 106a receives the event via TCP/IP socket 410 into its consumer event buffer from producer node 104a. In some embodiments, consumer node 106a unpacks the received event including bundled event transport metadata. For example, the event transport metadata may identify a rule that checks whether the received event is part of an "existing" set or a "new" set in database 904. Consumer node 106a executes the rule identified by the event transport metadata. The event transport metadata may further identify or define rules creating a structure containing a "new" bucket, or retrieving an "existing" bucket based on the event ID or case ID. In further embodiments, if the event has its "end sub-group" record configured to true, event processing system 900 may group together the events in the bucket in a common format and store the grouped events in database 904 to allow further analysis and processing, potentially by follow-on applications.

Figure 10:
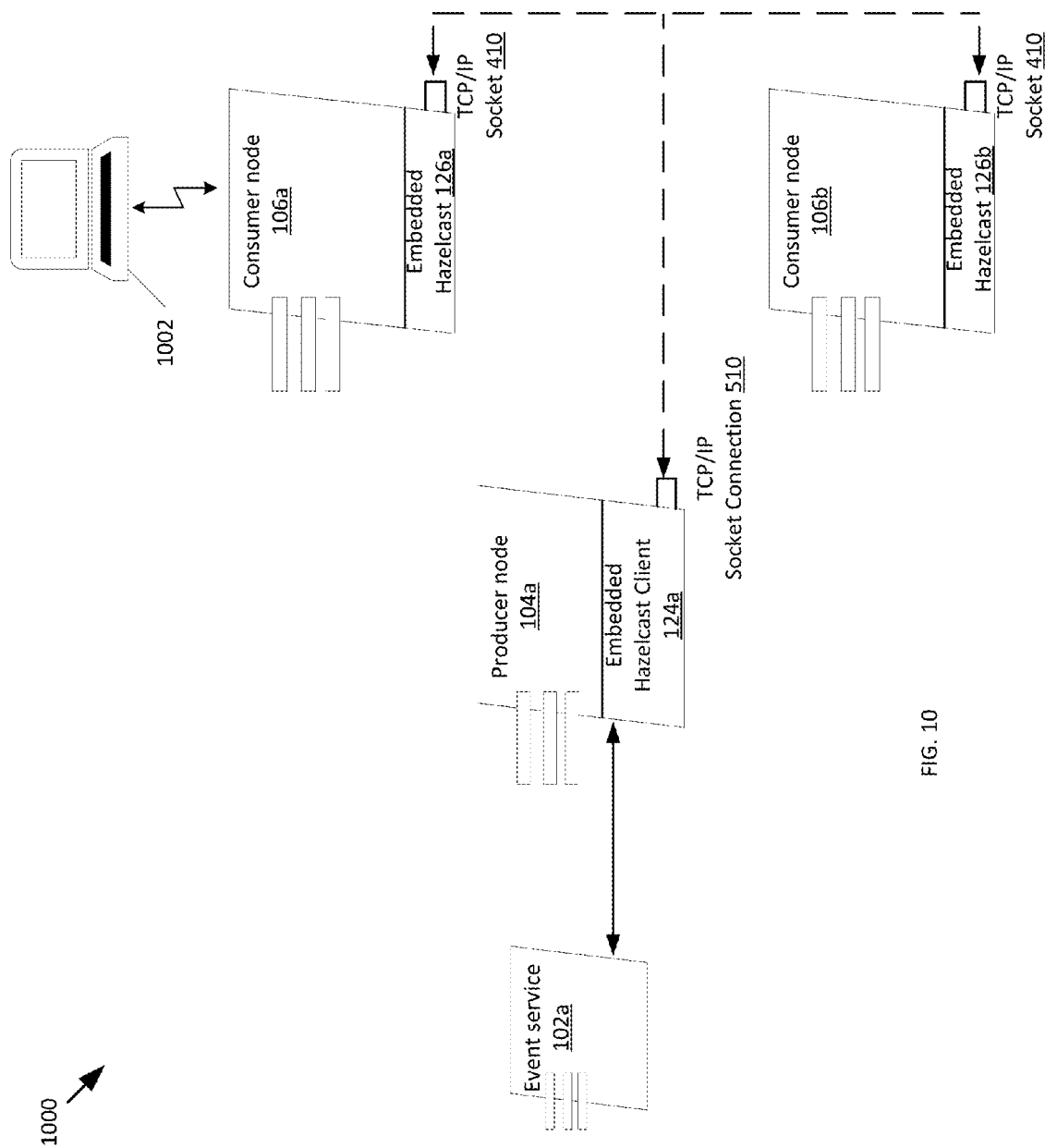
FIG. 10 illustrates an example event processing system for performing targeted actions while aggregating external system input, in accordance with certain embodiments of the present invention.

FIG. 10 illustrates example event processing system 1000 for performing targeted actions while aggregating external system input, in accordance with certain embodiments of the present invention. Event system 1000 includes producer node 104a in communication with event service 102a and consumer nodes 106a-b.

In the illustrated example, a company has deployed an external source system that pushes information required by an customer service representative who is online. The company may have a call center where customer service representatives use a rules-based application in communication with event processing system 1000 to respond to end users who call in with questions and answer those questions. In this call center, the application notifies a customer service representative that a call has come in that the representative will respond to, and routes the call to the representative. In addition, the application sends a query to an external system requesting additional information about the incoming caller. If the external system identifies information for consideration by the representative, the external system delivers the information to an entry point (e.g., using event service 102a). The delivered information requires routing to the correct representative. In the cluster illustrated in FIG. 10, the representatives may be deployed on a diverse set of servers (e.g., one or more of consumer nodes 106a-b). Event processing system 1000 locates the physical consumer node on which a representative is logged in who should receive the packaged information, packages up the information from the external system, and sends the packaged information to the correct consumer node 106a. Consumer node 106a accepts the event containing the packaged information and forwards the packaged information to the representative. For example, the application may display the packaged information in a pop-up window on a web browser on the representative's computer 1002.

The customer service representative begins by using the application deployed by the company on computer 1002. For example, the representative may initiate a new case to track an issue faced by a caller. In some embodiments, event processing system 1000 may present a user interface for a customer service application on computer 1002, in communication with a rules engine and rules base (not shown). The representative on computer 1002 may be assigned to consumer node 106a. In some embodiments, the rules engine and rules base may be deployed on one or more remote systems in communication with producer node 104a or consumer nodes 106a-b. In other embodiments, the rules engine and rules base may be deployed locally on producer node 104a or consumer nodes 106a-b.

In connection with the call received by the representative on consumer node 106a, producer node 104a receives information from event service 102a. For example, event service 102a may be an external information service that provides information about the caller. Producer node may create an event that packages the information from event service 102a. Event processing system 1000 may send a query over TCP/IP socket connection 510 to identify the consumer node associated with the representative helping the caller. The query results may identify the representative and associated customer node 106a.

In some embodiments, producer node 104a may use embedded Hazelcast client 124a to update the sharding map to reflect that received events associated with the caller and representative will route to consumer node 106a. In some embodiments, the representative and caller ID information for the caller may be included as event metadata. Accordingly, when producer node 104a receives the event from event service 102a, producer node 104a provides the event to the correct producer channel based on the sharding map, which transmits the event over TCP/IP socket connection 510 directly to a consumer channel on consumer node 106a as intended. The corresponding consumer event buffer on consumer node 106a receives the event over TCP/IP socket 410. Consumer node 106a processes the event and reads the bundled event transport metadata. The event transport metadata may identify or define a rule to notify the representative on computer 1002 of the information from the external information service. In some embodiments, the application may notify the representative by displaying a pop-up window in a web browser on computer 1002.

Elasticity

Figure 11:
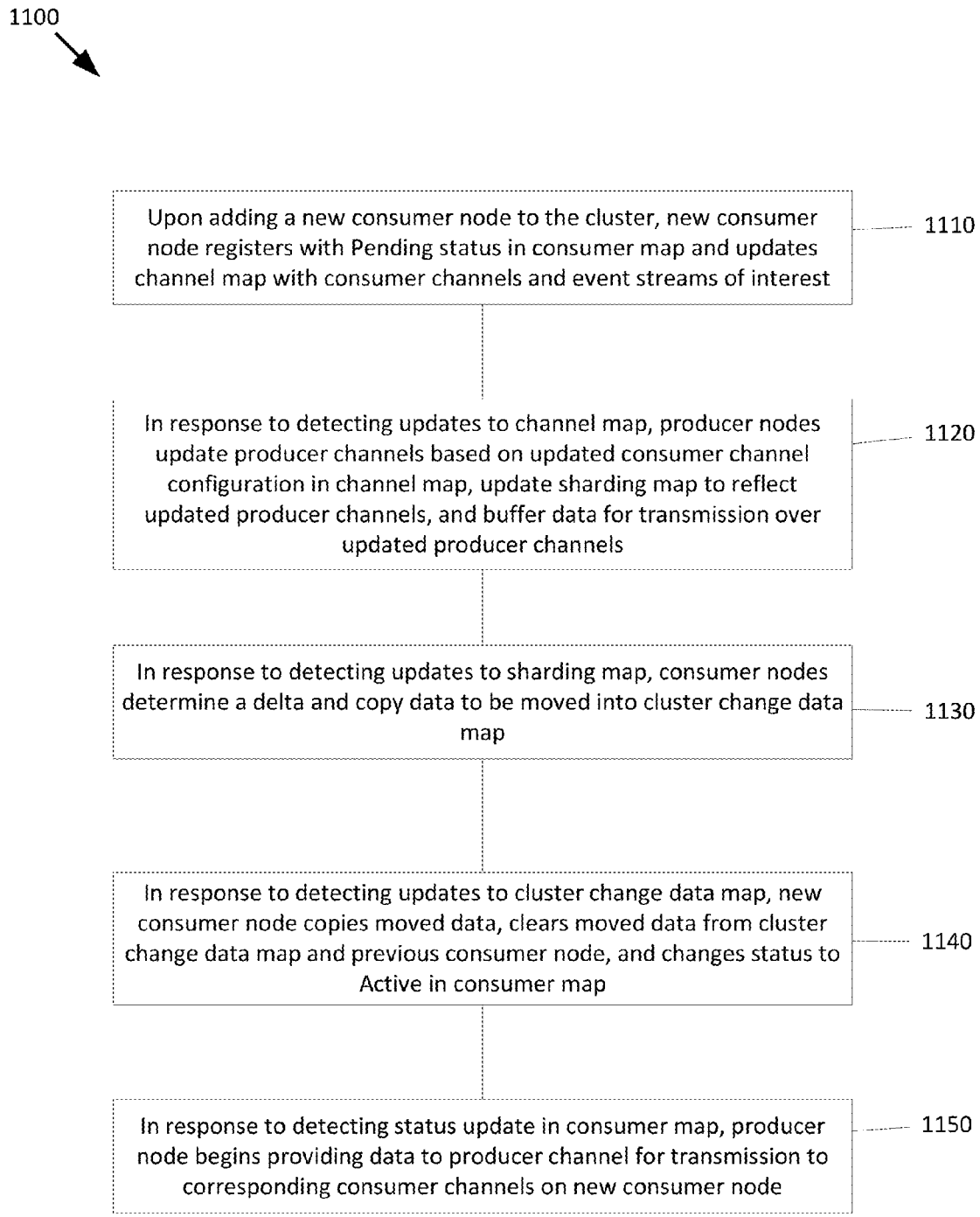
FIG. 11 illustrates an example event processing method for providing elasticity, in accordance with certain embodiments of the present invention.

FIG. 11 illustrates an example event processing method 1100 for providing elasticity, in accordance with certain embodiments of the present invention. Method 1100 supports elasticity such as horizontal and vertical scaling. The elasticity techniques described herein including method 1100 allow the event processing system to reconfigure the cluster dynamically while the cluster is running. Horizontal scaling refers to support by the event processing for dynamically adding or removing producer and consumer nodes to or from the cluster. Vertical scaling refers to support for dynamically adding or removing consumer channels to or from an individual consumer node, or producer channels to or from an individual producer node.

For example, method 1100 supports adding a new consumer node to the cluster. When the new consumer node comes online and joins the cluster, the new consumer node begins by registering in a consumer map, and updates the channel map to reflect the event streams and corresponding consumer channels that the new consumer node supports (step 1110). In some embodiments, the consumer map may be a distributed Hazelcast map. When registering in the consumer map, the new consumer node may register initially with a status of Pending.

In response to detecting updates to the channel map, the producer nodes update their configurations (step 1120). For example, the producer nodes update their producer channels based on the updated consumer channel configuration in the channel map. The producer nodes also update the sharding map to assign sharding keys to the updated producer channels. Finally, the producer nodes proceed to buffer events for transmission over the updated producer channels.

In response to detecting updates to the sharding map, all consumer nodes in the cluster determine a consumer-node-wide delta reflecting data to be moved, and copy the data to be moved into a cluster change data map (step 1130). In some embodiments, the cluster change data map may be a distributed Hazelcast map. In response to detecting updates to the cluster change data map, the new consumer node copies the moved data, clears the moved data from the cluster change data map and from the consumer node that previously stored the data, and updates the status to Active for the new consumer node in the consumer map (step 1140). In response to detecting status updates in the consumer map, the producer nodes begin providing data to the producer channel for transmission to the corresponding consumer channels on the new consumer node (step 1150).

Figure 12:
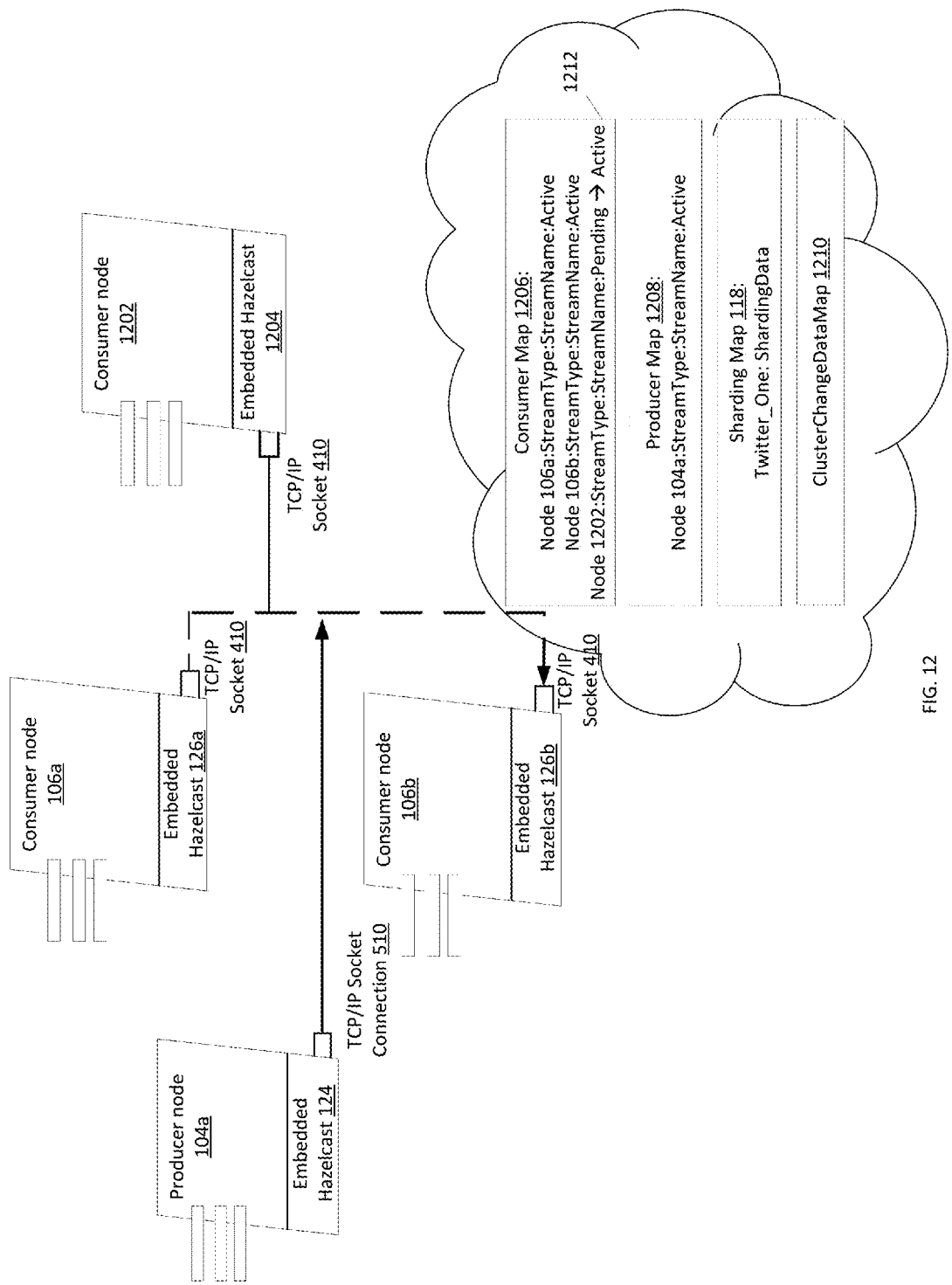
FIG. 12 illustrates an example event processing system expanding to add a new consumer node, in accordance with certain embodiments of the present invention.

FIG. 12 illustrates example event processing system 1200 expanding to add new consumer node 1202, in accordance with certain embodiments of the present invention. Event processing system 1200 includes producer node 104*a* in communication with consumer nodes 106*a-b*, 1202 using consumer map 1206, producer map 1208, sharding map 118, and cluster change data map 1210.

Event processing system 1200 supports horizontal scalability by expanding dynamically upon addition of a new consumer node. The addition of consumer node 1202 to the cluster can distribute and potentially increase the event processing capacity of the cluster. The process of adding consumer node 1202 involves a number of changes and updates in the cluster. In some embodiments, there are two sets of changes: one set for consumer nodes and a companion set for producer nodes. Although the changes are described sequentially, in some embodiments some steps can happen in parallel and in different threads, to streamline the addition of consumer node 1202.

New consumer node 1202 begins by coming online and joining the cluster. In general, as part of the startup process new consumer node 1202 orchestrates the rebalancing of the cluster and identifies itself as ready when the process is complete. Consumer node 1202 continues by configuring event stream support. For example, consumer node 1202 reads its configuration to identify supported event streams by stream type and stream name. Consumer node 1202 proceeds to initiate a cluster lock for re-sharding. In some embodiments, the cluster lock on re-sharding prevents initiation of additional re-sharding sessions while the current session is in progress. Consumer node 1202 then registers itself with consumer map 1206. Consumer map 1206 tracks the universe of consumer nodes in the cluster, and producer map 1208 tracks the universe of producer nodes in the cluster. In some embodiments, consumer node 1202 registers with initial status 1212 of Pending.

Based on the event stream support, consumer node 1202 creates corresponding consumer channels and consumer ring buffers to reflect the supported event streams. Consumer node 1202 determines updates to the channel map based on the consumer channels. Consumer node 1202 then initiates a wait loop, waiting for related activity on other consumer and producer nodes in the cluster to signal finalization. In some embodiments, consumer node 1202 registers event listeners or item listeners on cluster change data map 1210 to receive update notifications for changes to the cluster change data map.

Each producer node 104*a* reacts to changes in the channel map by new consumer node 1202. In some embodiments, producer node 104*a* reacts by transmitting an end event on all existing producer channels to all corresponding consumer channels in communication with producer node 104*a*. Producer node 104*a* proceeds to update the producer channels. For example, producer node 104*a* creates and initializes new producer event buffers corresponding to the updated producer channels. Producer node 104*a* next updates the sharding map to reflect the updated producer channels. In some embodiments, producer node 104*a* pauses production of events to copy the new sharding map, and resumes production of events based on the new sharding map. For events targeted to new consumer node 1202, producer node 104*a* buffers those events until status 1212 of consumer node 1202 becomes Active in consumer map 1206.

After producer node 104*a* provides an end event on all producer channels for transmission to all consumer channels, consumer nodes 106*a-b*, 1202 corresponding to the consumer channels process the received end event. Although the processing of the end event is described herein with reference to consumer node 106*a*, the processing is the same for all consumer nodes in the cluster. For example, consumer node 106*a* triggers all consumer event buffers corresponding to all consumer channels to process the received end event as follows. Consumer node 106*a* reads the updated channel map, and creates a consumer-node-wide delta reflecting the updates. As each consumer event buffer receives the end event to process, the consumer event buffer copies its data to be moved to cluster change data map 1210. Once the consumer event buffer has completed copying the data to move, the consumer event buffer resumes processing any events from the corresponding producer event buffer that have been buffered.

In response to a notification of updates to cluster change data map 1210, new consumer node 1202 continues to wait for all moved partitions to appear in cluster change data map 1210. Once the moved partitions all appear in cluster change data map 1210, consumer node 1202 copies the data from cluster change data map 1210 and clears the contents it copied from cluster change data map 1210 and from the consumer nodes that previously stored the copied data. Upon completion of copying the data, consumer node 1202 updates its status to Active in consumer map 1206 and clears the cluster lock on re-sharding. Lastly, upon receiving a notification of the status update for consumer node 1202 in consumer map 1206, producer node 104*a* begins providing events to the producer channels associated with consumer node 1202, and the producer channels begin transmitting the events directly to consumer node 1202.

The elasticity support in event processing system 1200 has thus far discussed adding a consumer node to the cluster. Method 1200 also supports the following dynamic rebalancing: removing consumer node 1202, adding consumer channels to a consumer node in support of a given event stream, and removing consumer channels from a consumer node for the event stream.

With reference to FIG. 11, in some embodiments event processing system 1200 supports removing a consumer node from the cluster in support of horizontal scalability. Dynamic rebalancing in response to deleting consumer node 1202 can be similar to adding a consumer node. The difference is that the updates to the channel map (step 1110) and sharding map (step 1120) include removing the appropriate entries in the channel map and sharding map, rather than adding new entries. With that change in mind, method 1100 proceeds as described earlier in response to producer node 104*a* and consumer nodes 106*a*-*b*, 1202 receiving notifications of the updates to the channel map and sharding map. That is, in response to the removed consumer channels from the channel map, producer node 104*a* removes producer channels corresponding to the consumer channels that will be removed when consumer node 1202 is removed from the cluster, and updates the sharding map to reflect the updated producer channel configuration (step 1120). In response to detecting updates to the sharding map, consumer node 1202 determines a delta that reflects data previously on consumer node 1202 to be copied to the cluster change data map and moved to remaining consumer nodes 106*a*-*b* (step 1130). In response to detecting the updates to the cluster change data map, remaining consumer nodes 106*a*-*b* copy the data to be moved from consumer node 1202, clear the moved data from the cluster change data map once copied, and consumer node 1202 updates its status in the consumer map to reflect its removal from the cluster (step 1140). In response to detecting the status update in the consumer map, producer node 104*a* proceeds to provide events for transmission to producer channels, for transmission to the updated consumer channels on remaining consumer nodes 106*a*-*b* (step 1150).

In some embodiments, event processing system 1200 supports adding consumer channels to an existing consumer node in support of vertical scalability. In contrast to adding a new consumer node, the update to the channel map comprises changing (i.e., increasing) the number of consumer channels supported for a given event stream in an existing updated consumer node. Upon receiving a notification of an update to the channel map, event processing system 1200 rebalances the cluster by processing the channel map and sharding map in a similar manner as for addition of a new consumer node. That is, the updated consumer node updates the channel map to reflect the increased consumer channels for event streams of interest (step 1110). In response to detecting updates to the channel map, producer node 104*a* creates producer channels corresponding to the new consumer channels created on the existing consumer node, and updates the sharding map to reflect the new producer channels (step 1120). In response to detecting updates to the sharding map, the consumer node determines a delta that reflects data previously assigned to other consumer channels or other consumer nodes, and copies the data to be moved into the cluster change map (step 1130). In response to detecting the updates to the cluster change map, the existing updated consumer node copies the moved data and clears the moved data from the cluster change map and from the previous consumer node storing the data prior to moving (step 1140). After copying the moved data, producer node 104*a* begins providing data to the new producer channels for transmission to the updated consumer channels (step 1150).

In some embodiments, event processing system 1200 supports removing consumer channels from an existing consumer node. In this case the update to the channel map comprises changing (i.e., decreasing) the number of consumer channels supported for a given event stream. Event processing system 1200 processes the updates to the channel map in a similar manner as with removal of an existing consumer node. That is, the updated consumer node updates the channel map to reflect the decreased consumer channels for event streams of interest (step 1110). In response to detecting updates to the channel map, producer node 104*a* removes producer channels corresponding to the removed consumer channels created on the existing consumer node, and updates the sharding map to reflect the removed producer channels (step 1120). In response to detecting updates to the sharding map, the consumer node determines a delta that reflects data to be assigned to other consumer channels on the consumer node or on other consumer nodes, and copies the data to be moved into the cluster change map (step 1130). In response to detecting the updates to the cluster change map, the existing updated consumer node copies the moved data and clears the moved data from the cluster change map and from the previous consumer node that stored the data prior to moving (step 1140). After copying the moved data, producer node 104*a* begins providing data to the new producer channels for transmission to the updated consumer channels (step 1150).

The event processing systems and methods described herein address a technical problem of rapidly routing and processing large volumes of discrete events in a networked cluster. The event processing provides a technical contribution that involves determining a sharding key for a received event from an event stream, and using a sharding map to correlate the sharding key for the event with a producer channel. A producer node provides the received event to a producer event buffer associated with the producer channel, and the producer event buffer transmits the event to a corresponding consumer event buffer associated with a consumer channel on a consumer node. The sharding map, sharding key, and paired producer channels and consumer channels, among other aspects, add specific limitations other than what is well-understood, routine, and conventional in the field. The event processing further provides significantly more than an abstract idea by improving the functioning of the producer and consumer digital data processors themselves. For example, the event processing achieves improved throughput in the cluster by leveraging the paired relationship between producer channels on the producer node and consumer channels on the consumer node. The event processing also supports dynamic rebalancing of the system in response to adding or removing producer or consumer nodes, or adding or removing producer or consumer channels to or from producer or consumer nodes. These enhancements elevate the producer and consumer digital data processors beyond their conventional functioning.

Other embodiments are within the scope and spirit of the event processing systems and methods. For example, the event processing functionality described above can be implemented using software, hardware, firmware, hardwiring, or combinations of any of these. One or more digital data processors operating in accordance with instructions may implement the functions associated with event processing in accordance with the present disclosure as described above. If such is the case, it is within the scope of the event processing systems and methods that such instructions may be stored on one or more non-transitory computer-readable storage media (e.g., a magnetic disk, solid state drive, or other storage medium). Additionally, as described earlier, modules implementing functions may also be physically located at various positions, including being distributed such that portions of functions are implemented at different physical locations.

The event processing systems and methods are not to be limited in scope by the specific embodiments described herein. Indeed, other various embodiments of and modifications to the event processing, in addition to those described herein, will be apparent to those of ordinary skill in the art from the foregoing description and accompanying drawings. Thus, such other embodiments and modifications are intended to fall within the scope of the event processing systems and methods described herein. Furthermore, although the event processing has been described herein in the context of a particular implementation in a particular environment for a particular purpose, those of ordinary skill in the art will recognize that its usefulness is not limited thereto and that the event processing may be beneficially implemented in any number of environments for any number of purposes.

What is claimed is:

1. A digital data processing system comprising
a producer node in communicative coupling with one or more consumer nodes and with a sharding map, wherein the producer node is configured to:
receive at least one event stream comprising a plurality of events;
determine a sharding key associated with an event among the plurality of events in the event stream;
identify, based on the sharding map, a producer event buffer associated with a producer channel on the producer node for transmitting the event to a corresponding consumer event buffer associated with a consumer channel on a consumer node among the one or more consumer nodes, wherein the sharding map correlates the sharding key for the event with the producer channel; and
provide the event to the producer event buffer associated with the producer channel in order to transmit the event to the corresponding consumer event buffer associated with the consumer channel on the consumer node,
wherein the producer node is further configured to initialize a plurality of producer channels by
referencing a channel map that correlates an event in the event stream with one or more consumer channels on the one or more consumer nodes;
creating at least one producer channel based on the channel map that is communicatively coupled with a corresponding consumer channel among the one or more consumer channels; and
updating the sharding map to correlate the sharding key for the event with the at least one producer channel created based on the channel map.

2. The system of claim 1,
wherein the sharding map correlates the sharding key for the event with the producer channel based on a partition space, and
wherein the partition space is determined using a partition criterion based on a count of consumer nodes available to process the plurality of events in the event stream.

3. The system of claim 2, wherein the producer node is further configured to update the sharding map in response to detecting an update to a channel map that correlates an event in the event stream with one or more consumer channels on the one or more consumer nodes.

4. The system of claim 3, wherein the system is configured to update the sharding map by
redistributing the partition space based on determining an updated partition size for existing producer channels based on a count of available consumer channels, and
assigning an overflow portion of the partition space based on the updated partition size to a new producer channel.

5. The system of claim 3, wherein the producer node is configured to update the sharding map by redistributing the partition space based on
querying the one or more consumer nodes to identify resources available to the one or more consumer nodes, and
weighting the partitions assigned to each producer channel based on the identified resources.

6. The system of claim 1, wherein the producer node is further configured to adjust the rate of providing events to the producer event buffer so as to manipulate the rate of events processed on the corresponding consumer node by the consumer event buffer, in order to improve throughput between the producer node and the consumer node.

7. The system of claim 1, wherein the producer node is further configured to
bundle event transport metadata with the plurality of events in the event stream for transmission to the consumer node, wherein the event transport metadata contains instructions for identifying a rule to process the plurality of events after receipt by the consumer node, and
trigger the consumer node to execute the identified rule for processing the plurality of events.

8. The system of claim 1, wherein the producer node is further configured to update a plurality of producer channels in response to detecting an update to at least one of the sharding map and a channel map by the consumer node,
wherein the update to the at least one of the sharding map and the channel map comprises at least one of adding a consumer node to the system, removing a consumer node from the system, adding one or more consumer channels to the consumer node, and removing one or more consumer channels from the consumer node, and
wherein the channel map correlates an event in the event stream with one or more consumer channels on the one or more consumer nodes.

9. The system of claim 8,
wherein the producer node is further configured to transmit a message to the one or more consumer nodes in response to detecting the update to at least one of the sharding map and the channel map, and
wherein the transmitted message triggers the one or more consumer nodes to:
determine a delta that tracks the update to the at least one of the sharding map and the channel map,
identify data to be moved to at least one of a different consumer channel and a different consumer node, and
copy the data to be moved to a cluster change data map, wherein the data copied to the cluster change data map triggers the consumer node to
copy the moved data from the cluster change data map, clear the copied data from the cluster change data map, and update a status of the consumer node to active in a consumer map that tracks the one or more consumer nodes in the cluster, and wherein the producer node is further configured to resume transmission of data to the consumer node in response to detecting the updated status of the consumer node in the consumer map.

10. A method for event processing, the method comprising:

receiving, by a producer node, at least one event stream comprising a plurality of events, wherein the producer node is in communicative coupling with one or more consumer nodes and with a sharding map;

determining, with the producer node, a sharding key associated with an event among the plurality of events in the event stream;

identifying, based on the sharding map, a producer event buffer associated with a producer channel on the producer node for transmitting the event to a corresponding consumer event buffer associated with a consumer channel on a consumer node among the one or more consumer nodes, wherein the sharding map correlates the sharding key for the event with the producer channel;

providing the event to the producer event buffer associated with the producer channel in order to transmit the event to the corresponding consumer event buffer associated with the consumer channel on the consumer node;

initializing a plurality of producer channels by:

referencing, with the producer node, a channel map that correlates an event in the event stream with one or more consumer channels on the one or more consumer nodes;

creating at least one producer channel based on the channel map that is communicatively coupled with a corresponding consumer channel among the one or more consumer channels; and updating the sharding map to correlate the sharding key for the event with the at least one producer channel created based on the channel map.

11. The method of claim 10, wherein the sharding map correlates the sharding key for the event with the producer channel based on a partition space, and wherein the partition space is determined using a partition criterion based on a count of consumer nodes available to process the plurality of events in the event stream.

12. The method of claim 11, further comprising updating, with the producer node, the sharding map in response to detecting an update to a channel map that correlates an event in the event stream with one or more consumer channels on the one or more consumer nodes.

13. The method of claim 12, wherein the updating the sharding map comprises redistributing the partition space by:

determining, with the producer node, an updated partition size for existing producer channels based on a count of available consumer channels, and assigning an overflow portion of the partition space based on the updated partition size to a new producer channel.

14. The method of claim 12, wherein the updating the sharding map comprises redistributing the partition space by:

querying the one or more consumer nodes to identify resources available to the one or more consumer nodes, and weighting the partitions assigned to each producer channel based on the identified resources.

15. The method of claim 10, further comprising adjusting, with the producer node, the rate of providing events to the producer event buffer so as to manipulate the rate of events processed on the corresponding consumer node by the consumer event buffer, in order to improve throughput between the producer node and the consumer node.

16. The method of claim 10, further comprising:

bundling, using the producer node, event transport metadata with the plurality of events in the event stream for transmission to the consumer node, wherein the event transport metadata contains instructions for identifying a rule to process the plurality of events after receipt by the consumer node, and triggering the consumer node to execute the identified rule for processing the plurality of events.

17. The method of claim 10, further comprising updating a plurality of producer channels in response to detecting an update to at least one of the sharding map and a channel map by the consumer node, wherein the update to the at least one of the sharding map and the channel map comprises at least one of adding a consumer node to the system, removing a consumer node from the system, adding one or more consumer channels to the consumer node, and removing one or more consumer channels from the consumer node, and wherein the channel map correlates an event in the event stream with one or more consumer channels on the one or more consumer nodes.

18. The method of claim 17, further comprising:

transmitting, using the producer node, a message to the one or more consumer nodes in response to detecting an the update to at least one of the sharding map and the topic channel map, wherein the transmitted message triggers the one or more consumer nodes to:

determine a delta that tracks the update to the at least one of the sharding map and the topic channel map, identify data to be moved to at least one of a different consumer channel and a different consumer node, and copy the data to be moved to a cluster change data map, wherein the data copied to the cluster change data map triggers the consumer node to copy the moved data from the cluster change data map, clear the copied data from the cluster change data map, and update a status of the consumer node to active in a consumer map that tracks the one or more consumer nodes in the cluster, and resuming transmission, using the producer node, of data to the consumer node in response to detecting the updated status of the consumer node in the consumer map.

* * * * *